United States Patent [19]
Sasaki

[11] Patent Number: 5,629,911
[45] Date of Patent: May 13, 1997

[54] OPTICAL INFORMATION RECORDING/REPRODUCTION APPARATUS INCLUDING AN INTEGRATED PHOTODETECTOR USED IN THE DETECTION OF FOCUSING AND/OR TRACKING ERROR SIGNALS

[75] Inventor: Kenichi Sasaki, Tokyo, Japan

[73] Assignee: Canon Kabushiki Kaisha, Tokyo, Japan

[21] Appl. No.: 159,476

[22] Filed: Nov. 30, 1993

[30] Foreign Application Priority Data

Dec. 1, 1992 [JP] Japan ..................... 4-343535

[51] Int. Cl.$^6$ .......................................... G11B 7/09
[52] U.S. Cl. .................... 369/44.42; 369/44.41; 369/44.23
[58] Field of Search .................. 369/44.41, 44.42, 369/110, 44.23, 44.14, 13, 112, 44.24; 250/201.5

[56] References Cited

U.S. PATENT DOCUMENTS

| | | | |
|---|---|---|---|
| 4,652,737 | 3/1987 | Kowalski et al. | 250/201 |
| 4,724,533 | 2/1988 | Ohara et al. | 369/44.42 |
| 4,742,218 | 5/1988 | Nakamura et al. | 369/44.42 X |
| 5,004,326 | 4/1991 | Sasaki | 350/375 |
| 5,126,988 | 6/1992 | Nishiguma et al. | 369/44.42 X |
| 5,144,606 | 9/1992 | Kadowaki | 369/44.23 |
| 5,200,942 | 4/1993 | Hosobata et al. | 369/44.41 |

FOREIGN PATENT DOCUMENTS

| | | |
|---|---|---|
| 60-256929 | 12/1985 | Japan . |
| 61-198456 | 9/1986 | Japan . |
| 61-198457 | 9/1986 | Japan . |
| 61-132242 | 6/1987 | Japan . |

*Primary Examiner*—Thang V. Tran
*Attorney, Agent, or Firm*—Fitzpatrick, Cella, Harper & Scinto

[57] ABSTRACT

An optical information recording/reproduction apparatus includes a radiation device for radiating a light beam onto an information recording medium, a converging device for converging the light beam reflected by the information recording medium, a first device for splitting the converged light beam into two light beams, a second device for guiding the two split light beams onto a single light-receiving surface, which can receive the two light beams, via optical paths having different optical path lengths, the second device guiding the two light beams, so that one of the two split light beams is projected onto the light-receiving surface at a position before the light beam passes a convergent point thereof, and the other light beam is projected onto the light-receiving surface at a position after the light beam passes a convergent point thereof, an integrated photodetector including at least two photodetection regions for receiving the light beams on the light-receiving surface, a size, in one direction, of each of the photodetection regions of the photodetector being set to be smaller than a beam spot size on the light-receiving surface in an in-focus state and device for detecting, focusing error signals from the light beams on the light-receiving surface, by the photodetection regions.

5 Claims, 37 Drawing Sheets

AT ERROR SIGNAL $I_P - I_Q$

TRACK INTERSECTION DIRECTION $I_R - I_S$

TRACK INTERSECTION DIRECTION $(I_P - I_Q) - (I_R - I_S)$

TRACK INTERSECTION DIRECTION

OPTICAL INFORMATION RECORDING/ REPRODUCTION APPARATUS INCLUDING AN INTEGRATED PHOTODETECTOR USED IN THE DETECTION OF FOCUSING AND/ OR TRACKING ERROR SIGNALS

BACKGROUND OF THE INVENTION

1. Field of the Invention

The present invention relates to an optical information recording/reproduction apparatus for recording information on an information recording medium such as a magnetooptical information recording medium or/and for reproducing information from the information recording medium and, more particularly, to a detection mechanism for detecting a focusing error signal (to be referred to as an AF error signal hereinafter) and a tracking error signal (to be referred to as an AT error signal hereinafter), or/and a magnetooptical detection signal (to be referred to as an MO signal hereinafter) in an optical system of the apparatus.

2. Related Background Art

Conventionally, various methods have been proposed for so-called AF error signal detection for guiding a detection light beam reflected by an information recording medium such as a magnetooptical information recording medium onto the light-receiving surface of a photodetector, and detecting the focusing state of a light spot formed for recording/reproduction on the information recording medium. Of these methods, a beam size method for detecting a change in beam spot size of the detection light beam is an excellent method since it requires only a small number of components in an optical system and an electrical control system.

For example, FIG. 1 shows an example (the invention disclosed in Japanese Laid-Open Patent Application No. 60-256929) of an AF error signal detection optical system based on the conventional beam size method. Referring to FIG. 1, a light beam emitted from a semiconductor laser 1 is collimated by a collimator lens 2, and the collimated beam reaches an objective lens 4 via a beam splitter 3. The collimated beam is converged by the objective lens 4 to form a light spot on the recording surface of an information recording medium 5. Light (detection light beam) reflected by the information recording medium 5 is transmitted through the objective lens 4 again, is deflected by the beam splitter 3, and is split into a reflected light beam and a transmission light beam by a beam splitter 7-$a$. The reflected light beam is converged by a convergent lens 6-$a$. The transmission light beam is deflected by a mirror 7-$c$ in substantially the same direction as the reflected light beam, and is converged by a convergent lens 6-$b$. Thereafter, the split light beams are respectively incident on photodetectors 10-$a$ and 10-$b$.

The light-receiving surfaces of the photodetectors 10-$a$ and 10-$b$ are arranged, so that one photodetector receives the corresponding light beam at a position shifted from a focal plane 25 of a corresponding one of the convergent lenses 6-$a$ and 6-$b$ in a direction to approach the convergent lens, and the other photodetector receives the corresponding light beam at a position shifted from the focal plane 25 in a direction to be separated away from the corresponding convergent lens. Therefore, on the light-receiving surfaces of the photodetectors 10-$a$ and 10-$b$, the beam spot sizes change in opposite directions in accordance with a change in focusing state of the light spot (recording/reproduction light spot) on the information recording medium. More specifically, when the objective lens 4 is defocused toward the information recording medium 5, if the beam spot size on the photodetector 10-$a$ increases, the beam spot size on the photodetector 10-$b$ decreases. When the objective lens 4 is defocused in the direction to be separated away from the information recording medium 5, the relationship between the beam spot sizes on the photodetectors 10-$a$ and 10-$b$ is reversed to that described above. Thus, a difference between signals output from the photodetectors 10-$a$ and 10-$b$ is calculated to obtain an AF error signal.

To summarize, since light beams incident on the photodetectors 10-$a$ and 10-$b$ can be split by the polarization beam splitter 7-$a$ in units of components in a direction of 45° with respect to the original plane of polarization, differential detection of an MO signal can also be simultaneously achieved by differentially calculating these components.

FIG. 2 shows another example (based on a method disclosed in, e.g., Japanese Laid-Open Patent Application No. 61-198456 or 61-198457) of an AF error signal detection optical system. Referring to FIG. 2, a light beam emitted from a semiconductor laser 1 as a light source is collimated by a collimator lens 2, and is deflected by a beam splitter 3 toward an objective lens 4. The deflected light beam is converged by the objective lens 4 onto the recording surface of an information recording medium 5. Light (detection light beam) reflected by the information recording medium 5 is transmitted through the objective lens 4 and the beam splitter 3 again, and then reaches a beam splitter 7-$a$ via a halfwave plate 20. The light beam is then split by the beam splitter 7-$a$ into a reflected light beam and a transmission light beam. Of the two split light beams, the transmission light beam is reflected and deflected by a reflection surface 7-$b$, so that the two split light beams emerge in the same direction. The two light beams are transmitted through the pupil range of a single convergent lens 6 from different positions, and become convergent light beams. The two convergent light beams are incident on a single photodetector 10 for detecting an AF error signal. In this case, since the photodetector 10 is arranged at a position shifted from the focal plane of the convergent lens, the light beams reach the photodetector 10 while being spatially separated from each other.

FIG. 3 is a diagram for explaining two photodetection regions of the photodetector 10 and detection signal processing in the prior art shown in FIG. 2. The two light beams are illustrated as hatched circles on the corresponding photodetection regions. Each photodetection region is divided into three portions (light-receiving portions U, V, and W or X, Y, and Z). If signal components from these light-receiving portions are represented by IU, IV, IW, IX, IY, and IZ, as is well known, an AF error signal can be calculated by the following equation upon execution of arithmetic processing via pre-amplifiers 13-$a$ to 13-$c$, summing amplifiers 14-$a$ and 14-$b$, and differential amplifiers 15-$a$ and 15-$b$:

$$AFE=(IV-(IU+IW))+(IY-(IX+IZ))$$

In order to detect the tracking state of a light spot with respect to an information track on an information recording medium by guiding a detection light beam reflected by the information recording medium onto the light-receiving surface of a photodetector, a method of detecting an AT error signal is used. This method normally adopts a known push-pull method, and conventionally, various arrangements for detecting a push-pull signal have been proposed.

FIG. 4 shows an example (e.g., the invention disclosed in Japanese Laid-Open Patent Application No. 62-132242) of an AT error signal detection optical system based on the conventional push-pull method. Note that the example shown in FIG. 4 includes an AF error signal detection mechanism. Referring to FIG. 4, a light beam emitted from a semiconductor laser 1 is collimated by a collimator lens 2, and the collimated beam reaches an objective lens 4 via a beam splitter 3. The collimated beam is converged by the objective lens 4 onto the recording surface of an information recording medium 5. Light (detection light beam) reflected by the information recording medium 5 is transmitted through the objective lens 4 and the beam splitter 3 again, and only light components associated with a beam spot size in a direction parallel to the track direction (e.g., the circumferential direction if the information recording medium 5 has a disk shape) of the recording medium are converged by a cylindrical lens 26. Then, a light beam emerging from the cylindrical lens 26 is split into two beams by a beam splitter 30, and the two beams respectively reach phOtodetectors 10-a and 10-b. The light-receiving surfaces of the photodetectors 10-a and 10-b are arranged at positions separated by a distance W from a plane 25, where the caustic curve of the cylindrical lens 26 is formed, in directions along the optical axes of the incident light beams. More specifically, the light-receiving surface of the photodetector 10-a is shifted in a direction in which the light beam approaches the beam splitter 30, and the light-receiving surface of the photodetector 10-b is shifted in a direction in which the light beam is separated away from the beam splitter 30. FIG. 4(a) shows how to split the photodetection regions of the photodetectors 10-a and 10-b by attaching portions shown by reference numerals 31-a and 31-b to the sides of the photodetectors 10-a and 10-b. The split light-receiving portions 31-a and 31-b of the photodetection regions of the photodetectors 10-a and 10-b are represented by A, B, C, D, E, F, G, and H, as shown in FIG. 5.

FIG. 5 illustrates a state wherein detection light beams 11-a and 11-b are incident on the photodetectors 10-a and 10-b. Referring to FIG. 5, regions 12-a and 12-b illustrated on each of the two detection light beams 11-a and 11-b correspond to portions where some light components of a light spot formed on the information recording medium 5 are diffracted by a guide groove or a pit array, which constitutes an information track on the information recording medium 5, and has a phase structure, and ±1st-order light components are superposed on a 0th-order detection light beam. As is well known, when a light spot formed on the recording medium 5 falls Just on the information track or the middle point between each two adjacent information tracks, the light amounts on the regions 12-a and 12-b are equal to each other; when the light spot falls outside the information track or the middle point between each two adjacent information tracks, the light amounts of the regions 12-a and 12-b are different from each other. The unbalance between the light amounts of the regions 12-a and 12-b occurs in a direction intersecting the track. Therefore, an AT control signal is obtained by comparing the two light amounts and on the basis of the polarities of a light spot movement and a change in light amount, so that the light spot can correctly follow the information track. Such an AT control signal detection method is executed based on the push-pull method. Note that FIG. 5 illustrates the diffraction distribution regions 12-a and 12-b on the detection light beams, which regions are illustrated on the two detection light beams 11-a and 11-b, correspond to the guide groove of the recording medium, and have different brightness levels, for the sake of simplicity. An arrow 22 in FIG. 5 indicates the direction intersecting the tracks. Each of the two detection light beams 11-a and 11-b has an elliptic shape having the major axis in a direction parallel to the arrow 22. This is because the detection light beam is converged by the cylindrical lens 26 in only a direction parallel to the track, and remains collimated in the track intersection direction (arrow 22). If signal components from these regions are represented by IA, IB, IC, ID, IE, IF, IG, and IH, an AT error signal is obtained by arithmetic processing given by the following equation via differential amplifiers 15-a and 15-b and a summing amplifier 14:

AT error signal=(IE−IF)+(IG−IH)

In this example, an AF error signal is detected based on the following principle. More specifically, as in the above-mentioned prior art, the two detection light beams 11-a and 11-b are focused at positions shifted by the same amount W from the plane 25, where the caustic curve of the cylindrical lens 26 is formed, respectively in a direction to approach the convergent lens and in a direction to be separated away from the convergent lens. Therefore, on the photodetectors 10-a and 10-b, the beam spot sizes in the direction parallel to the track change in opposite directions in accordance with a change in focusing state of a light spot for recording/ reproduction on the information recording medium. This is because the detection light beam is converged in only the direction parallel to the track, and remains collimated in the track intersection direction (arrow 22). More specifically, when the objective lens is defocused with respect to the recording medium in a certain direction, if the beam spot size increases in the direction parallel to the track on the photodetector 10-a, the beam spot size decreases in the direction parallel to the track on the photodetector 10-b. In an in-focus state, the sizes of the two detection light beams are almost equal to each other, most of the light components are incident on inner light-receiving portions E, F, G, and H, and almost no light components are incident on the outer light-receiving portions A, B, C, and D. When the objective lens is defocused, as described above, many light components are incident on the light-receiving portions A and B and no light components are incident on the light-receiving portions C and D in correspondence with the defocus direction, or vice versa. Therefore, an AF error signal is obtained by the following calculation via summing amplifiers 14-a and 14-b and a differential amplifier 15:

AF error signal=(IA+IB)−(IC+ID)

When the AT error signal is obtained by the push-pull method, a position shift between the photodetector and the detection light beam in the track intersection direction poses a problem. In this prior art, a problem posed when a position shift of, e.g., optical parts occurs is explained in an example using a normal convex lens. As shown in FIG. 6(a), the detection light beam is converged by the normal convex lens in a circular pattern, light beam components in the regions 12-a and 12-b are respectively received by the light-receiving portions E and F, and a change in light amount balance is detected by comparing the outputs from these light-receiving portions. When the detection light beam causes the above-mentioned position shift, for example, a light beam component in the region 12-b enters the light-receiving portion for receiving the light beam components in the region 12-a, and light beams in the region 12-a fall outside the corresponding light-receiving portion, as shown in FIG. 6(b). As a result, in the AT error signal, a change in balance occurs in the output signals from the detection portions for receiving light beam components from the regions 12-a and 12-b independently of an actual tracking error, and a DC offset component is generated in the AT error signal. When this DC offset component (to be referred to as an offset hereinafter) is generated, a target value of information tracking control is shifted, and the information track can no longer be correctly tracked.

In the above-mentioned prior art, as a countermeasure against this problem, the detection light beam is not converged in the track intersection direction using the cylindrical lens, as shown in FIG. 5. Therefore, in a section in the track intersection direction, since the detection light beam emerging from the objective lens reaches the light-receiving surface of the photodetector while being left collimated, the beam spot size in the track intersection direction on the light-receiving surface of the photodetector becomes larger than the case using the normal convex lens (see FIG. 6). In this case, since the absolute distance of an optical axis shift on the photodetector, which shift is caused by, e.g., a position shift of optical parts does not change much regardless of the types of lenses, when the cylindrical lens is used, an AT error offset due to the influence of the optical axis shift can be relatively reduced.

In the above-mentioned prior art shown in FIG. 2, a convergent light beam incident on the single photodetector 10 is effective for detecting the AT error signal or detecting both the AF error signal and the AT error signal (i.e., MO signal detection). FIGS. 7 and 8 (FIG. 9 for a case including an MO signal) illustrate patterns of the photodetection regions of the photodetector 10. In FIGS. 7 and 8, the detection light beams are denoted by reference numerals. 11-a and 11-b. In FIG. 7, each of the photodetection regions of the photodetector is divided into two light-receiving portions I and J or K and L, and if signal components from these light-receiving portions are represented by II, IJ, IK, and IL, an AT error signal is obtained by the following arithmetic processing:

$ATE=(II-IJ)+(IK-IL)$

Similarly, in FIG. 8, each of the photodetection regions of the photodetector is divided into six light-receiving portions J, K, L, M, N, and O or T, U, V, X, Y, and Z, and if signal components from these light-receiving portions are represented by IJ, IK, IL, IM, IN, IO, IT, IU, IV, IX, IY, and IZ, an AF error signal is obtained by the following arithmetic processing:

$AFE=((IK+IN)-(IJ+IL+IM+IO))+((IU+IY)-(IT+IV+IX+IZ))$

Also, an AT error signal is obtained by the following arithmetic processing:

$ATE=((IJ+IK+IL)-(IM+IN+IO))+((IT+IU+IV)-(IX+IY+IZ))$ (Similarly, an MO signal is obtained by the following arithmetic processing)

$MO=(IJ+IK+IL+IM+IN+IO)-(IT+IU+IV+IX+IY+IZ)$

Thus, the above-mentioned prior art respectively suffer from the following problems. Problems in the prior art shown in FIG. 1 are as follows:

(1) The error signal detection is susceptible to the influence of a position shift of the photodetectors due to the structure of the apparatus. More specifically, since the two photodetectors are separately and independently arranged, when the photodetectors cause a position shift due to a change in temperature or a mechanical disturbance, their output signals are unbalanced, and an AT error signal may be undesirably mixed in an AF error signal. Therefore, since an arrangement for preventing a position shift with high reliability must be adopted, the structure is complicated, resulting in an increase in cost.

(2) Since the detection light beam emerging from the objective lens as a collimated beam must be split as it is, the beam splitter must have a size equal to or larger than the diameter of the light beam, and an arrangement around the AF signal detection optical system (even in MO signal detection together with AF signal detection) of an optical head becomes bulky, thus disturbing a compact apparatus. In particular, when an MO signal is differentially detected, the plane of polarization of the detection light beam is rotated through 45° using a halfwave plate. In this case, in order to reduce parts cost by omitting the halfwave plate, the polarization beam splitter and the reflection mirror must be arranged while being rotated through 45°, and the optical path of the detection optical system cannot be arranged in a plane, thus also disturbing a compact apparatus.

(3) Since the two photodetectors must be separately arranged at different positions, an arrangement around the AF signal detection optical system (even in MO signal detection together with AF signal detection) of the optical head becomes bulky, thus disturbing a compact apparatus, as described above. In addition, since these photodetectors must be independently adjusted, adjustment cost increases. Also, the structure of a stationary portion of each photodetector is complicated, resulting in high working cost.

(4) Since two each of the photodetectors and convergent lenses must be prepared, parts cost of the apparatus increases.

(5) Each photodetector normally adopts a photodiode. In this case, when the two photodetectors are constituted by totally different parts, since chips must be manufactured after they are cut from wafers, differences between the characteristics of the two photodiodes become large, and this adversely influences arithmetic processing of signals.

(6) If priority is placed on easy AF control in association with the S-curve pattern of an AF error signal, the size of the detection region of each of the two photodetectors is preferably set to be smaller than the beam spot size in an in-focus state. However, when the detection region is set to be smaller than the beam spot size in an in-focus state, the amount of light falling outside the detection region must be abandoned. For this reason, all light components as an information signal returned from the recording medium cannot be detected. This is not preferable for assuring a high MO signal to noise ratio when MO signal detection is also executed.

The prior art shown in FIG. 2 can solve some of problems of the above-mentioned prior art. However, other problems are also posed, and remain unsolved. More specifically, these problems are as follows:

(7) Since the two photodetection regions of the photodetector correspond to and are arranged at the positions shifted from the focal plane of the convergent lens by the same amount in the same direction along the optical axis, a pseudo point (e.g., pseudo zero level) indicating the same signal level as that indicating an in-focus state consequently appears in the obtained AF error signal at a position relatively near an in-focus point in addition to a position truly indicating the in-focus point (see FIG. 10). For this reason, a control system must be designed to discriminate such a pseudo point. In addition, since the direction of a diffracted pattern from a guide groove, which pattern is superposed on the detection light beam on the photodetection region is the same as the information track intersection direction, when the photodetector causes a position shift in the information track intersection direction (the direction of the arrow 22, as shown in FIG. 7), if the light beam 11-a is shifted toward the region 12-a on the light-receiving surface of the photodetector, the light beam 11-b is shifted toward the region 12-b. In this manner, even when an AT error signal obtained from the photodetector 10-a is added to an AT error signal obtained from the photodetector 10-b, the AT error offsets of the two signals are added to each other, and their influences remain (see FIG. 11). The arrow 22 indicates a direction (radial direction) perpendicular to the track of the information recording medium.

(8) Since the detection light beam emerging from the objective lens as a collimated beam must be split as it is, the beam splitter must have a size equal to or larger than the diameter of the light beam, and a compact arrangement around the AF signal detection optical system of an optical head cannot be effectively be realized.

(9) Since the two light beams pass the positions largely separated from the optical axis of the convergent lens, they are easily influenced by aberrations.

(10) The number of types of signal components to be calculated is large, a large number of summing amplifiers and differential amplifiers are required, and the number of times of calculation is increased. As a result, noise increases, and cost of electrical parts rises since a countermeasure against noise must be taken.

In particular, item (7) will be described in detail below with reference to the accompanying drawings. FIGS. 11(a) through 11(c) show AF error signal S-curves each obtained by calculating output signals from the three (or six) light-receiving portions of one of the pair of photodetection regions each including the three (or six) light-receiving portions shown in FIG. 3 (or FIG. 8 or 9). The AF error signal obtained from the three (or six) light-receiving portions of either of the pair of photodetection regions has the same S-curve shape.

In FIG. 10, the level of the AF error signal is assumed to be zero in an in-focus state, for the sake of simplicity. More specifically, assume that the relationship between the size of each photodetection region of the photodetector and the beam spot size, the gains of the pre-amplifiers, and the like are set to attain IV=IU+IW and IY=IX+IZ (or IK+IN=IJ+IL+IM+IO and IU+IY=IT+IV+IX+IZ in the case of FIG. 8 or 9) in an in-focus state (of course, if the level of the AF error signal is not zero in an in-focus state, a problem of appearance of a pseudo in-focus level is similarly posed).

As shown in FIG. 10, a pseudo zero level indicating AF signal level=0 appears near the true in-focus point in the obtained AF error signal S-curve although an in-focus state is not attained. This point is the pseudo in-focus point. Since AF servo control may be erroneously executed at this point, a means for preventing this is required.

The reason why the AF error signal S-curve having the same pattern and including a pseudo zero level can only be obtained from either of the pair of photodetectors, as described above, is that the two photodetectors are arranged at the positions shifted from the focal plane of the convergent lens by the same distance in the same direction along the optical axis. Therefore, even when these two AF error signal S-curves are added to each other, only the amplitude of the S-curve waveform changes, and the pseudo zero level shown in FIG. 10 cannot be eliminated from the AF error signal S-curve.

The prior art shown in FIG. 4 also suffers from some problems. These problems are as follows:

(11) In this prior art, the apparatus is arranged with an eye to lowering sensitivity of the AT error offset with respect to the optical axis shift. More specifically, the beam spot size is not converged in the track intersection direction on the light-receiving surface of the photodetector so as to increase the beam spot size in the track intersection direction, thereby relatively decreasing the optical axis position shift. Therefore, AT offsets caused by optical axis position shifts cannot be perfectly removed. The two detection light beams are projected as beams collimated in the track intersection direction onto the light-receiving surfaces of the photodetectors. Therefore, as has been described above in item (7), when optical axis movement occurs in a certain direction due to an inclination of optical system parts before the light beams reach the photodetectors, for example, when the light beam is shifted toward the region 12-a on the photodetector 10-a in FIG. 5, the light beam is also shifted toward the region 12-a on the photodetector 10-b. As a result, AT error signals obtained from the photodetectors 10-a and 10-b include offsets having the same sign. However, since the two AT error signals are added to each other, and the sum signal is used, the AT error offsets are also added to each other, and the sum offset remains. Consequently, generation of an AT error offset can be suppressed but cannot be removed. In order to detect the AT error signal, the two photodetectors and four photodetection regions are used. However, this arrangement is merely adopted due to a limitation imposed by the arrangement of the AF error signal detection system and has no special effect in the detection of the AT error signal. Rather, this arrangement is disadvantageous in terms of noise caused by an increase in the number of amplifiers in the AT error detection system.

(12) In this prior art as well, when the photodetectors cause a position shift due to a change in temperature or a mechanical disturbance, independent position shifts occur since there are two different photodetectors. More specifically, even when one photodetector causes a position shift, the AF error signal is unbalanced, and the AT error signal may be mixed in the AF error signal. Furthermore, an AT error offset may be generated, and the amplitude of the AT error signal may decrease. In this prior art, although the sensitivity of the AT error offset with respect to the optical axis shift is lowered, another offset generation factor is added due to the arrangement of the two independent photodetectors.

(13) Since the beam spot size corresponds to that of a convergent light beam in a section in a direction parallel to the track on the light-receiving surface of the photodetector, the sensitivity to the optical axis shift in this direction is not low. More specifically, when an optical axis position shift occurs in the direction parallel to the track, since the light beam is converged in the direction parallel to the track on the light-receiving surface of the photodetector, many light beam components fall outside the photodetection region even by a small position shift distance which is allowable in the track intersection direction, thus causing an unbalance of the AF error signal, a decrease in amplitude of the AT error signal, and the like. Even when the sensitivity of generation of an AT offset is lowered with respect to only an optical axis position shift in the track intersection direction, since the sensitivity in the direction parallel to the track is the same as that in the conventional apparatus, it is practically difficult to relax a countermeasure against the optical axis shift.

(14) As is pointed out in the above-mentioned prior art, the detection light beam emerging from the objective lens is converged in the section in only one direction in this prior art as well, and the detection light beam must be split as a collimated beam in the section in the other direction. For this reason, the beam splitter must have a size equal to or larger than the diameter of the collimated beam in at least one direction, and an arrangement around the AF and AT signal detection optical systems of an optical head becomes bulky, thus disturbing a compact apparatus.

The problems of the above prior art (see items (7) and (11)) will be described below with reference to FIGS. 11(a) through 11(c). FIGS. 11(a) and 11(b) schematically show AT signal waveforms obtained from the two split photodetection regions when the light spot intersects a track on the information recording medium 5. Referring to FIGS. 11(a) and (b), offsets Δ1 and Δ2 appear in differential signals of the two-split photodetector when the detection light beams cause position shifts in the same direction with respect to the track intersection direction. In the above-mentioned prior art, differential signals from the photodetectors are added to each other to obtain a final AT error signal. The addition result signal is shown in FIG. 11(c). As indicated by Δ1+Δ2 in FIG. 11(c), offsets of the AT error signals are added to each other, and the sum offset remains, thus adversely influencing tracking precision. In general, when an offset is generated by an optical axis shift, the amplitude of the AT error signal decreases. When an optical axis shift occurs, since AT error signal components cancel each other due to the influence of a neighboring diffraction region of the detection light beam on the two-split photodetector (for example, a light beam in the region 12-b is mixed upon detection of the region 12-a), the amplitude of the AT error signal always decreases, and the influence of the offset is further emphasized relatively. It is, therefore, important to suppress generation of the offset.

SUMMARY OF THE INVENTION

The present invention has been made in consideration of the above situation, and has as its object to provide an optical information recording/reproduction apparatus, which can arrange a photodetector at one position so as to solve the problems of the prior art, i.e., the problems caused by using two independent photodetectors, in particular, instability of a servo signal caused by an optical axis position shift, and problems associated with the number of divisions of a light-receiving region.

More specifically, the basic principle of the present invention is to split a detection light beam after the light beam is converged, to detect a light beam at two positions corresponding to positions before and after the focal plane of a lens for converging a detection light beam, and to basically detect light beams using a single light-receiving surface, e.g., using two photodetection regions formed on a single photodiode substrate.

In this case, the number of photodetection regions of a photodetector for detecting one light beam may be set to be substantially one, and the width of the photodetection region may be set to be a predetermined size smaller than the beam spot size on the light-receiving surface of the photodetector in an in-focus state. Alternatively, the photodetection region of the photodetector for detecting one light beam may be split into a plurality of portions. In addition, the photodetection region for detecting an AF error signal may be designed to detect an AT error signal, and to detect an MO signal.

For this reason, the first arrangement of the present invention comprises: means for converging a detection light beam from an information recording medium; first means for splitting the converged detection light beam into two light beams; second means for guiding the two light beams to one light-receiving surface, which can receive the two split light beams, via optical paths having different optical path lengths; and an integrated photodetector comprising at least two photodetection regions for receiving the light beams on the light-receiving surface, wherein the second means has an arrangement for guiding the two split light beams, so that one of the two split light beams is projected onto the light-receiving surface before it passes a convergent point, and the other light beam is projected onto the light-receiving surface after it has passed the convergent point, a size in a certain direction of each photodetection region of the photodetector is set to be smaller than a beam spot size on the light-receiving surface of the photodetector in an in-focus state, and the photodetector comprises means for detecting focusing error signals from the light beams on the light-receiving surface by the photodetection regions.

In this case, the size of each photodetection region, set to be smaller than the beam spot size, for detecting the focusing error signal preferably satisfies [$0.4r \leq e \leq 1.6r$] where e is the size of the photodetection region, and r is the radius of the detection light beam in an in-focus state. Also, the size of each photodetection region preferably satisfies [$d-2r \leq h \leq d+2r$] where r is the radius of the detection light beam in an in-focus state, h is the interval between the centers of the photodetection regions on the light-receiving surface of the photodetector, which interval is measured along a direction parallel to a track on which a signal is recorded (track direction), and d is the interval between the centers of the detection light beams, which interval is measured along the track direction.

The second arrangement of the present invention comprises: means for converging a detection light beam from an information recording medium; first means for splitting the converged detection light beam into two light beams; second means for guiding the two light beams to one light-receiving surface, which can receive the two split light beams, via optical paths having different optical path lengths; and an integrated photodetector comprising at least two photodetection regions each having two-split light-receiving portions for receiving the light beams on the light-receiving surface, wherein the second means has an arrangement for guiding the two split light beams, so that one of the two split light beams is projected onto the light-receiving surface before it passes a convergent point, and the other light beam is projected onto the light-receiving surface after it has passed the convergent point, a size in a certain direction of each photodetection region of the photodetector is set to be smaller than a beam spot size on the light-receiving surface of the photodetector in an in-focus state, and the photodetector comprises means for detecting tracking error signals from the light beams on the light-receiving surface by the light-receiving portions of the photodetection regions.

In this case, the size of each photodetection region, set to be smaller than the beam spot size, for detecting the tracking error signal preferably satisfies [$0.4r \leq e$] where e is the size of the photodetection region, and r is the radius of the detection light beam in an in-focus state. Also, the size of each photodetection region preferably satisfies [$d-2r+e \leq h \leq d+2r-e$] where e is the size of the photodetection region, r is the radius of the detection light beam in an in-focus state, h is the interval between the centers of light-receiving portions on each photodetection region on the light-receiving surface of the photodetector, which interval is measured along a direction corresponding to a track on which a signal is recorded (track direction), and d is the interval between the centers of the detection light beams, which interval is measured along the track direction.

The third arrangement of the present invention comprises: means for converging a detection light beam from an information recording medium; first means for splitting the converged detection light beam into two light beams; second means for guiding the two light beams to one light-receiving surface, which can receive the two split light beams, via optical paths having different optical path lengths; and an integrated photodetector comprising at least two photodetection regions each having two-split light-receiving portions for receiving the light beams on the light-receiving surface, wherein the second means has an arrangement for guiding the two split light beams, so that one of the two split light beams is projected onto the light-receiving surface before it passes a convergent point, and the other light beam is projected onto the light-receiving surface after it has passed the convergent point, a size in a certain direction of each photodetection region of the photodetector is set to be smaller than a beam spot size on the light-receiving surface of the photodetector in an in-focus state, and the photodetector comprises means for detecting focusing error signals and tracking error signals from the light beams on the light-receiving surface by the light-receiving portions of the photodetection regions.

In this case, the size of each photodetection region, set to be smaller than the beam spot size, for detecting the focusing error signal and the tracking error signal preferably satisfies $[0.4r \leq g \leq 1.6r]$ where g is the size of each photodetection region, and r is the radius of the detection light beam in an in-focus state. Also, the size of each photodetection region, which size is set to be smaller than the beam spot size, preferably satisfies $[d-2r+e \leq h \leq d+2r-e]$ where e is the size of the photodetection region, r is the radius of the detection light beam in an in-focus state, h is the interval between the centers of light-receiving portions on each photodetection region on the light-receiving surface of the photodetector, which interval is measured along a direction corresponding to a track on which a signal is recorded (track direction), and d is the interval between the centers of the detection light beams, which interval is measured along the track direction.

Furthermore, in each of the arrangements of the present invention, the integrated photodetector comprising the photodetection regions is preferably constituted by forming all the photodetection regions on a single chip. The integrated photodetector comprising the photodetection regions preferably incorporates, in its package, input-stage amplifiers corresponding to the photodetection regions, and arithmetic devices for calculating signals from the photodetection regions. The first means for splitting the detection light beam into two beams preferably comprises a polarization beam splitter, and the polarization beam splitter is preferably arranged so that the incident surface of the splitter is rotated through 45° about the optical axis of incident light with respect to the plane of polarization of linearly polarized light emitted from a light source.

DETAILED DESCRIPTION OF THE PREFERRED EMBODIMENTS

Figure 12:
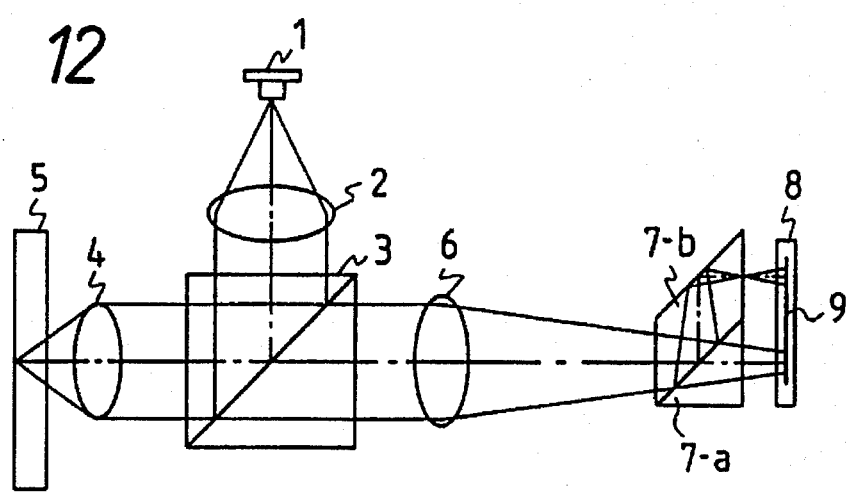
FIG. 12 is a schematic view showing the first embodiment of an optical system of an optical head for explaining an embodiment corresponding to, e.g., AF/AT error signal detection according to the present invention.

The preferred embodiments of an optical information recording/reproduction apparatus according to the present invention will be described in detail hereinafter with reference to the accompanying drawings. The first embodiment (for AF signal detection) of the present invention will be described below with reference to FIGS. 12 to 19. Referring to FIG. 12, a light beam emitted from a semiconductor laser 1 as a light source is collimated by a collimator lens 2, and the collimated beam is deflected by a beam splitter 3 to reach an objective lens 4. The collimated beam is converged by the objective lens 4 to form a light spot on the recording surface of an information recording medium 5. Light (detection light beam) reflected by the information recording medium 5 is transmitted through the objective lens 4 again, and is then converged by a convergent lens 6 via the beam splitter 3. The convergent light beam is split into a reflected light beam and a transmitted light beam by a beam splitter 7-a. Since the detection light beam passes along the optical axis of the convergent lens, it is not influenced by aberrations of the peripheral portion of the lens. In addition, since the detection light beam is split after it is converged, the two split light beams are not influenced by different aberrations. Of the split light beams, the reflected light beam is reflected and deflected again by a reflection surface 7-b separately provided to the beam splitter 7-a. Therefore, the reflected and transmitted light beams emerge in the same direction. The two convergent light beams become incident on a photodetector 8 whose light-receiving surface is arranged in correspondence with positions which are shifted from the focal plane of the convergent lens by the same distance in opposite directions, in a state wherein the two beams are spatially separated from each other on the light-receiving surface. In this manner, since the light-receiving surface of the photodetector is arranged in a convergent optical path, the effective beam spot sizes of the beam splitter 7-a and the reflection surface 7-b can be smaller than in a case wherein the collimated light beam returned from the objective lens 4 is split into two beams, thus contributing to a compact apparatus.

Figure 13:
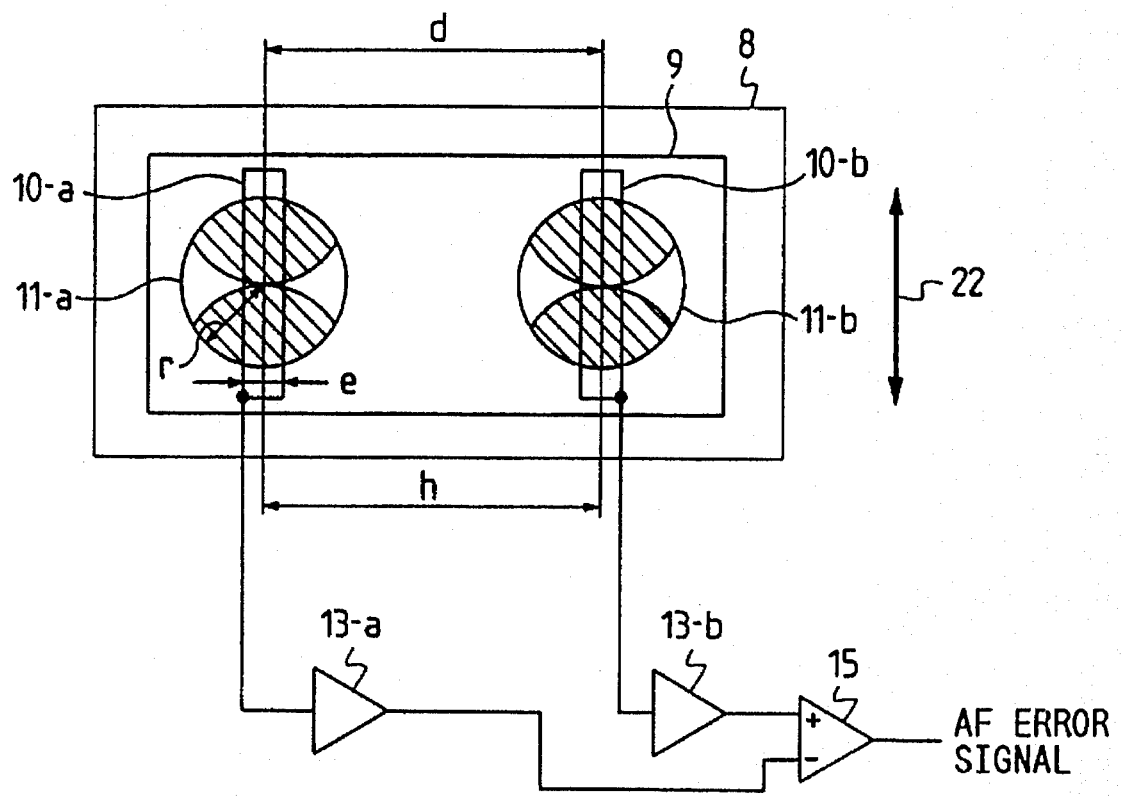
FIG. 13 is a schematic diagram showing a photodetector and its detection circuit for AF error signal detection according to the present invention.

FIG. 13 is a diagram showing the light-receiving surface of the photodetector 8 when viewed from the incident direction of the light beams. The photodetector 8 shown in FIG. 13 has a clear mold package shape. A photodiode chip 9 is formed on the photodetector 8. Photodetection regions 10-a and 10-b for detecting AF error signals from the two split light beams are formed on the light-receiving surface of the photodiode chip 9. Note that the two split light beams in an in-focus state are indicated by received light regions 11-a and 11-b (hatched portions). When the information recording medium has a continuous guide groove, a diffraction distribution from the guide groove appears in the received light regions 11-a and 11-b. Therefore, in FIG. 13, when the information recording medium has a disk shape, the direction of an arrow 22 indicates a direction (radial direction) perpendicular to a track of the information recording medium.

Referring to FIG. 13, for example, when the recording medium has a disk shape, if r represents the radius of the detection light beam on the light-receiving surface of the photodetector in an in-focus state, e represents the size (width) smaller than at least the detection beam spot size of each of the two photodetection regions, h represents the interval between the centers of the two photodetection regions, which interval is measured along the circumferential direction (the direction perpendicular to the arrow 22), and d represents the interval between the centers of the two detection light beams, which interval is measured along the circumferential direction (the direction perpendicular to the arrow 22), r, h, and d preferably satisfy the following relation:

$d-2r \leq h \leq d+2r$

Figure 14:
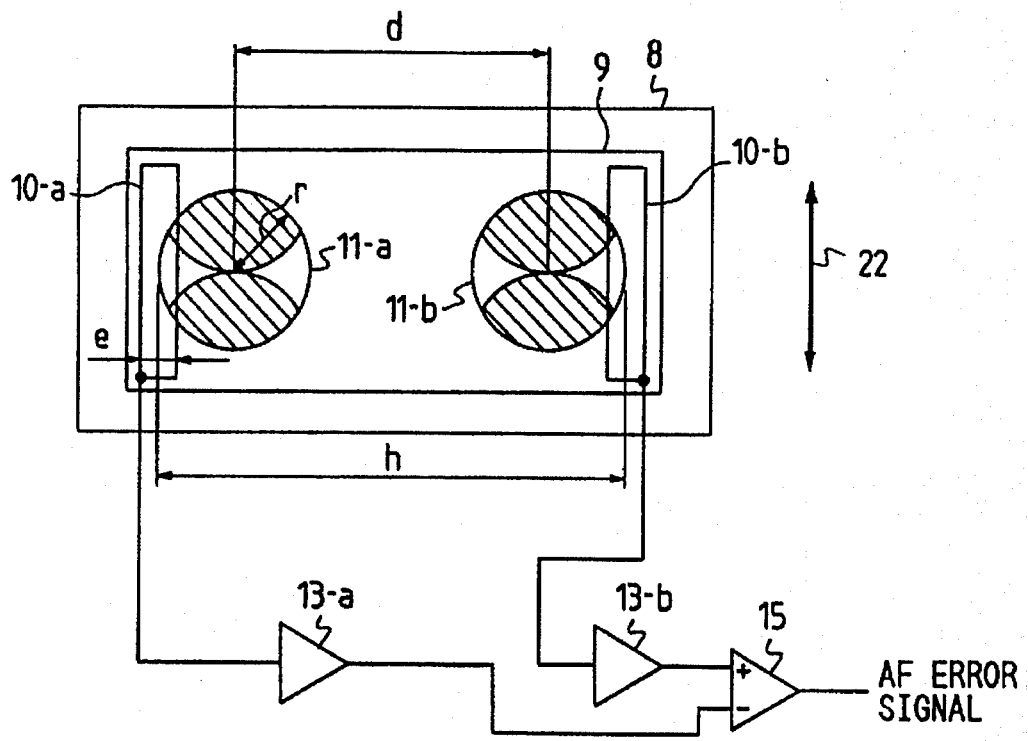
FIG. 14 is an explanatory view for explaining the arrangement condition of the photodetector shown in FIG. 13 and detection light beams.
Figure 15:
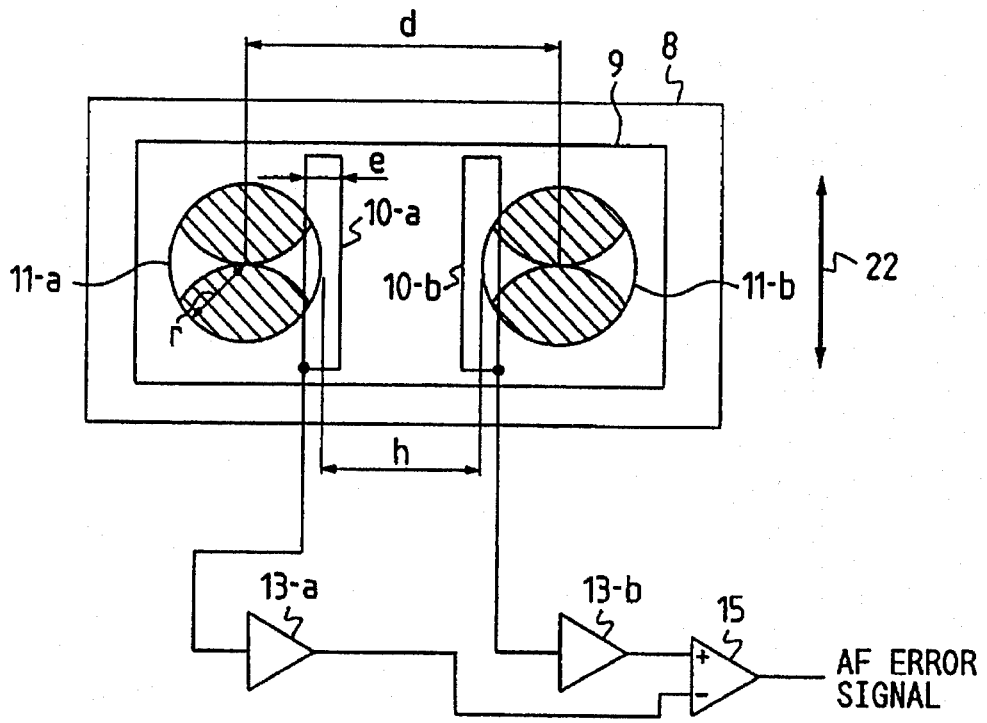
FIG. 15 is an explanatory view for explaining the arrangement condition of the photodetector shown in FIG. 13 and detection light beams.

FIGS. 14 and 15 respectively show the positional relationships between the light beams and the photodetection regions in correspondence with the upper and lower limits of this relation. Since a deviation from this positional relationship results in a considerable decrease in amplitude of an AF error signal, a tolerance must be distributed to satisfy the positional relationship upon designing components.

An AF error signal is obtained by differentially calculating the output signals from the photodetection regions 10-a and 10-b, as shown in FIG. 13. More specifically, the two photodetection regions are adjusted, so that the beam spot sizes on the common light-receiving surface are equal to each other in an in-focus state, and the two photodetection regions and the two light beam positions are symmetrical with each other. Therefore, the amount of light incident on the photodetection region 10-a is equal to that of light incident on the photodetection region 10-b. When the information recording medium is shifted from an in-focus state for the objective lens in a certain direction, e.g., when the diameter of the light region (received light region) 11-a of the light beam on the photodetection region 10-a decreases, since the amount of light incident on the photodetection region 10-a increases, the output signal from the photodetection region 10-a increases. At the same time, since the diameter of the light region 11-b of the light beam on the photodetection region 10-b increases, and the amount of light incident on the photodetection region 10-b decreases, the output signal from the photodetection region 10-b decreases. The difference between the output signals from the photodetection regions 10-a and 10-b is calculated as follows:

AF error signal=(output from region 10-b)−(output from region 10-a)

The calculation result indicates a negative level. When the shift direction of the information recording medium from the in-focus state for the objective lens is reversed to the above-mentioned direction, the calculation result indicates a positive level. As described above, since the differentially calculated AF error signal indicates zero in the in-focus state or indicates a positive or negative level according to the shift direction from the in-focus state, it can be used in AF error control. Note that the circuit shown in FIG. 13 includes pre-amplifiers 13-a and 13-b as arithmetic devices corresponding to the photodetection regions 10-a and 10-b, and a differential amplifier 15 as an arithmetic device for obtaining an AF error signal.

In practice, since a semiconductor such as a photodiode may be used as the photodetector, the photodetection regions can be constituted by forming the photodiode on a silicon wafer using a photomask. In this case, since both the photodetection regions 10-a and 10-b are simultaneously formed on a single silicon wafer, the number of photodetectors can be reduced to one, and parts cost can be reduced as compared to a case wherein two photodetectors must be independently used. Furthermore, since the two photodetection regions are formed on a single silicon wafer, a variation in light-receiving characteristics of each photodetection region can be minimized. In addition, the two photodetection regions can have very high positional precision since the positional precision is determined by the manufacturing precision of the photomask.

Furthermore, in the arrangement of the above embodiment, since the single photodetector need only be arranged at a single position, the shape of a mounting portion is simple, thus allowing easy working and assembling of these components. Also, as for adjustment of the photodetector, since only one photodetector need only be adjusted, the adjustment process can be simplified. As an especially remarkable advantage, even when a slight position shift between the photodetector and detection light beams, which often poses a serious problem in such an apparatus, occurs, it will not adversely influence quality of the AF error signal. When the photodetector is adjusted to a predetermined position with respect to the light beam, and is then fixed by certain means such as an adhesive, screws, or the like, the light beam, which was to be radiated onto the predetermined position of the photodetection region, may be laterally shifted within the light-receiving surface due to factors such as shrinkage of the adhesive, thermal expansion of metal parts, shock, and the like. However, the present invention conquers this position shift. This is for the following reasons. That is, since the two photodetection regions are formed on a single wafer, they never move separately, and even if the package of the photodetector suffers from a position shift, the two photodetection regions move by the same amount in the same direction all the time. Therefore, the signals output from the two photodetection regions change at the same rate, and a balance after calculation is never lost. As a result, even when the amplitude of the AF error signal changes slightly, the signal level indicating an in-focus point is left unchanged. This effect can be similarly obtained even when the detection light beam suffers from a position shift. This is because even when the position where the light beam is transmitted through the beam splitter 7-a is shifted, since the radiation positions of the two beams on the light-receiving surface of the photodetector move by the same amount in the same direction, the same effect as described above is obtained.

In this manner, the present invention comprises: means for converging a detection light beam from an information recording medium; first means for splitting the converged detection light beam into two light beams; second means for guiding the two light beams to one light-receiving surface, which can receive the two split light beams, via optical paths having different optical path lengths; and an integrated photodetector comprising at least two photodetection regions for receiving the light beams on the light-receiving surface, wherein the second means has an arrangement for guiding the two split light beams, so that one of the two split light beams is projected onto the light-receiving surface before it passes a convergent point, and the other light beam is projected onto the light-receiving surface after it has passed the convergent point, a size in a certain direction of each photodetection region of the photodetector is set to be smaller than a beam spot size on the light-receiving surface of the photodetector in an in-focus state, and the photodetector comprises means for detecting focusing error signals from the light beams on the light-receiving surface by the photodetection regions.

The AF error signal detection optical system according to the above-mentioned embodiment of the present invention can be applied to AF error signal detection optical systems of various optical disk heads for a phase-change disk, CD, and the like as well as an optical head for a magnetooptical disk.

Figure 16:
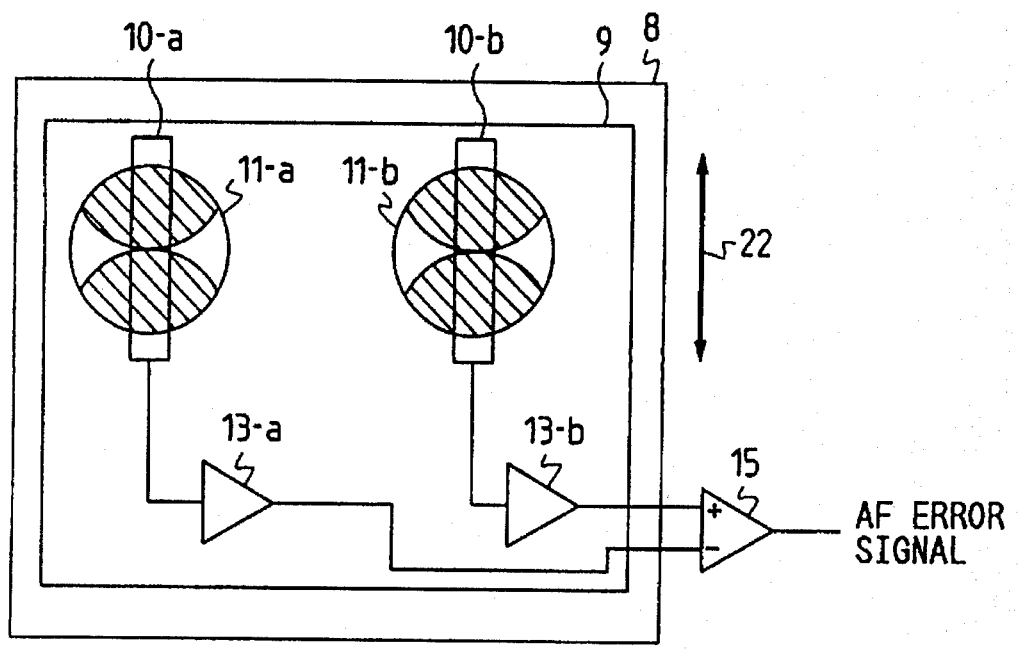
FIG. 16 is a schematic diagram showing another embodiment of a photodetector and its detection circuit for AF error detection according to the present invention.

A modification shown in FIG. 16 has a characteristic feature on its arrangement in which a clear mold package of the photodetector incorporates the pre-amplifiers 13-a and 13-b corresponding to the photodetectors 10-a and 10-b. In this case, since a semiconductor such as a photodiode may be used as the photodetector, the photodetection regions can be constituted by forming a photodiode on a silicon wafer using a photomask. The above-mentioned pre-amplifier circuits can be formed on the same silicon wafer in the same process. For this reason, the output signals from the photodetection regions are output after they are amplified by the pre-amplifiers formed in the package (e.g., a clear mold package) of the photodetector. In this manner, since the pre-amplifier circuits are formed on a single silicon wafer, a variation in characteristics of the amplifiers can be suppressed, and the mounting space of the circuits can be reduced.

Figure 17:
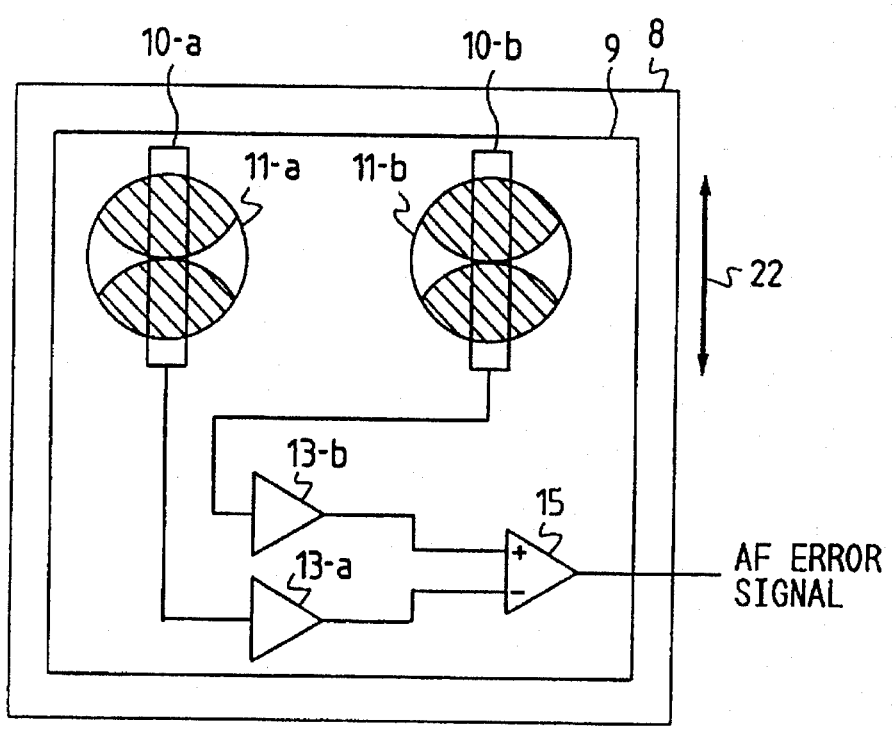
FIG. 17 is a schematic diagram showing still another embodiment of a photodetector and its detection circuit for AF error detection according to the present invention.

A modification shown in FIG. 17 has a characteristic feature on its arrangement in which a clear mold package of the photodetector incorporates the pre-amplifiers 13-a and 13-b corresponding to the photodetectors 10-a and 10-b, and the differential amplifier 15 for obtaining an AF error signal. In this modification, the modification shown in FIG. 16 is further extended, and the differential amplifier 15 is also formed on the silicon wafer together with the photodiode. Therefore, a further effect is expected as compared to the modification shown in FIG. 16. Note that an operational amplifier to be incorporated is not limited to the differential amplifier, but may be a summing amplifier. The light regions 11-a and 11-b of the light beams shown in FIGS. 16 and 17 correspond to the split light beams on the light-receiving surface of the photodetector in an in-focus state.

Figure 18:
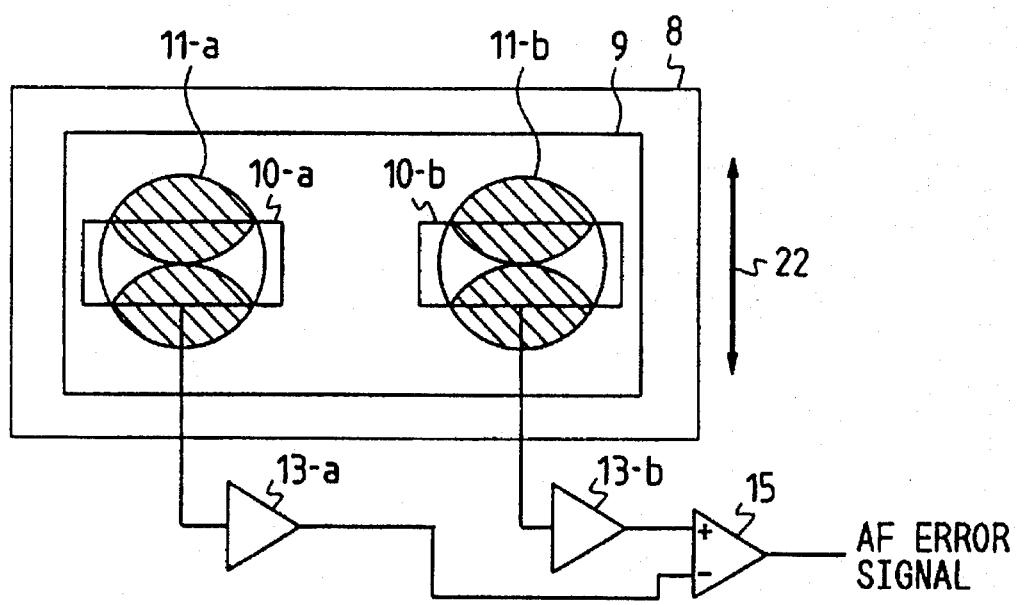
FIG. 18 is a schematic diagram showing still another embodiment of a photodetector and its detection circuit for AF error detection according to the present invention.
Figure 19:
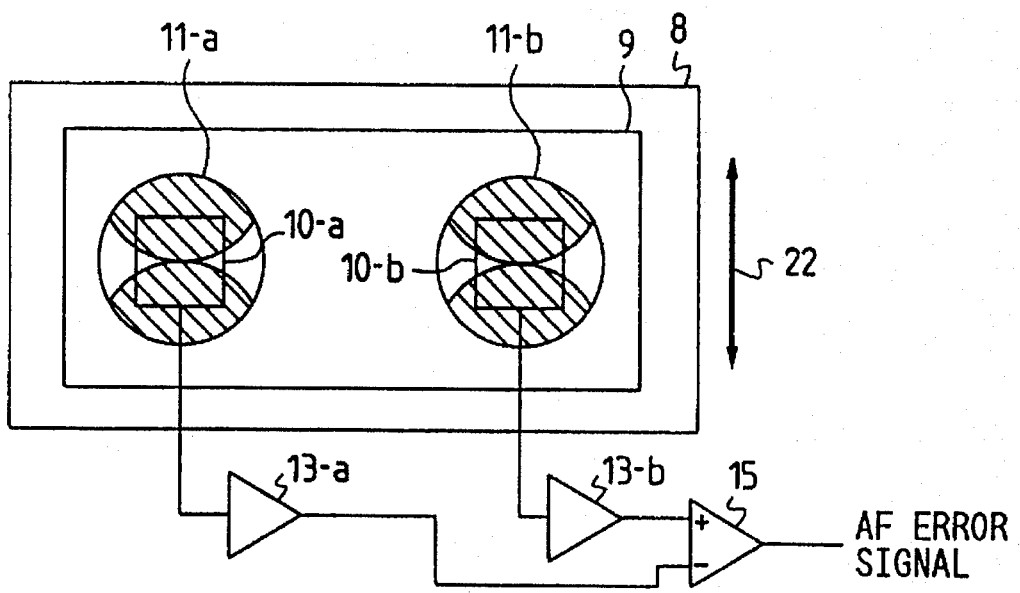
FIG. 19 is a schematic diagram showing still another embodiment of a photodetector and its detection circuit for AF error detection according to the present invention.

Modifications shown in FIGS. 18 and 19 correspond to embodiments wherein the shape of each photodetection region of the photodetector shown in FIG. 13 is changed. In the embodiment shown in FIG. 18, as for a disk-shaped recording medium, the length of each photodetection region is set to be smaller than the beam spot size in an in-focus state in the radial direction (arrow 22). In this embodiment, when the information recording medium has a continuous guide groove, a diffraction distribution from the guide groove appears in hatched portions illustrated in the light beams 11-a and 11-b, and the ratio of light incident on each photodetection region decreases. Since this diffraction distribution varies independently of an in-focus state when the light spot intersects the guide groove, it appears as crosstalk from an AT error signal to an AF error signal, and disturbs stable AF control. However, in the embodiment shown in FIG. 18, this influence can be eliminated for the above-mentioned reason.

In the embodiment shown in FIG. 19, as for a disk-shaped recording medium, the length and width of each photodetection region are set to be smaller than the beam spot size in an in-focus state in two directions, i.e., the radial direction (arrow 22) and the circumferential direction. In this embodiment, although the light amount which contributes to AF error signal detection decreases as compared to other embodiments, since the area of each photodetection region can be decreased, the influence of noise can be eliminated. In particular, when noise reduction is strongly demanded in terms of the characteristics of a photodetector, this arrangement is effective.

Figure 20:
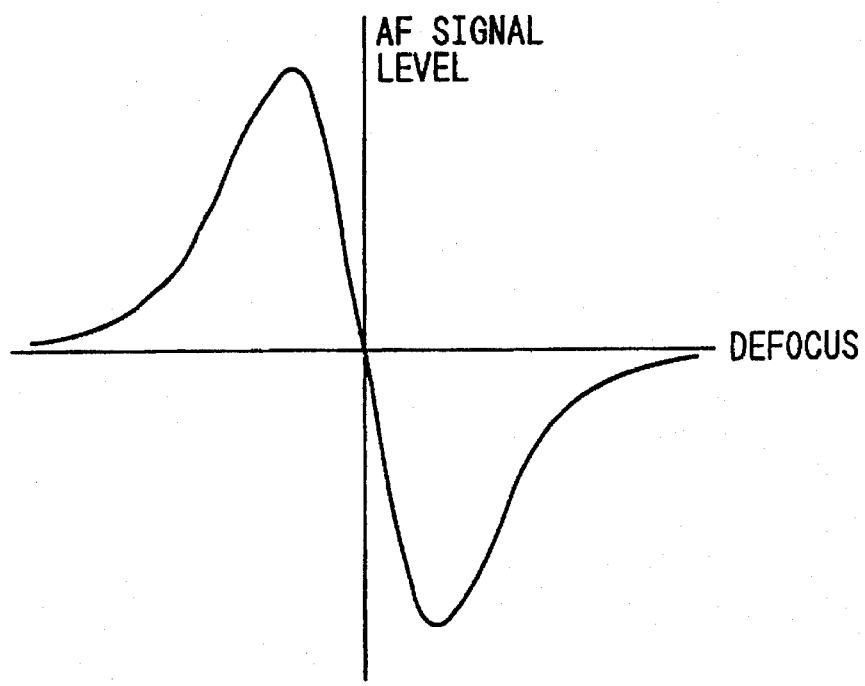
FIG. 20 is a graph showing an S-curve of an AF error signal according to the present invention.
Figure 21:
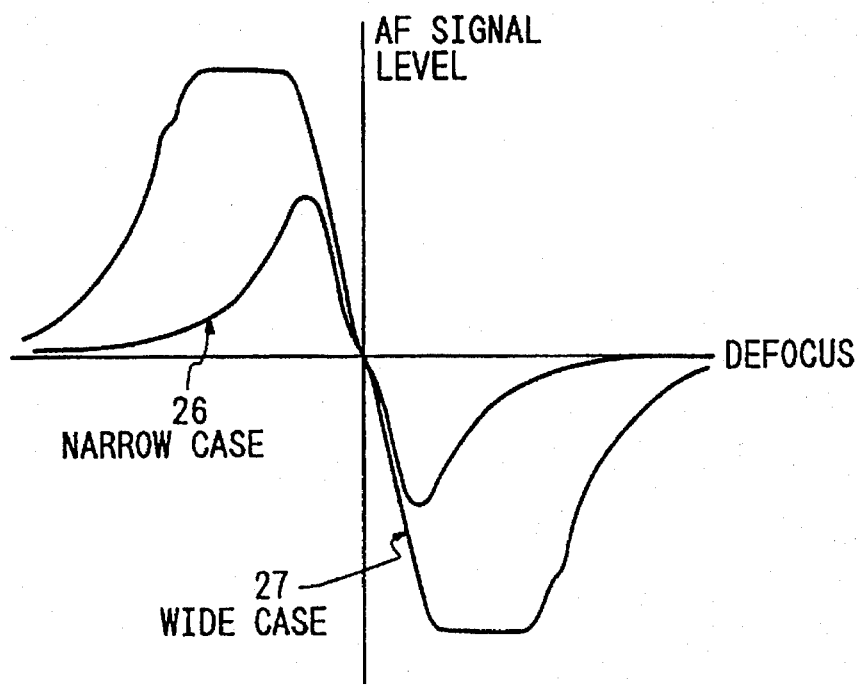
FIG. 21 is an explanatory view for explaining an S-curve of an AF error signal according to the present invention.

FIGS. 20 and 21 are graphs each for explaining the relationship between the size of the photodetection region of the photodetector according to the present invention, and an S-curve pattern of an AF error signal. For example, when the photodetector shown in FIG. 13 is used, the size (width) of the photodetection region in a direction corresponding to the direction perpendicular to the arrow 22 in FIG. 13 (i.e., the circumferential direction for a disk-shaped information recording medium) is set to be smaller than the beam spot size in an in-focus state. In this manner, according to the present invention, it is effective to set the size (width) e of the photodetection region in the direction in which the size is set to be smaller than the beam spot size in an in-focus state is set within a range satisfying the following relation:

$0.4r \leq e \leq 1.6r$

Note that the direction of the size of the photodetection region, which size is to be set to be smaller than the beam spot size, is not always limited to the direction corresponding to the direction perpendicular to the arrow 22 in FIG. 13 as in the embodiments shown in FIGS. 18 and 19, as a matter of course.

Figure 1:
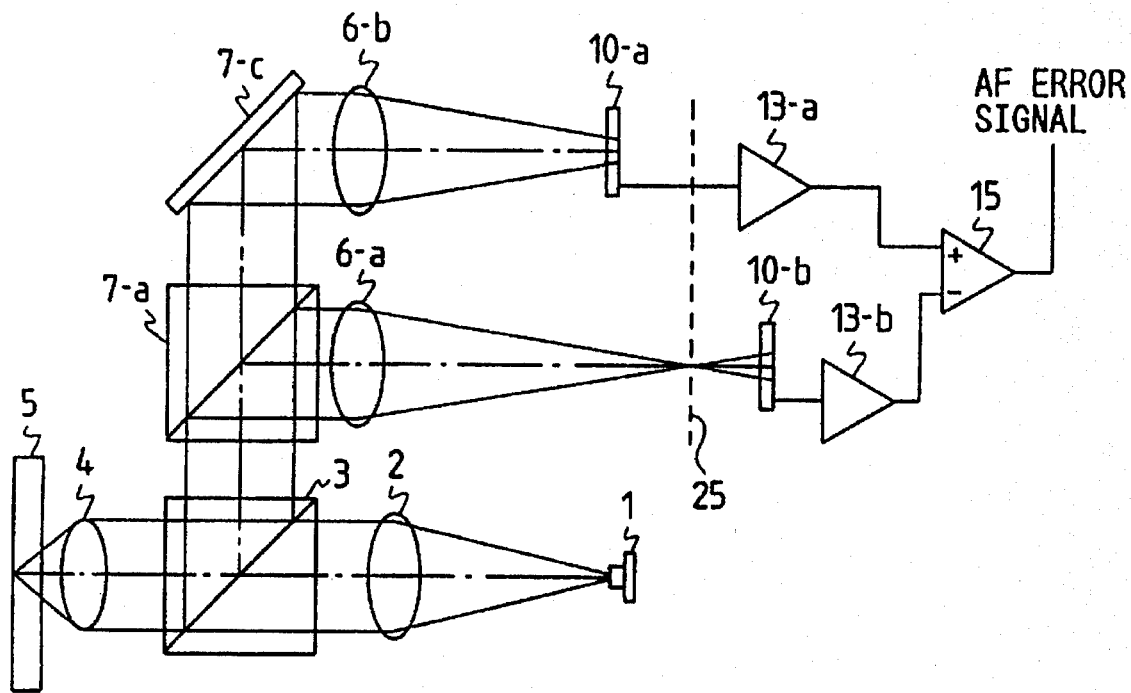
FIG. 1 is a schematic view showing an optical system of an optical head for AF/AT error signal detection or/and MO signal detection according to the first prior art.
Figure 2:
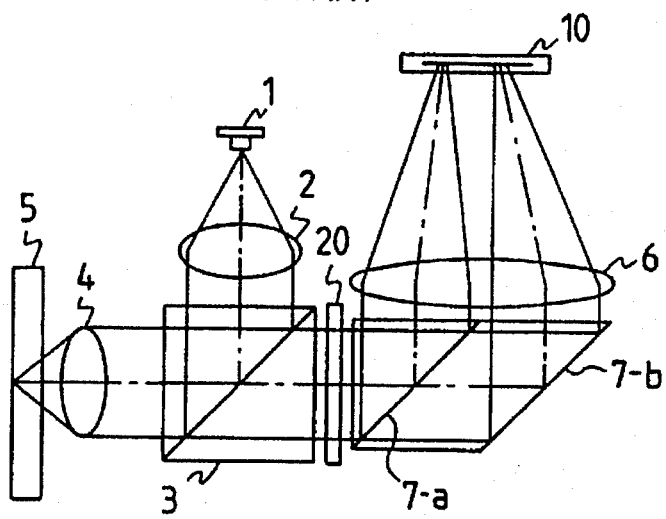
FIG. 2 is a schematic view showing an optical system of an optical head for AF/AT error signal detection or/and MO signal detection according to the second prior art.
Figure 3:
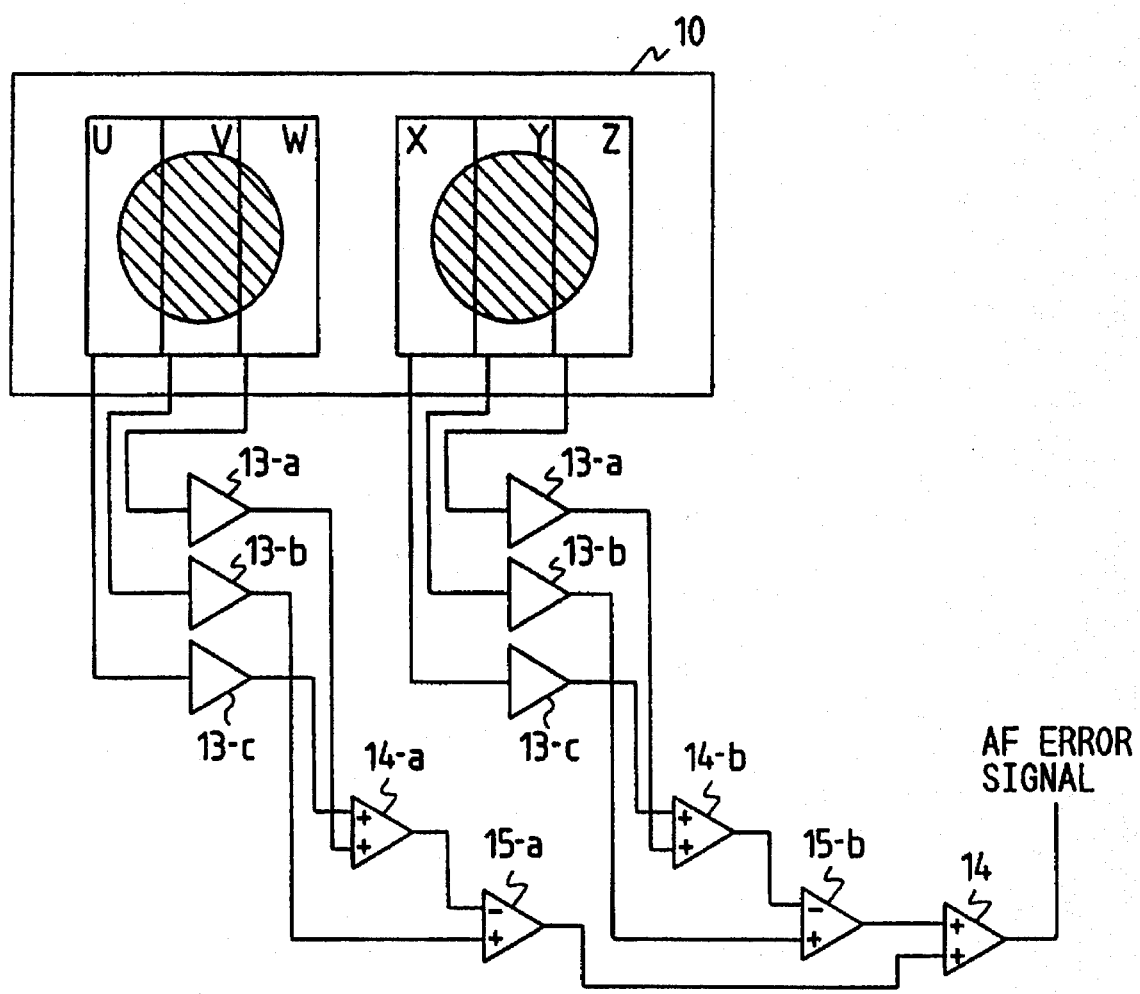
FIG. 3 is a schematic diagram showing a photodetector and its detection circuit for conventional AT error signal detection.
Figure 4A:
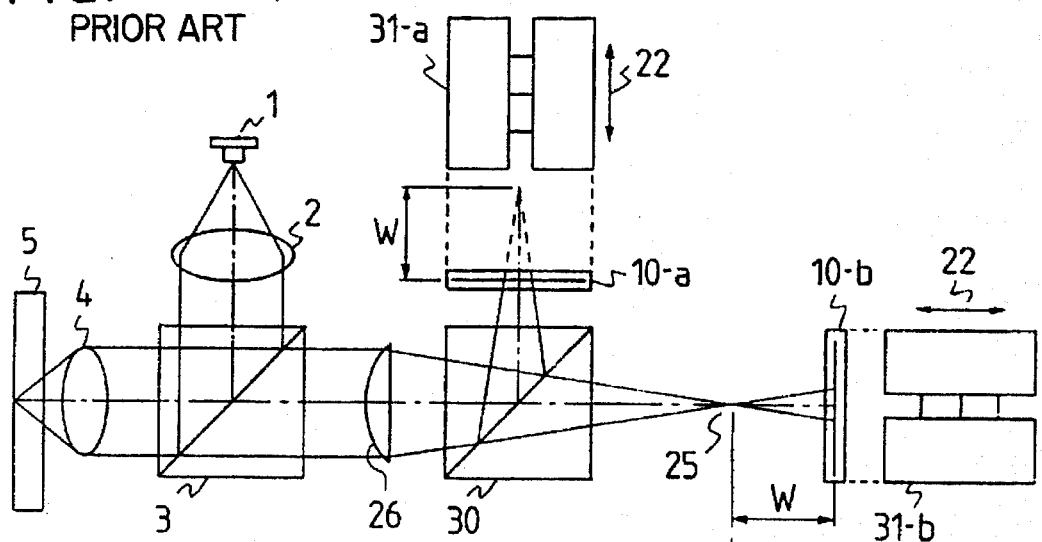
FIGS. 4(a) and 4(b) are schematic views showing an optical system of an optical head for AF/AT error signal detection or/and MO signal detection according to the third prior art, wherein FIGS. 4(a) and (b) are respectively a schematic plan view and a schematic side view.
Figure 4B:
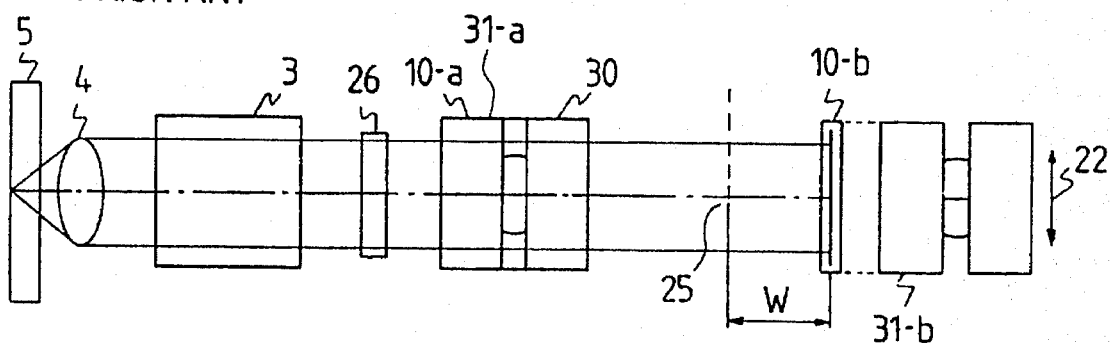
Figure 5:
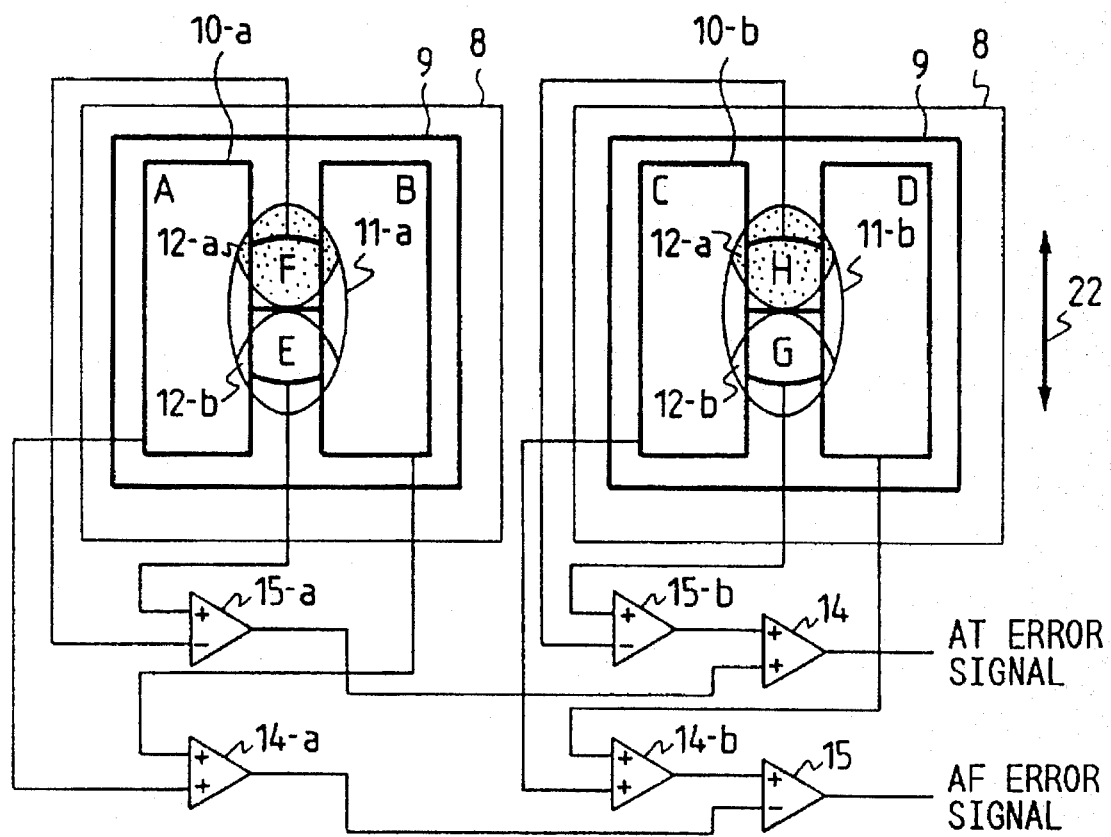
FIG. 5 is a schematic diagram showing photodetectors and a detection circuit for conventional AF/AT error signal detection.
Figure 6A:
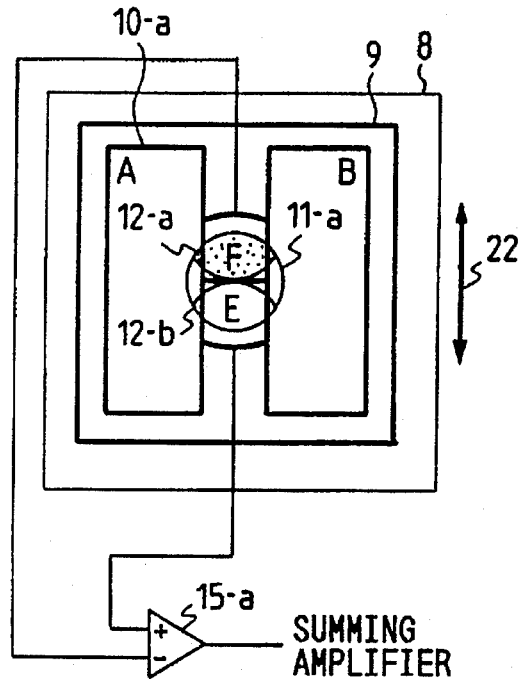
FIGS. 6(a) and 6(b) are explanatory views showing the arrangement conditions of the photodetector shown in FIG. 5 and detection light beams for the AF/AT error signal detection.
Figure 6B:
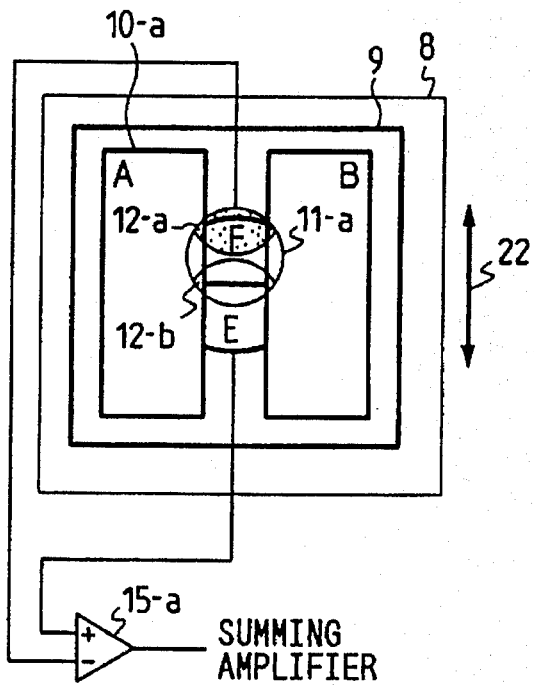
Figure 7:
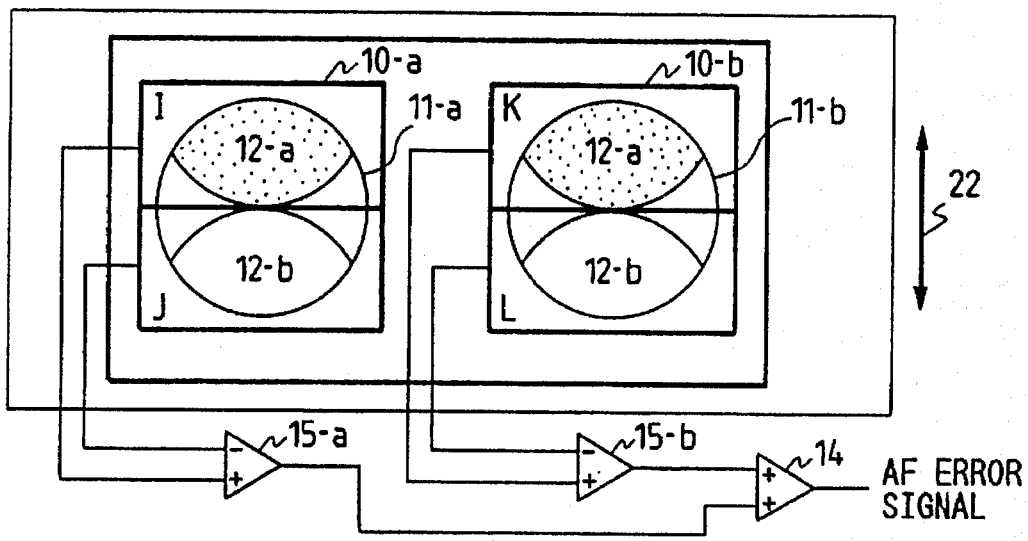
FIG. 7 is a schematic diagram showing another arrangement of a photodetector for conventional AF error signal detection.
Figure 8:
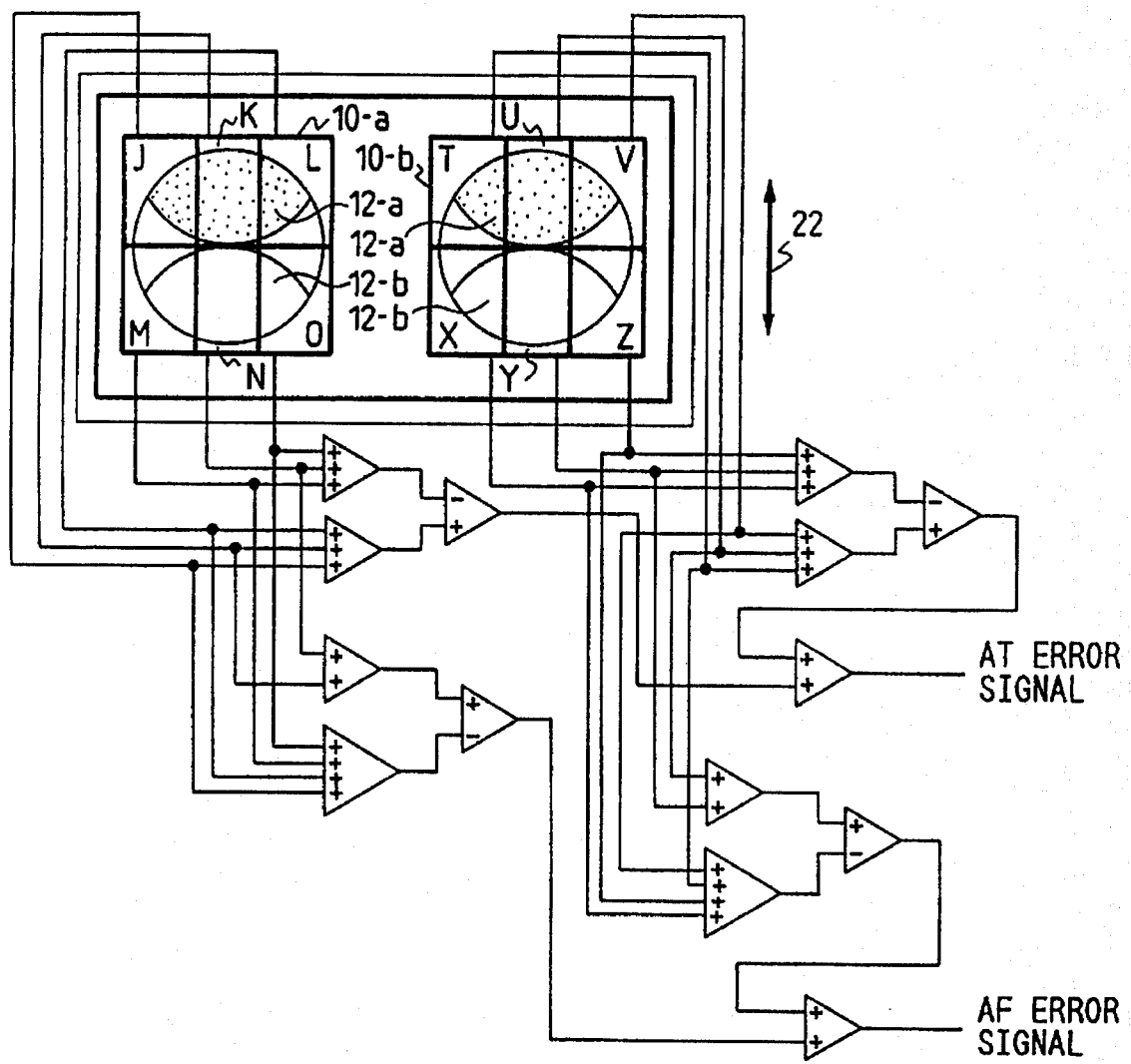
FIG. 8 is a schematic diagram showing another arrangement of a photodetector for conventional AF/AT error signal detection.
Figure 9:
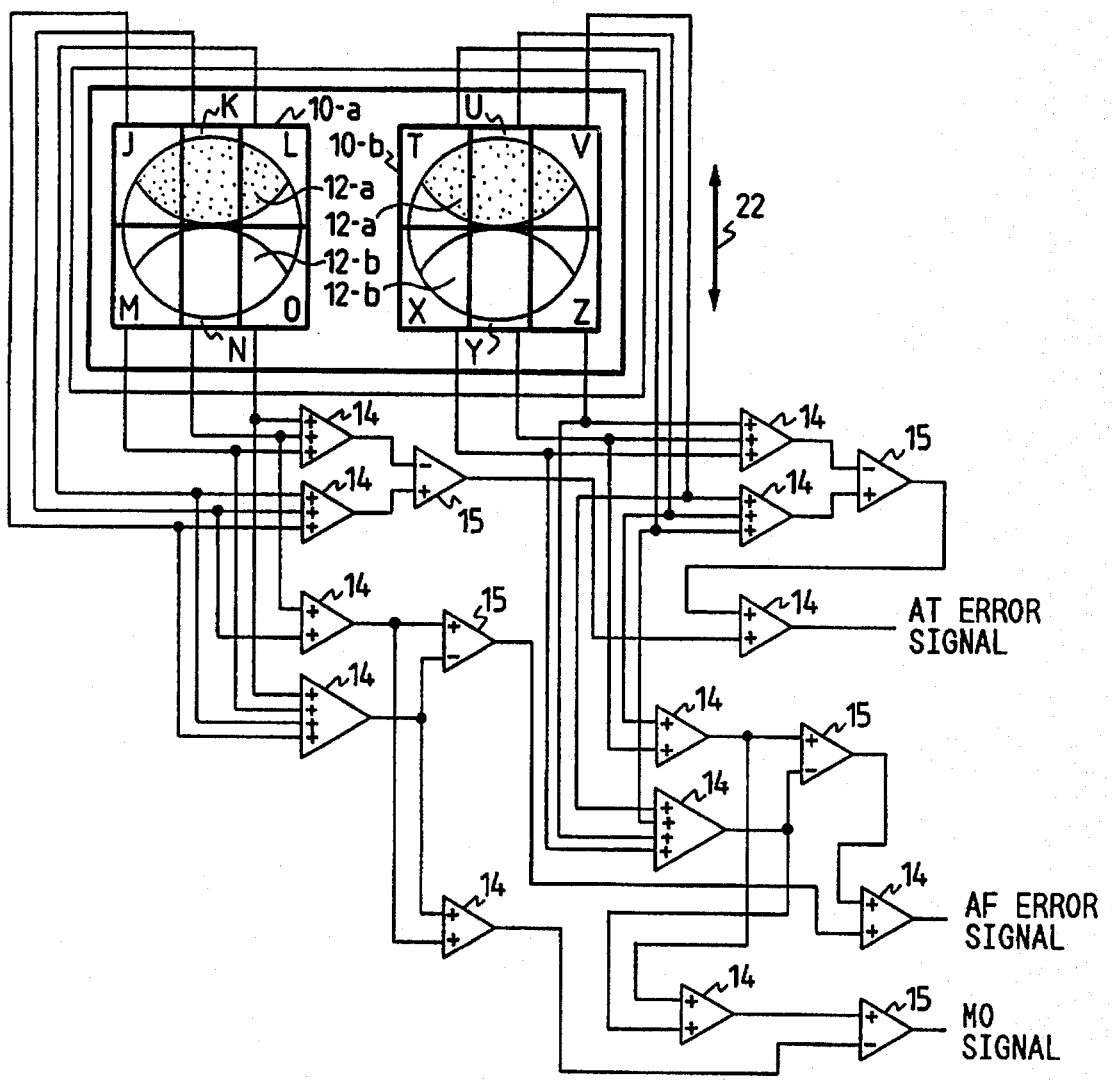
FIG. 9 is a schematic diagram showing an arrangement of a photodetector for conventional AF/AT error signal detection and MO signal detection.
Figure 10:
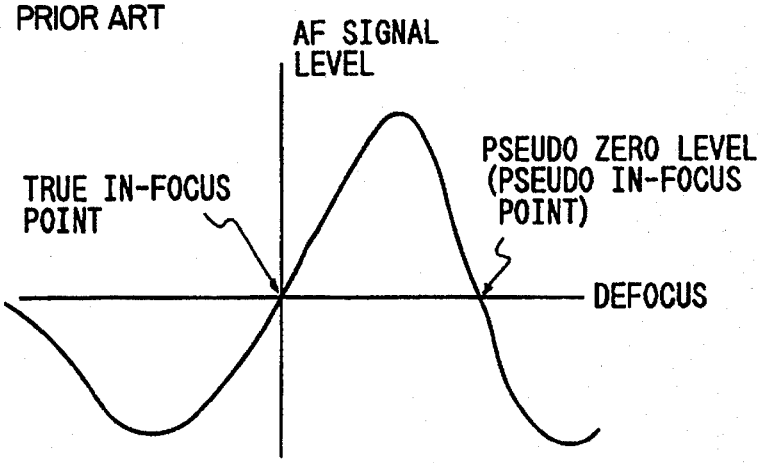
FIG. 10 is a graph showing an S-curve of a conventional AF error signal.

FIG. 20 shows the S-curve pattern of the AF error signal obtained when the size (width) e, in the direction in which the size is set to be smaller than the beam spot size, of the photodetection region is set within a range beyond the upper and lower limits of the above relation. As is apparent from FIG. 20, the pseudo zero level (pseudo in-focus point) shown in FIG. 10, which has been discussed as a problem in the second prior art, is removed from a position near the true in-focus point. For this reason, in pull-in control of an AF error signal, no means for preventing a control system from being erroneously operated by the pseudo zero level need be arranged, and satisfactory control can be realized by a simple AF error signal pull-in control system.

FIG. 21 shows a change in S-curve pattern of the AF error signal when the size (width) e of the photodetection region is set to be smaller than 0.4r (a curve 26) and when the size e is set to be larger than 1.6r (a curve 27). When the size e is set to be smaller than 0.4r, since the light amount which contributes to AF error signal detection decreases, the magnitude of the AF error signal as a whole decreases. For this reason, when this signal is electrically amplified, noise components increase, resulting in unstable AF control. In addition, since a curved portion of the S-curve appears near an in-focus point, and the linear region is narrowed, this also results in unstable AF control. When the size e is set to be larger than 1.6r, although the light amount which contributes to AF error signal detection increases, a range, which undesirably receives most of the received light amount in the photodetection region, is widened when the information recording medium falls outside an in-focus state, and one beam spot size decreases. As a result, as shown in FIG. 21, a wide flat region without peaks before and after the in-focus point appears in the S-curve pattern of the AF error signal, resulting in difficult AF control. Also, since a curved portion of the S-curve appears near the in-focus point, and the linear region is narrowed, AF control becomes unstable. In this manner, the effective range of the size (width) of the photodetection region according to the present invention is automatically set.

The second embodiment (for an AT error signal) of the present invention will be described below using the embodiment of the optical system shown in FIG. 12. Since the arrangement of the optical system is substantially the same as that shown in FIG. 12, only a difference will be described below, and a detailed description of other arrangements will be omitted. In this embodiment, the two photodetection regions 10-a and 10-b of the photodetector are used as light-receiving regions for AT error signal detection, and the detailed arrangement of the photodetector is shown in FIGS. 22 to 25. As can be apparent from these figures, each of the photodetection regions 10-a and 10-b is further split into two portions vertically. A dark gray portion 12-a and a light gray portion 12-b are illustrated in each of the light regions 11-a and 11-b of the two split light beams in an in-focus state in the above optical system. These portions correspond to the diffraction distribution from a continuous guide groove, which distribution appears in the light regions 11-a and 11-b, when the information recording medium has a continuous guide groove. Therefore, when the information recording medium has a disk shape, the direction of the arrow 22 in FIG. 22 indicates the radial direction of the information recording medium.

Figure 22:
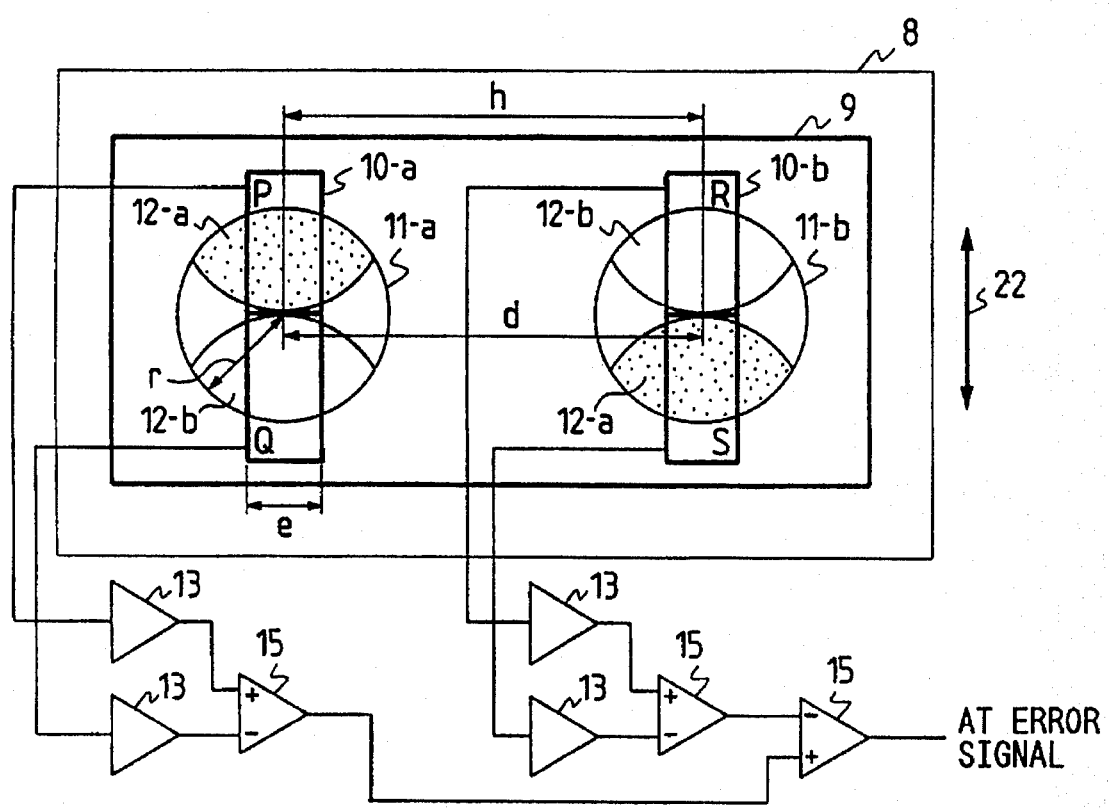
FIG. 22 is a schematic diagram showing a photodetector and its detection circuit for AT error signal detection according to the present invention.

The portions 12-a and 12-b are illustrated to have different brightness levels for the sake of simplicity although such a state corresponds to a slightly detracked state in practice. As shown in FIG. 22, the positions of the light and dark regions of the portions 12-a and 12-b are vertically reversed in the direction intersecting the track on the light regions 11-a and 11-b, since the photodetection regions 10-a and 10-b are respectively arranged before and after the focal plane of the convergent lens 6.

In FIG. 22, assuming that r represents the radius of the detection light beam on the light-receiving surface of the photodetector in an in-focus state, h represents the interval between the centers of the two photodetection regions, which interval is measured along the direction parallel to the track (as for a disk-shaped recording medium, the circumferential direction (the direction perpendicular to the arrow 22)), d represents the interval between the centers of the two detection light beams, which interval is measured along the direction parallel to the track, and e represents the size (width) of each of the two photodetection regions, which size is measured along the direction parallel to the track, r, h, d, and e preferably satisfy the following relation to obtain a stable AT error signal:

$$0.4r \leq e \quad (1)$$

$$d - 2r + e \leq h \leq d + 2r - e \quad (2)$$

When the size (width) e of each photodetection region becomes smaller than the lower limit of relation (1) above, the amount of light to be detected decreases, and the amplitude of the AT error signal becomes too small. Therefore, according to the present invention, the size of each photodetector preferably falls within the range of relation (1) above. It is more preferable to determine the upper limit of this range in consideration of a range determined by relation (2).

Figure 23:
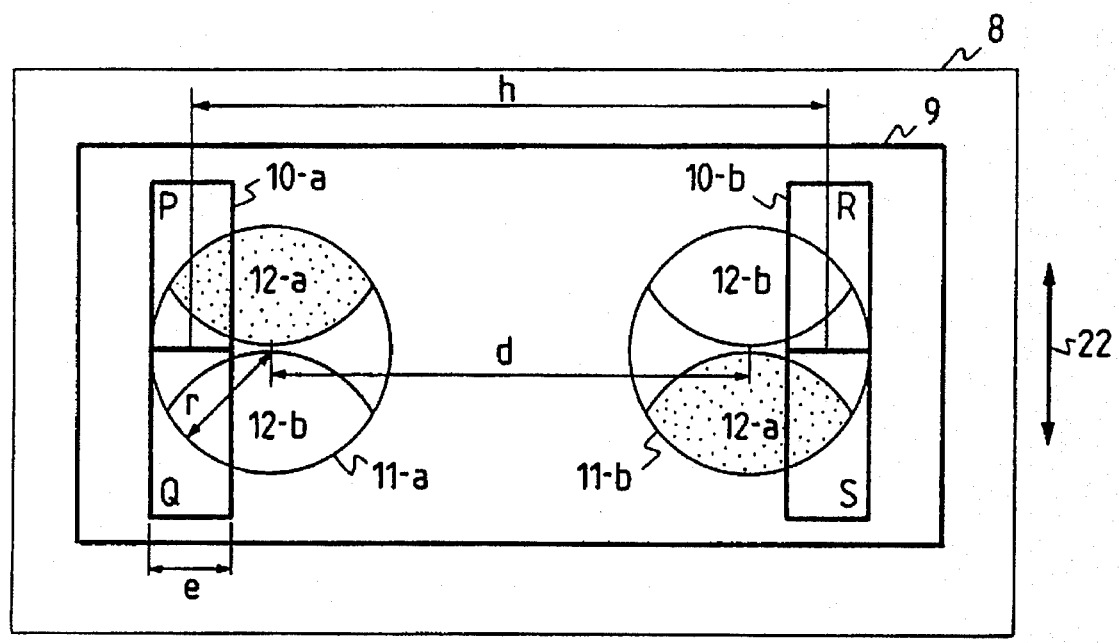
FIG. 23 is an explanatory view for explaining the arrangement condition (upper limit state) of the photodetector shown in FIG. 13 and detection light beams.
Figure 24:
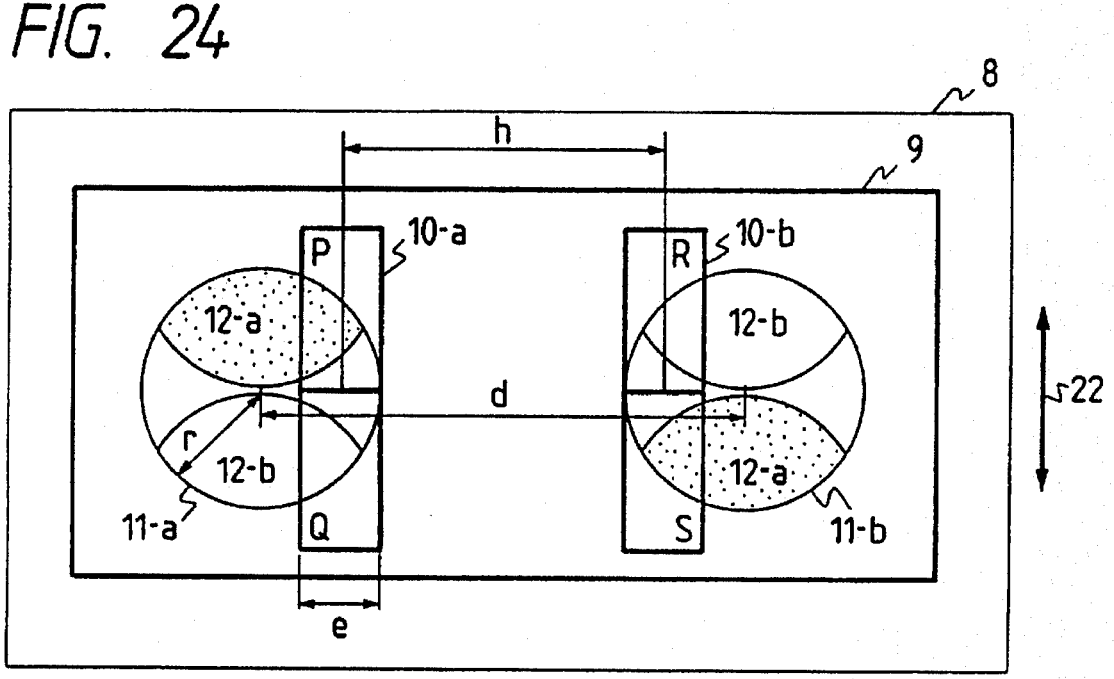
FIG. 24 is an explanatory view for explaining the arrangement condition (lower limit state) of the photodetector shown in FIG. 13 and detection light beams.

FIGS. 23 and 24 show the positional relationships between the light beams and the photodetection regions obtained when the interval h between the two photodetection regions and the interval d between the two detection light beams correspond to the upper and lower limits of relation (1) above. When the intervals are determined outside the range satisfying this distance relationship, since the amplitude of the AF error signal considerably decreases, a tolerance must be distributed to satisfy the relationship upon designing components.

As shown in FIG. 22, since the photodetection regions 10-a and 10-b each have two split light-receiving portions, the outputs from the two split light-receiving portions of each photodetection region are differentially calculated, and the differential calculation results of the photodetection regions 10-a and 10-b are further differentially calculated to obtain an AT error signal. This processing will be described in detail below. The two photodetection regions are adjusted, so that the beam spot sizes on the two photodetection regions are equal to each other in an in-focus state, and the two photodetection regions and the two light beam positions are symmetrical with each other. Therefore, the amount of light incident on the photodetection region 10-a is equal to that of light incident on the photodetection region 10-b. When the light-receiving portions of the photodetection regions 10-a and 10-b are respectively represented by P, Q, R, and S, and signals obtained from these light-receiving portions are respectively represented by IP, IQ, IR, and IS, differential signals IP-IQ and IR-IS are calculated in units of two split light-receiving portions. As shown in FIGS. 22 to 24, since the diffraction distribution patterns from a guide groove, which patterns appear on the light regions 11-a and 11-b of the two detection light beams, are reversed to each other in the direction parallel to the track in association with the portions 12-a and 12-b, the signals IP-IQ and IR-IS have opposite phases. Therefore, an AT error signal is obtained by the following differential calculation:

$$AT \text{ error signal} = (IP-IQ) - (IR-IS)$$

Figure 26A:
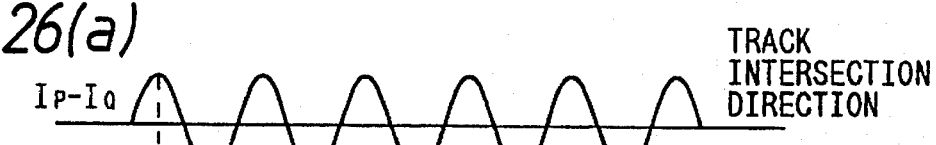
FIGS. 26(a) through 26(c) are graphs for explaining the waveforms of an AT error signal according to the present invention.
Figure 26B:
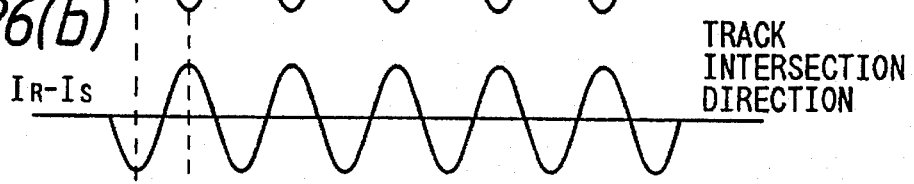
Figure 26C:
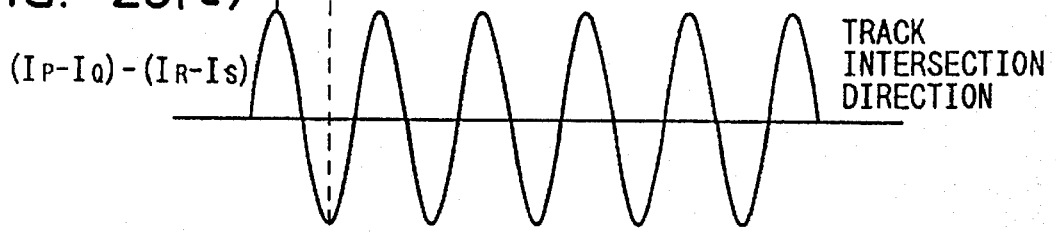

FIGS. 26(a) and (b) schematically show AT signal waveforms obtained from the two split photodetection regions when the light spot intersects the track on the information recording medium 5. As shown in FIG. 22, since the diffraction distribution patterns of the two detection light beams incident on the photodetection regions 10-a and 10-b are reversed to each other in the track intersection direction, as described above, the phases of the two waveforms are opposite to each other. FIG. 26(c) shows an AT error signal finally obtained by differentially calculating the differential signals from the two photodetection regions.

Figure 25:
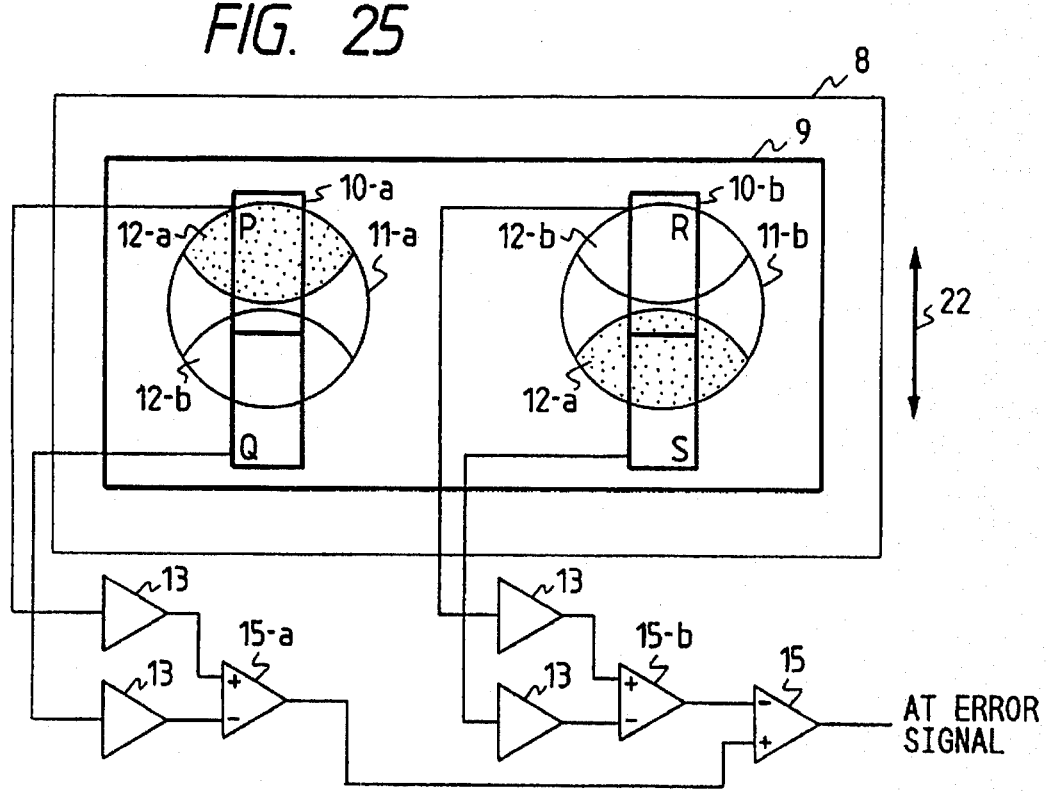
FIG. 25 is an explanatory view showing a case wherein a photodetector suffers from an optical axis shift in AT error signal detection according to the present invention.
Figure 27A:
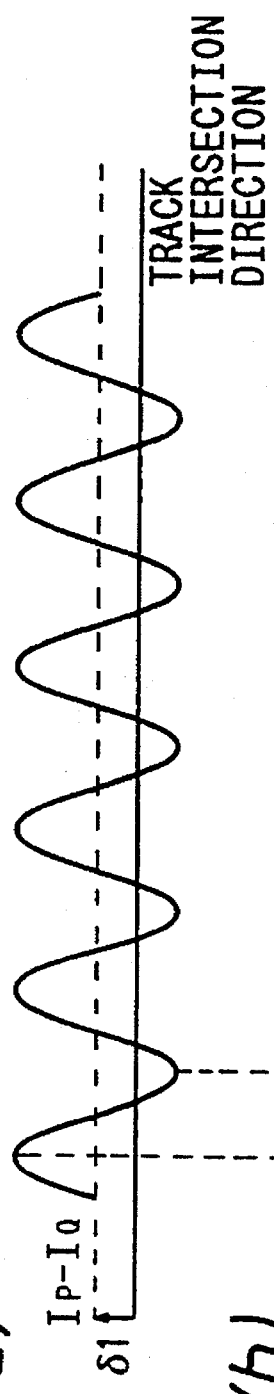
FIGS. 27(a) through 27(c) are graphs for explaining the waveforms of an AT error signal according to the present invention obtained when a photodetector suffers from an optical axis shift.
Figure 27B:
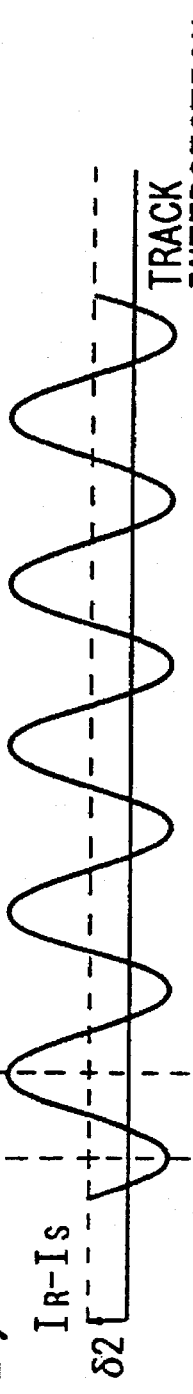
Figure 27C:
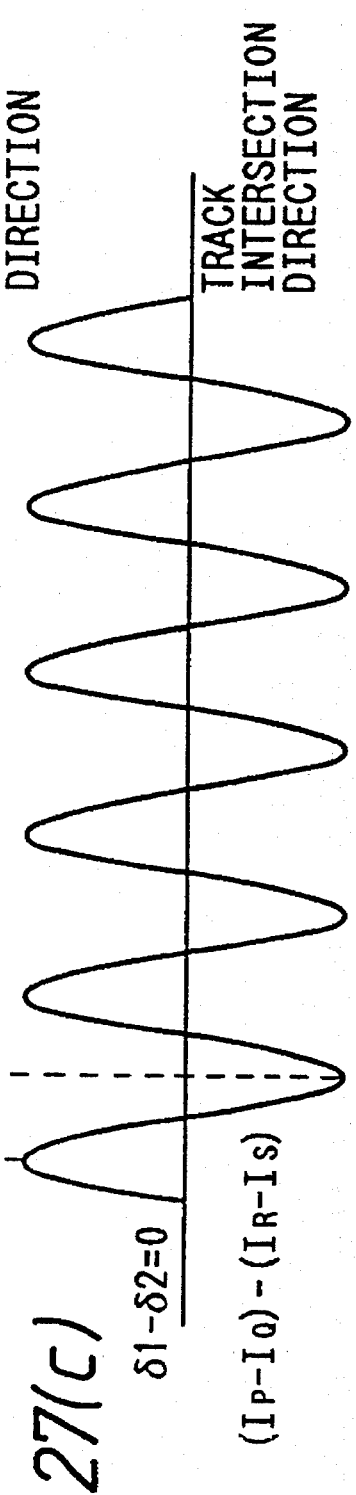

The effect of this embodiment, which is different from that in the prior art, and which is obtained when the same optical axis shift as in the first prior art occurs in this embodiment, will be described below. FIG. 25 shows the positional relationship between the light beams and the photodetection regions obtained when the two incident light beams are shifted in the same direction relative to the photodetection regions after position adjustment. This state corresponds to a case wherein an optical element through which the detection light beam passes before it reaches the photodetector, e.g., the convergent lens 6, is shifted from the predetermined position after position adjustment, and the light beam is shifted from the adjusted position, or a case wherein the position of the photodetector 8 is shifted in a predetermined mounting plane after position adjustment. Such a state relatively easily occurs in the above-mentioned optical system. FIGS. 27(a) and (b) schematically show AT signal waveforms obtained from the two split photodetection regions in the above-mentioned state when the light spot intersects the track on the information recording medium 5. FIGS. 27(a) and (b) show offsets δ1 and δ2 which appear in the differential signals of the two split photodetection regions. FIG. 27(c) shows an AT error signal finally obtained by differentially calculating the differential signals from the two photodetection regions.

Since the photodetection regions 10-a and 10-b are integrally formed on the light-receiving surface of the photodetector 8, they are laterally shifted by the same amount in the same direction. Since these photodetection regions are respectively separated forward and backward by the same distance from the focal plane of the convergent lens, even when the light beams are shifted, the two light beams are shifted by the same amount in the same direction on the photodetection regions 10-a and 10-b. Therefore, since the offsets δ1 and δ2 have the same amount and the same sign, they cancel each other and are eliminated in the differential calculation.

In this embodiment, the size (length), in the track intersection direction, of the photodetection region is set to be larger than the beam spot size in an in-focus state, and the size (width), in the direction parallel to the track, of the photodetection region is set to be smaller than the beam spot size (within the range of relation (1) above). When the length and width of the photodetection region are set in this manner, DC light amount portions (portions excluding the regions 12-a and 12-b of the detection light beams in FIGS. 22 to 24) of the detection light beams incident on the photodetection regions can be minimized, and portions which contribute to a push-pull signal (portions of the regions 12-a and 12-b of the detection light beams) can be effectively detected, resulting in convenience. In this embodiment as well, the arithmetic devices can be assembled in the clear mold package of the photodetector as in the modifications of the first embodiment.

Figure 28:
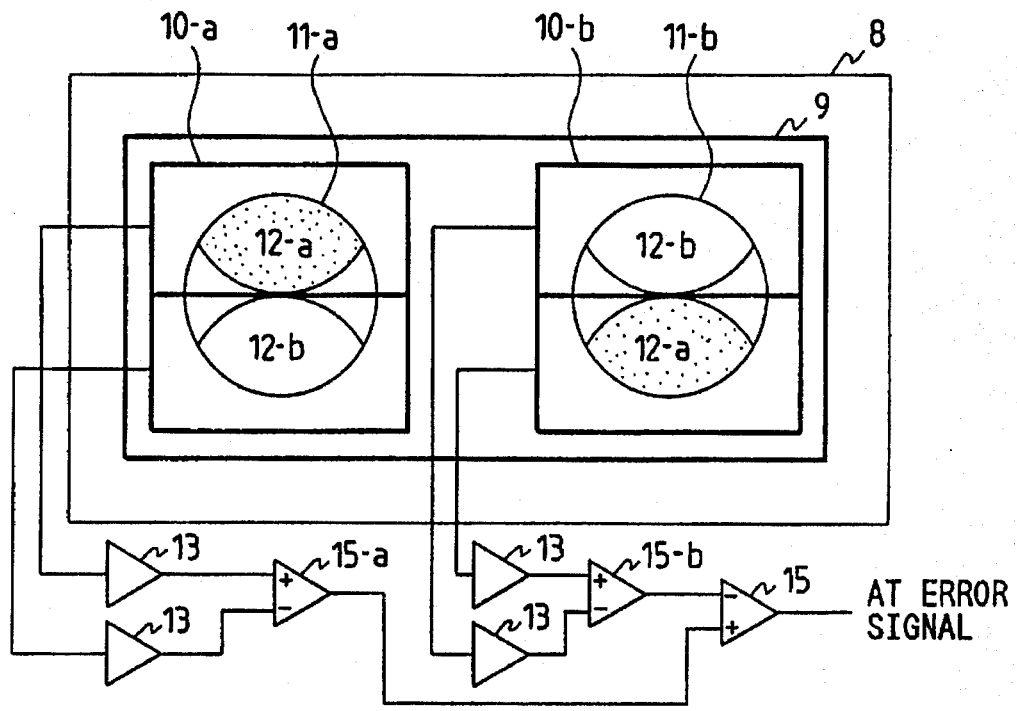
FIG. 28 is a schematic diagram showing another embodiment of a photodetector and its detection circuit for AT error signal detection according to the present invention.
Figure 29:
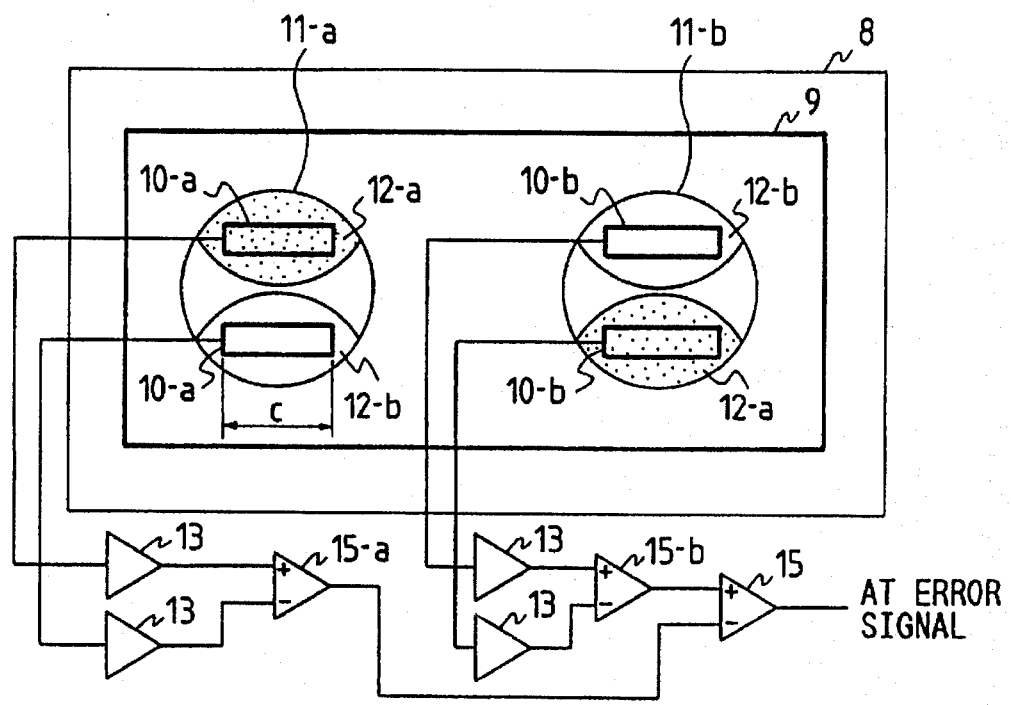
FIG. 29 is a schematic diagram showing still another embodiment of a photodetector and its detection circuit for AT error signal detection according to the present invention.

FIGS. 28 and 29 show embodiments obtained when the sizes and shapes of the photodetection regions of the photodetector 8 shown in FIGS. 22 to 24 are changed. In the embodiment shown in FIG. 28, the size, in the radial direction (arrow 22) of a disk-shaped recording medium, of each photodetection region is set to be larger than the beam spot size in an in-focus state. In this embodiment, as can be seen from FIG. 28, even when the light beam regions 11-a and 11-b cause a position shift in the direction parallel to the track on the light-receiving surface of the photodetector 8, the position shift does not influence an AT error signal unless the light beam regions fall outside the corresponding photodetection regions. Since all the regions 12-a and 12-b of the diffraction distribution caused by a pit array or a guide groove on the information recording medium are detected, the magnitude of a push-pull signal is large. This is the characteristic feature of this embodiment. As in the embodiment shown in FIG. 25, this embodiment has an effect of canceling AT error signal offsets caused by an optical axis shift in the track intersection direction.

In the embodiment shown in FIG. 29, unlike in the embodiments described so far, the two photodetection regions 10-a and 10-b for one detection light beam are arranged to be separated from each other in the diameter of the detection light beam. Furthermore, the sizes of these photodetection regions are set to be smaller than the regions 12-a and 12-b of the diffraction distribution of the detection light beam due to a pit array or a guide groove on the information recording medium in both the track intersection direction (arrow 22) and the direction parallel to the track. In this embodiment, since the area of each photodetection region can be decreased, the influence of noise can be reduced. In particular, when noise reduction is strongly demanded in terms of the characteristics of a photodetector, this arrangement is effective. When the two light beams are alternately shifted in the track intersection direction on the light-receiving surface of the photodetector 8 due to decentering, in the track intersection direction, of the objective lens, no AT offsets are generated unless the photodetection regions fall outside the regions 12-a and 12-b of the diffraction distribution. Furthermore, this embodiment also has an effect of canceling AT error signal offsets caused by an optical axis shift in the track intersection direction as in the embodiment shown in FIG. 25.

Figure 30:
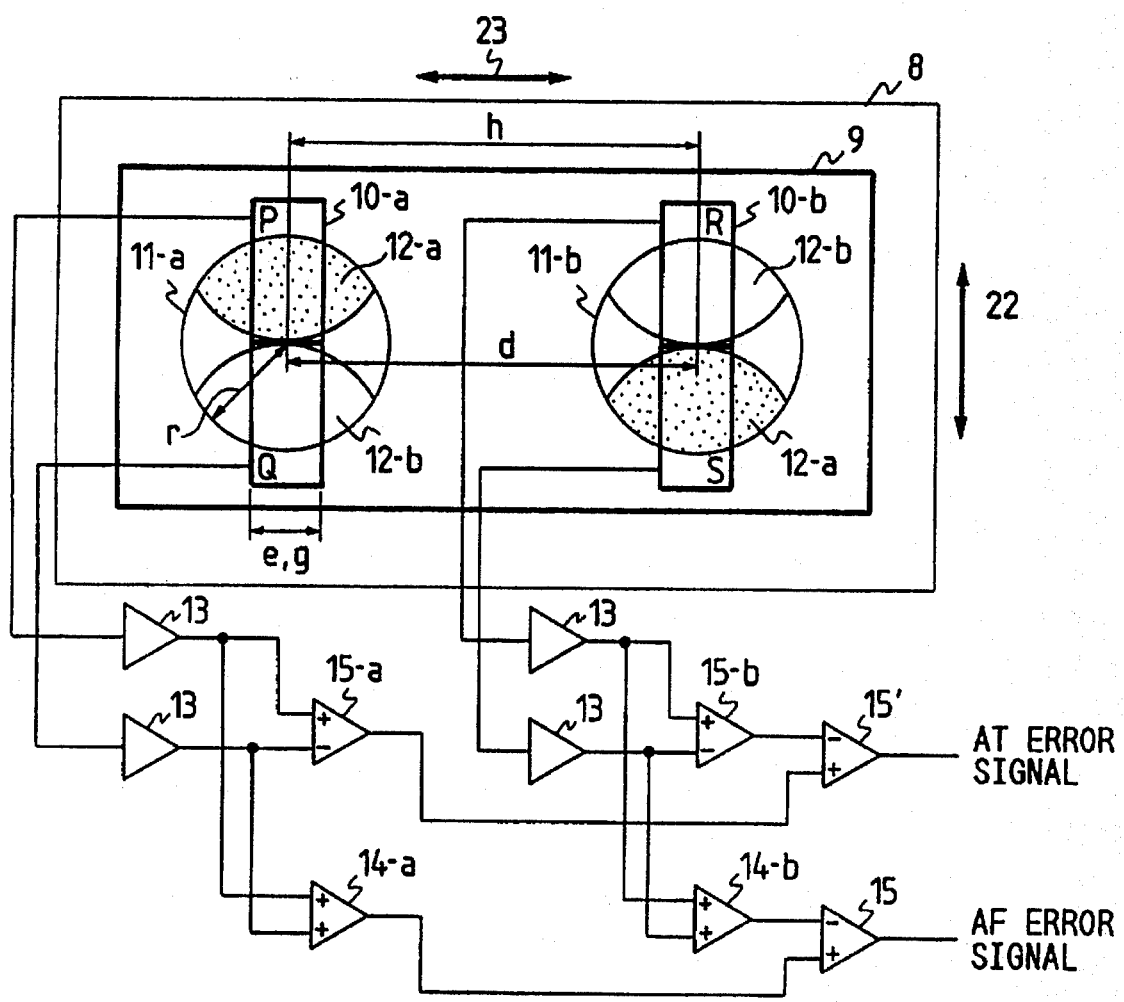
FIG. 30 is a schematic diagram showing a photodetector and its detection circuit for AF/AT error signal detection according to the present invention.
Figure 31:
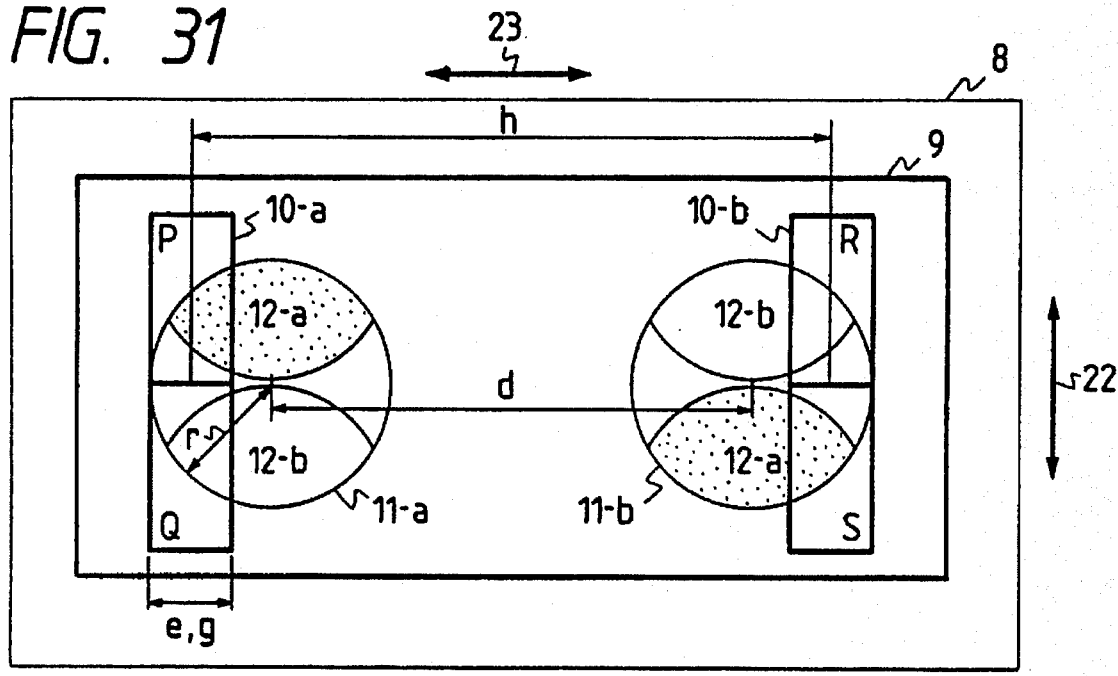
FIG. 31 is an explanatory view for explaining the arrangement condition of the photodetector shown in FIG. 30 and detection light beams.
Figure 32:
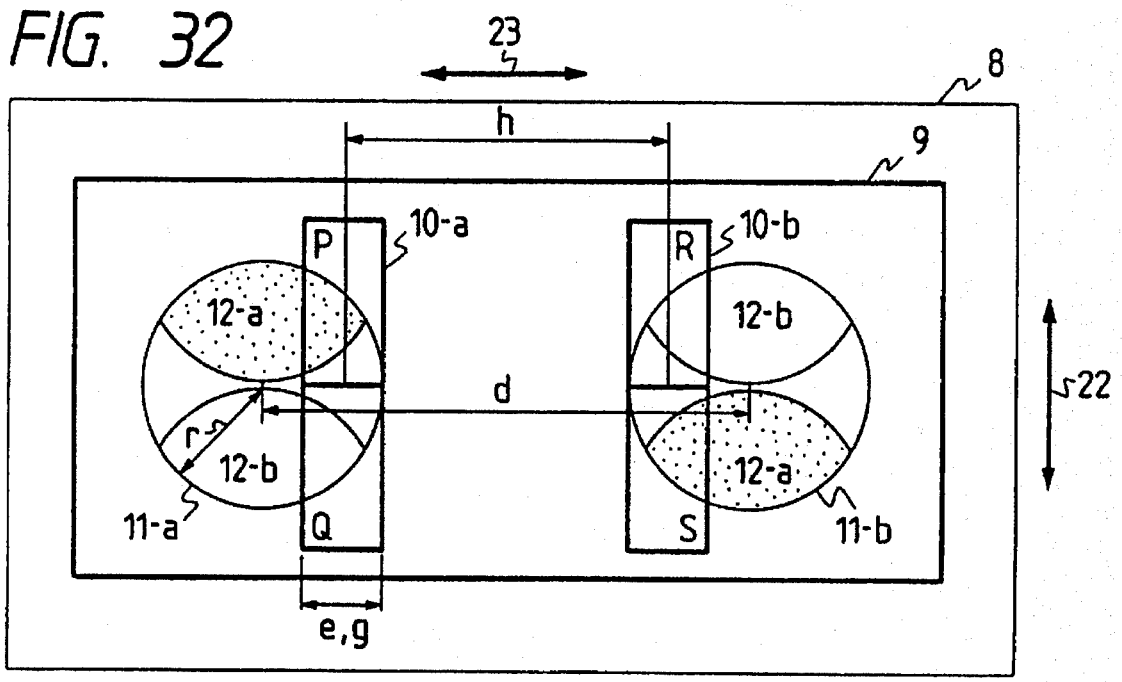
FIG. 32 is an explanatory view for explaining the arrangement condition of the photodetector shown in FIG. 30 and detection light beams.

The third embodiment (for AF and AT error signals) of the present invention will be described below using the above-mentioned embodiment of the optical system shown in FIG. 12. Since the arrangement of the optical system is substantially the same as that shown in FIG. 12, only a difference will be described below, and a detailed description of other arrangements will be omitted. This embodiment is shown in FIGS. 30 to 32. In this embodiment, the photodetection regions 10-a and 10-b of the photodetector are used as light-receiving regions for AF error signal detection and AT error signal detection, and the detailed arrangement of the photodetector is the same as that in the above-mentioned second embodiment (see FIGS. 22 to 24). Note that an arrow 23 indicates a direction corresponding to a direction parallel to an information track (when a recording medium has a disk shape, the circumferential direction of the medium). An arithmetic circuit is arranged to be able to extract AF and AT error signals from light-receiving portions P, Q, R, and S via arithmetic elements.

The calculation procedure and the detection principle of AF error signal detection in this embodiment will be described below. An AF error signal is obtained by differentially calculating output signals from the photodetection regions 10-a and 10-b, as shown in FIG. 30. This processing will be described in detail below. The two photodetection regions are adjusted, so that the beam spot sizes on the two photodetection regions are equal to each other in an in-focus state, and the two photodetection regions and the two light beam positions are symmetrical with each other. Therefore, the amount of light incident on the photodetection region 10-a is equal to that of light incident on the photodetection region 10-b. More specifically, based on a calculation by the arithmetic circuit, the AF error signal=0, and an in-focus state can be determined at this AF error signal level.

When the information recording medium is shifted from an in-focus state with respect to the objective lens in a certain direction, for example, if the diameter of the light beam 11-a on the photodetection region 10-a decreases, since the amount of light incident on the photodetection region 10-a increases, the magnitude of the output signal from the photodetection region 10-a increases. At the same time, since the diameter of the light beam 11-b on the photodetection region 10-b increases, and the amount of light incident on the photodetection region 10-b decreases, the magnitude of the output signal from the photodetection region 10-b decreases. The difference between the output signals from the photodetection regions 10-a and 10-b is calculated as follows:

AF error signal=(IP+IQ)−(IR+IS)

The calculation result indicates a positive level. When the shift direction of the information recording medium from an in-focus state with respect to the objective lens is reversed, the calculation result indicates a negative level. As described above, since the differentially calculated AF error signal indicates zero in the in-focus state or indicates a positive or negative level according to the shift direction from the in-focus state, it can be used in AF error control.

FIG. 20 shows the S-curve pattern of an AF error signal obtained when the objective lens and the information recording medium continuously suffer from a focal point shift. As is apparent from FIG. 20, the pseudo zero level (pseudo in-focus point) shown in FIG. 10, which has been discussed as a problem in the prior art, is eliminated from a position near the true in-focus point. For this reason, in pull-in control of an AF error signal, no means for preventing a control system from being erroneously operated by the pseudo zero level need be arranged, and satisfactory control can be realized by a simple AF error signal pull-in control system.

The calculation procedure and the detection principle of AT error signal detection in the third embodiment will be described below. As has already been described in the second embodiment, an AT error signal is obtained by the following differential calculation:

AT error signal=(IP−IQ)−(IR−IS)

As a result, a signal waveform (see FIG. 27(c)) obtained in the second embodiment is obtained. In FIG. 30, if g represents the size (width), in the direction in which the size is set to be smaller than the detection beam spot size in an in-focus state, of each of the two photodetection regions, r represents the radius of the detection light beam on each photodetection region in an in-focus state, e represents the size (width) of the two photodetection regions, which size is measured along the direction of the arrow 23, h represents the interval between the central points of the two photodetection regions, which interval is measured along the direction of the arrow 23, and d represents the interval between the centers of the two detection light beams, which interval is measured along the direction of the arrow 23, g, r, h, d, and e preferably satisfy the following relations:

$$0.4r \leq g \leq 1.6r \quad (3)$$

$$d-2r+e \leq h \leq d+2r-e \quad (4)$$

Relation (3) defines the size of each of the photodetection regions 10-a and 10-b for obtaining a preferable S-curve of the AF error signal. In the embodiment shown in FIG. 30, a change in S-curve pattern of the AF error signal is as shown in FIG. 21 as described above when the size g, in the direction in which the size is set to be smaller than the beam spot size, of the photodetection region is set to be larger than the upper limit of relation (3), and to be smaller than the lower limit thereof. When the size g is set to be smaller than the lower limit, since the amount of light, which contributes to detection of an AF error signal, decreases, the magnitude of the AF error signal as a whole decreases, as indicated by the S-curve 26. When this signal is electrically amplified, noise components increase, resulting in unstable AF control. In addition, a curved portion of the S-curve appears near an in-focus point, and the linear region is narrowed. This also results in unstable AF control. When the size g is set to be larger than the upper limit, although the amount of light, which contributes to AF error signal detection, increases, a focal point shift range, which undesirably receives most of the received light amount in the photodetection region, is widened when the information recording medium falls outside an in-focus state, and one beam spot size decreases.

As a result, as indicated by the curve 27 in FIG. 21, a wide flat region without peaks before and after the in-focus point appears in the S-curve pattern of the AF error signal, resulting in difficult control. Also, since a curved portion of the S-curve appears near the in-focus point, and the linear region is narrowed, AF control becomes unstable. This can be easily understood upon comparison with the ideal S-curve pattern of the AF error signal shown in FIG. 20.

When the size g is set to be smaller than the lower limit of relation (3), since the detected light amount decreases, the amplitude of the AT error signal becomes too low. Therefore, from the viewpoint of stable AT error signal detection, conditions are preferably set to fall within this range.

FIGS. 31 and 32 show the positional relationships between the light beams and the photodetection regions in correspondence with the upper and lower limits of relation (4) above. Since a deviation from the positional relationship leads to a decrease in amplitudes of AF and AT error signals, the photodetection regions are preferably arranged to satisfy the relationship upon designing components. Note that the circuit shown in FIG. 30 includes pre-amplifiers 13 corresponding to the light-receiving regions P, Q, R, and S, summing amplifiers 14-a and 14-b for obtaining AF error signals, a differential amplifier 15 for obtaining an AF error signal, differential amplifiers 15-a and 15-b for obtaining AT error signals, and a differential amplifier 15' for obtaining an AT error signal.

Figure 11A:
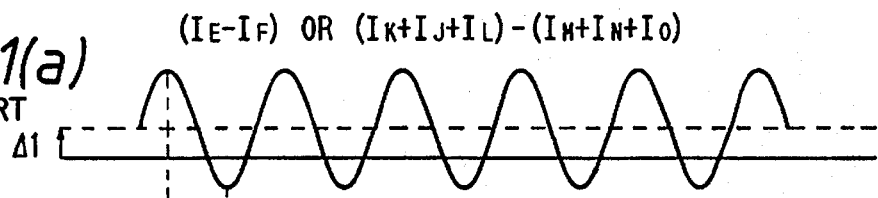
FIGS. 11(a) through 11(c) are graphs for explaining AT error signal waveforms when a photodetector suffers from an optical axis shift in conventional AT error signal detection.
Figure 11B:
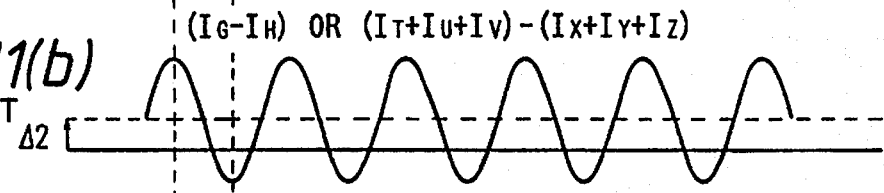
Figure 11C:
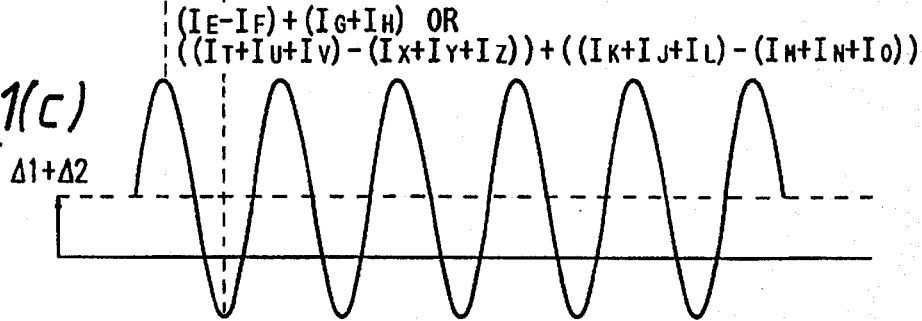

The arrangement of this embodiment can exhibit various effects similar to those described in the first embodiment, and a repetitive description of these effects will be avoided. As for an AT error signal, the operations and effects described in the second embodiment can be achieved. More specifically, the most serious problem upon detection of an AT error signal is an AT error signal offset (see FIG. 11) pointed out as a problem in the prior art. The offset is mainly generated when the photodetector is shifted relative to the detection light beams in the track intersection direction. In this case, upon a position shift in the direction parallel to the track, since the detection light beams are merely moved in the split line direction of the photodetection regions, no offset of an AT error signal is generated. This rarely poses a serious problem.

Figure 33A:
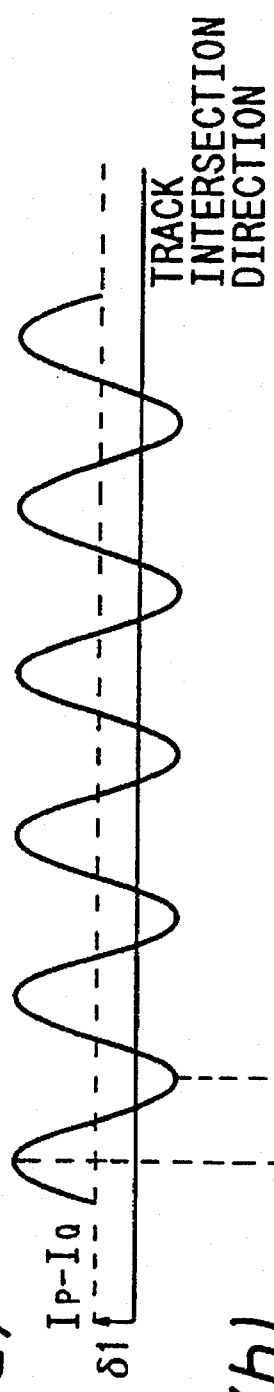
FIGS. 33(a) through 33(c) are graphs for explaining the waveforms of an AT error signal obtained when a photodetector suffers from an optical axis shift in AF/AT error signal detection according to the present invention.
Figure 33B:
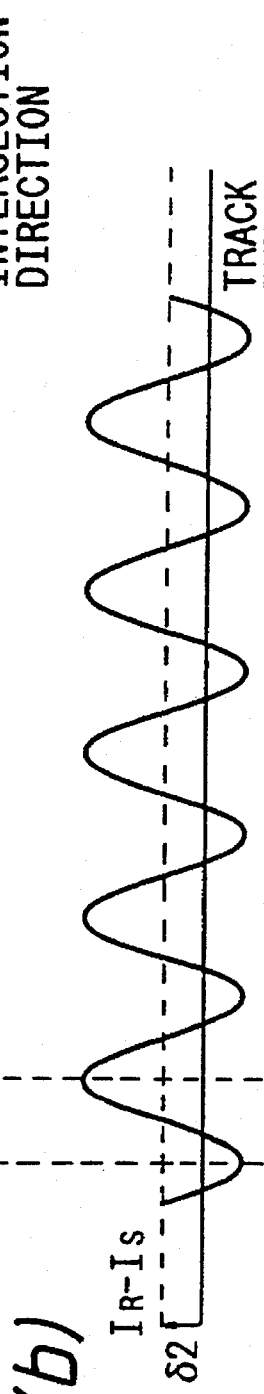
Figure 33C:
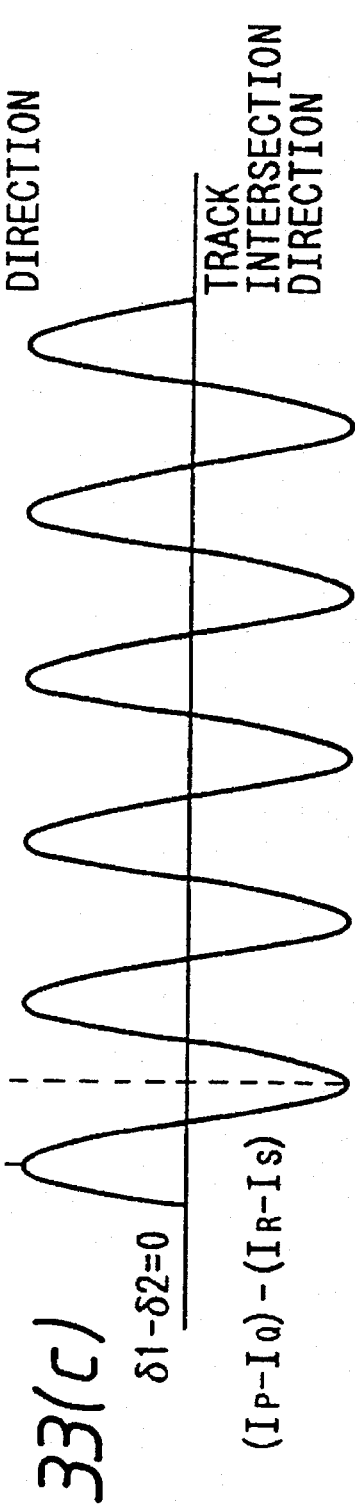

When a relative position shift between the photodetector and the detection light beams occurs in the track intersection direction in this embodiment, a convenient result can be attained as in the above-mentioned second embodiment. More specifically, in FIG. 30, a case wherein the two incident light beams are shifted relative to the photodetection regions in the same direction after position adjustment relatively easily occurs in this optical system, for example, when the light beam is shifted from the adjusted position since an optical element, e.g., the convergent lens, through which the detection light beam passes before it reaches the photodetector, is shifted from the predetermined position after adjustment, when the photodetector 8 is shifted within a mounting plane after position adjustment, or the like. In this state, when the light spot intersects the track on the information recording medium 5, AT error signals obtained from the two photodetection regions have waveforms as shown in FIGS. 33(a) and (b). FIGS. 33(a) and (b) show offsets δ1 and δ2 which appear in differential signals of the photodetection regions when a position shift occurs. FIG. 33(c) shows an AT error signal finally obtained by differentially calculating differential signals from the two photodetection regions.

Figure 34:
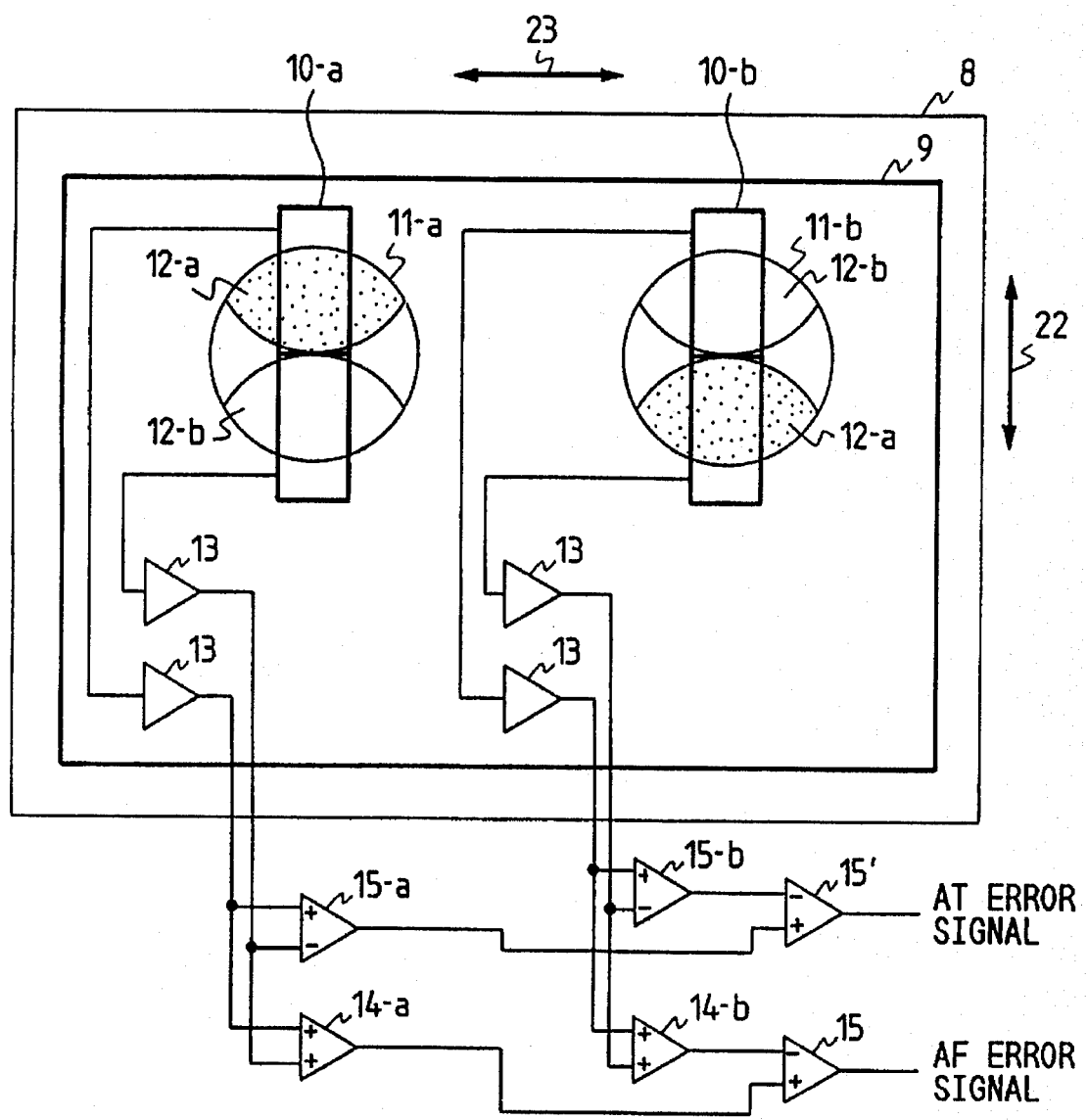
FIG. 34 is a schematic diagram showing an embodiment (incorporating pre-amplifier circuits) of a photodetector and its detection circuit for AF/AT error signal detection according to the present invention.
Figure 35:
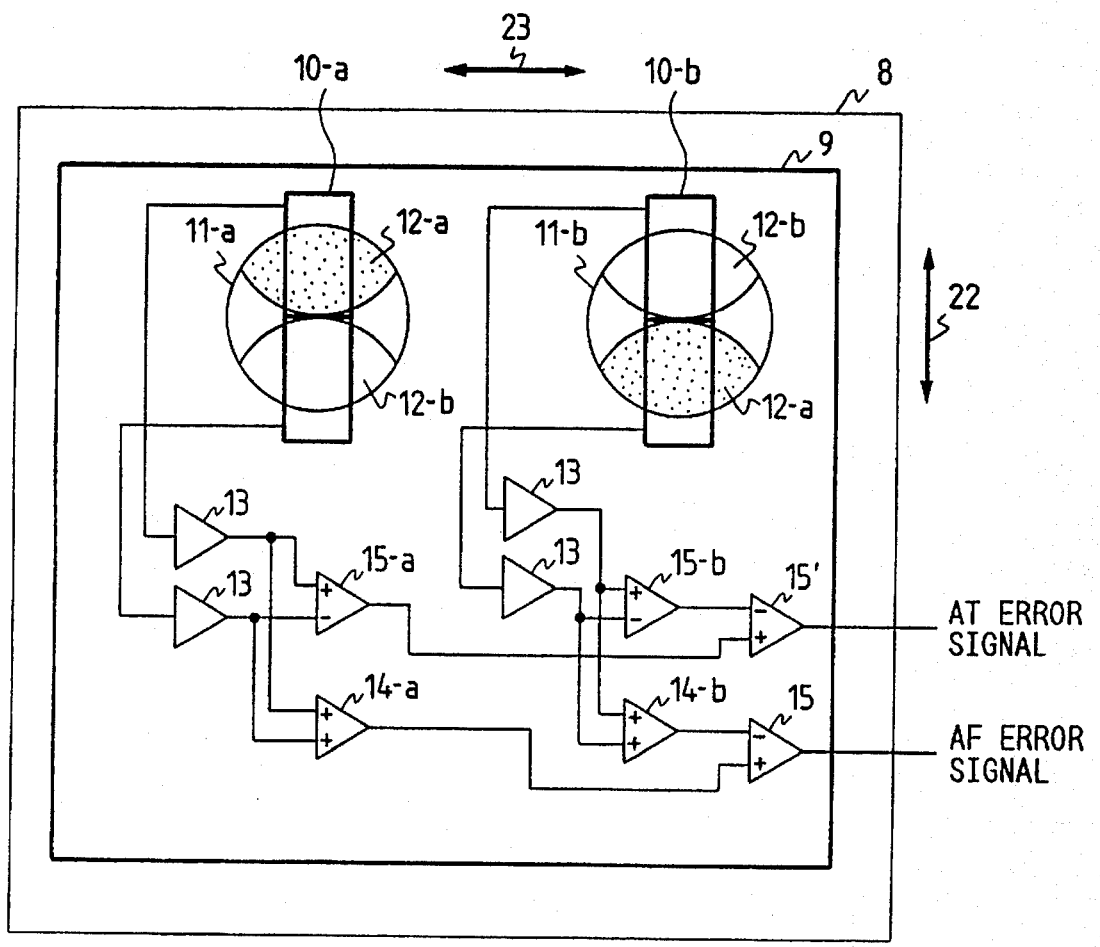
FIG. 35 is a schematic diagram showing another embodiment (incorporating pre-amplifier circuits and arithmetic circuits) of a photodetector and its detection circuit for AF/AT error signal detection according to the present invention.
Figure 36:
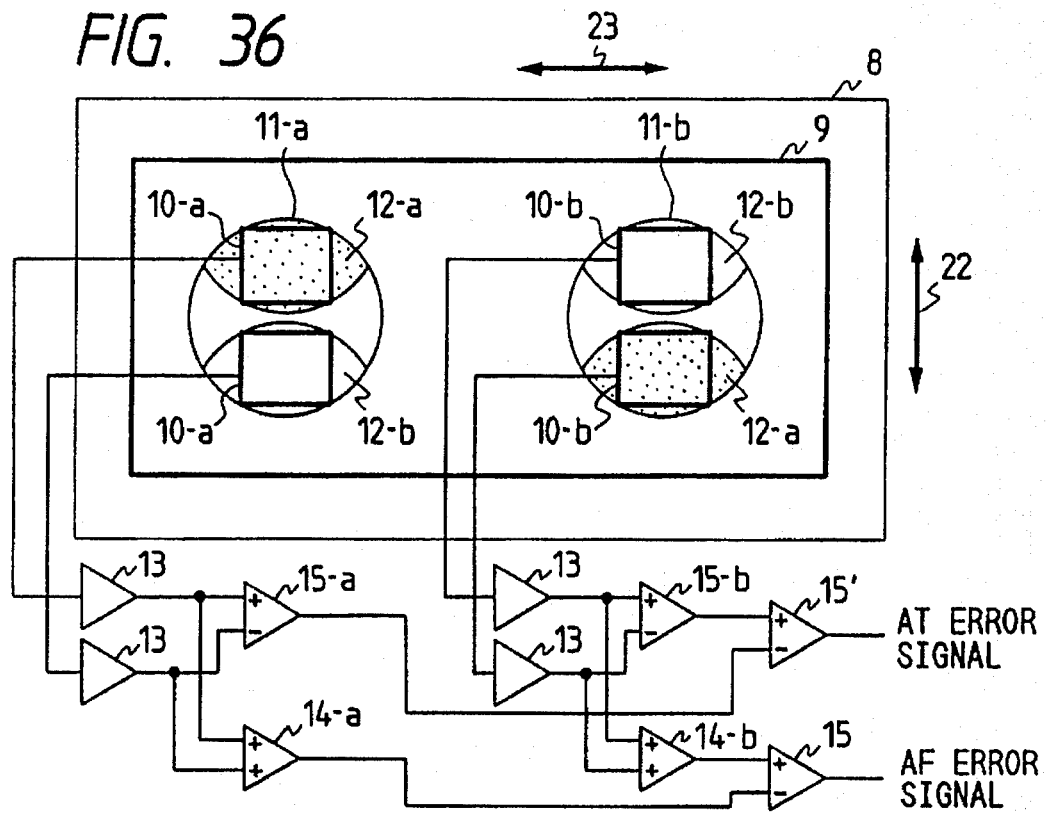
FIG. 36 is a schematic diagram showing still another embodiment of a photodetector and its detection circuit for AF/AT error signal detection according to the present invention.
Figure 37:
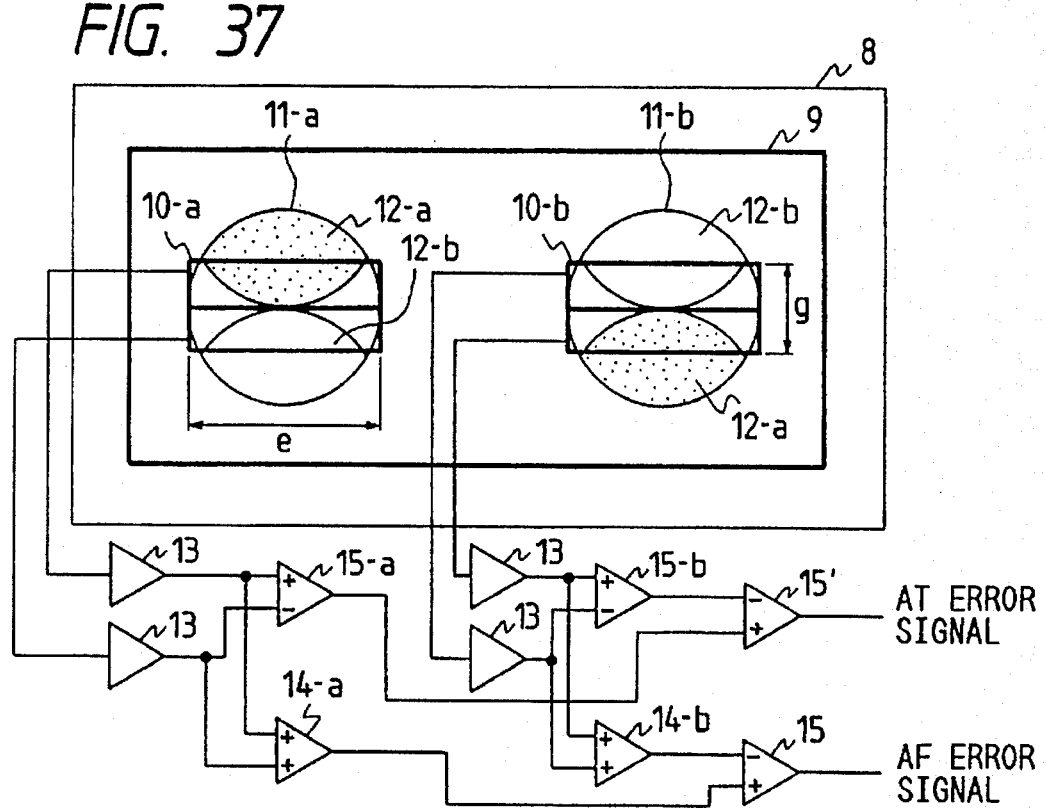
FIG. 37 is a schematic diagram showing still another embodiment of a photodetector and its detection circuit for AF/AT error signal detection according to the present invention.

FIGS. 34 and 35 show a case wherein the pre-amplifiers 13 corresponding to the light-receiving regions 10-a and 10-b, and the like are incorporated in the clear mold package of the photodetector as in the first embodiment (see FIGS. 16 and 17). The operations and effects obtained in this case are the same as those obtained in the first embodiment. FIGS. 36 and 37 show embodiments wherein the sizes and shapes of the photodetection regions are changed.

In the embodiment shown in FIG. 36, conditions are set, so that the size, in the direction (arrow 23) parallel to the track, of each photodetection region is set to be the beam spot size in an in-focus state, and the size, in the track intersection direction (arrow 22), of each photodetection region is set to be smaller than the regions 12-a and 12-b of the diffraction distribution of the detection light beam caused by a pit array or a guide groove on the information recording medium, and the photodetection regions corresponding to the regions 12-a and 12-b of the detection light beams are arranged to be separated from each other within the range of the corresponding beam spot size. In this embodiment, although the amount of light, which contributes to detection of AF and AT error signals, decreases, since the area of each photodetection region can be decreased, the influence of noise can be reduced. In particular, when noise reduction is strongly demanded in terms of the characteristics of a photodetector, this arrangement is effective. This embodiment has an effect of canceling AT error signal offsets caused by an optical axis shift in the track intersection direction as in the above-mentioned embodiment shown in FIG. 30. Similarly, when the two detection light beams are alternately shifted in the track intersection direction on the light-receiving surface of the photodetector 8 due to decentering, in the track intersection direction, of the objective lens, no AT offsets are generated unless the photodetection regions fall outside the regions 12-a and 12-b of the diffraction distribution.

In the embodiment shown in FIG. 37, the size, in the information track intersection direction (arrow 22), of each photodetection region is set to be smaller than the beam spot size in an in-focus state. In this embodiment, as can be seen from FIG. 37, the ratio of the regions 12-a and 12-b of the diffraction distribution to the detection light beams 11-a and 11-b, i.e., the ratio of incidence of the diffraction distribution patterns from a pit array or a guide groove on the information recording medium onto the photodetection regions, can be decreased. As has already been described above, since this diffraction distribution varies independently of the focusing state when the light spot intersects a guide groove, it appears as crosstalk from an AT error signal to an AF error signal to disturb stable AF control. However, this embodiment can solve this problem. More specifically, this embodiment can eliminate the influence of the diffraction distribution for the above-mentioned reason.

Figure 38:
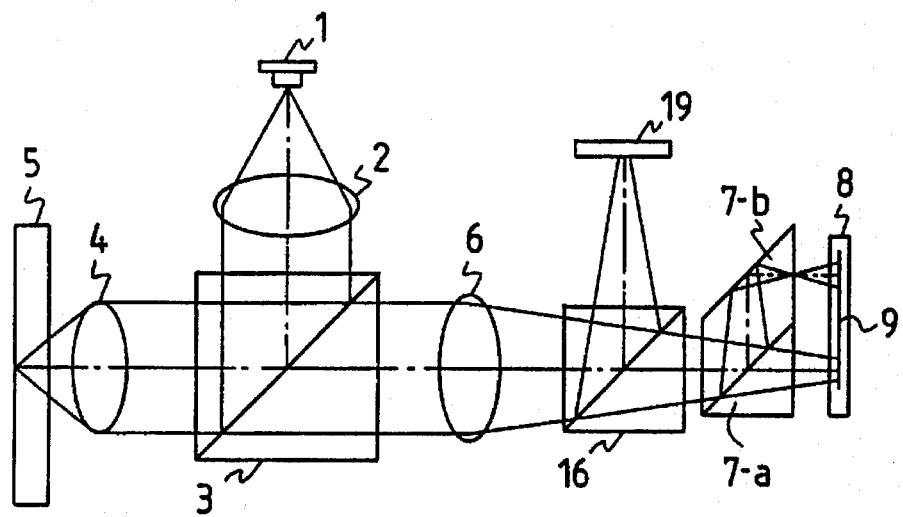
FIG. 38 is a schematic view showing the second embodiment of an optical system of an optical head for explaining an embodiment corresponding to, e.g., AF/AT error signal detection according to the present invention.

FIG. 38 shows another embodiment of an optical system to which the above-mentioned first to third embodiments can be applied. A light beam emitted from a semiconductor laser 1 as a light source is collimated by a collimator lens 2, and the collimated light beam is deflected by a beam splitter 3. The deflected light beam then reaches an objective lens 4, and is converged by the objective lens 4 to form a light spot on the light-receiving surface of an information recording medium 5. Light (detection light beam) reflected by the information recording medium 5 is transmitted through the objective lens 4 and the beam splitter 3 again, and is then transmitted through a convergent lens 6 to be converted into a convergent light beam. Furthermore, the light beam is split into a reflected light beam and a transmitted light beam by a beam splitter 7-a. Of the split light beams, the reflected light beam is reflected and deflected again by a reflection surface 7-b separately provided to the beam splitter 7-a, so that the reflected light beam and the transmitted light beam emerge in the same direction. The two convergent light beams are incident on a photodetector 8 for AF error signal detection, the light-receiving surface of which is arranged in correspondence with positions shifted from the focal plane of the convergent lens by the same distance in opposite directions, in a state wherein the two beams are spatially separated from each other on the light-receiving surface. A light beam split by a beam splitter 16 arranged in an optical path along which the light beam reaches the beam splitter 7-a via the convergent lens 6, reaches the light-receiving surface of a photodetector 19, and is detected by the photodetector 19 as an AT error signal and an information reproduction signal. Note that the photodetector 8 can also be used for reproduction of an information signal.

Figure 39:
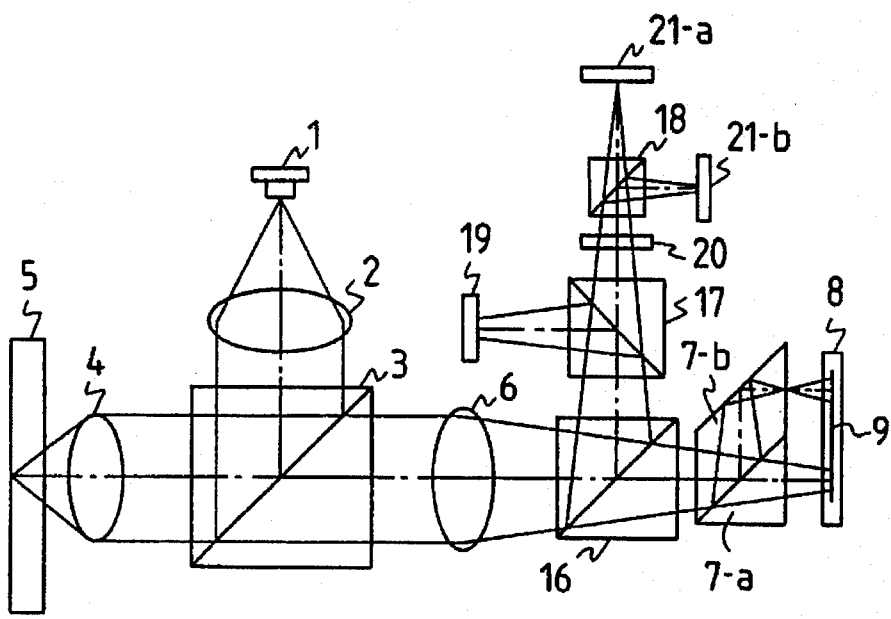
FIG. 39 is a schematic view showing the third embodiment of an optical system of an optical head for explaining an embodiment corresponding to, e.g., AF/AT error signal detection according to the present invention.

FIG. 39 shows still another embodiment of an optical system to which the above-mentioned first to third embodiments can be applied. The optical system of this embodiment comprises a magnetooptical signal detection system. That is, a light beam emitted from a semiconductor laser 1 as a light source is collimated by a collimator lens 2, and the collimated light beam is deflected by a beam splitter 3. The deflected light beam then reaches an objective lens 4, and is converged by the objective lens 4 to form a light spot on the light-receiving surface of an information recording medium 5. Light (detection light beam) reflected by the information recording medium 5 is transmitted through the objective lens 4 and the beam splitter 3 again, and is then transmitted through a convergent lens 6 to be converted into a convergent light beam. Furthermore, the light beam is split into a reflected light beam and a transmitted light beam by a beam splitter 7-*a*. Of the split light beams, the reflected light beam is reflected and deflected again by a reflection surface 7-*b* separately provided to the beam splitter 7-*a*, so that the reflected light beam and the transmitted light beam emerge in the same direction. The two convergent light beams are incident on a photodetector 8 for AF error signal detection, the light-receiving surface of which is arranged in correspondence with positions shifted from the focal plane of the convergent lens by the same distance in opposite directions, in a state wherein the two beams are spatially separated from each other on the light-receiving surface. A light beam split by a beam splitter 16 arranged in an optical path extending from the convergent lens 6 to the beam splitter 7-*a*, is further split into two light beams by a beam splitter 17. One of the two split light beams is received by a photodetector 19, and is detected as an AT error signal. The other light beam is split into two light beams by a polarization beam splitter 18 via a halfwave plate 20, and the two split light beams are respectively received by photodetectors 21-*a* and 21-*b*. Magnetooptical signals extracted from the photodetectors 21-*a* and 21-*b* are differentially detected via a predetermined arithmetic circuit.

Figure 40:
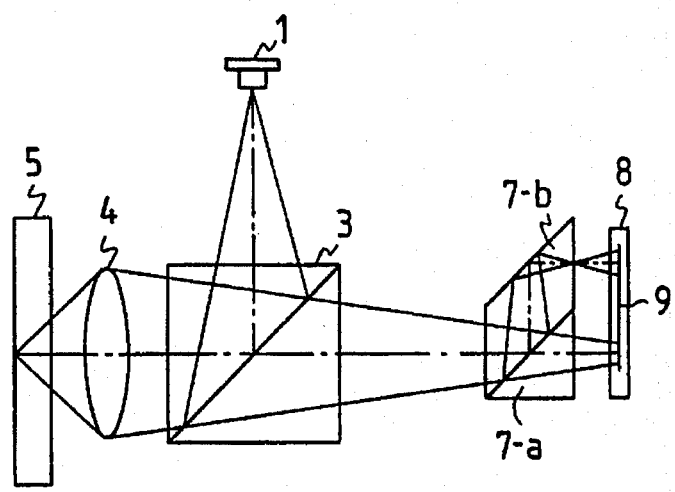
FIG. 40 is a schematic view showing the fourth embodiment of an optical system of an optical head for explaining an embodiment corresponding to, e.g., AF/AT error signal detection according to the present invention.

FIG. 40 shows still another embodiment of an optical system of the present invention. In particular, in this embodiment, a finite optical system without including any collimator lens is constituted. A light beam emitted from a semiconductor laser 1 as a light source is deflected by a beam splitter 3, and reaches an objective lens 4. The light beam is converged by the objective lens 4 onto the recording surface of an information recording medium 5. Light (detection light beam) reflected by the information recording medium 5 is transmitted through the objective lens 4 again, and is then split into a reflected light beam and a transmitted light beam by a beam splitter 7-*a*. Of the split light beams, the reflected light beam is reflected and deflected again by a reflection surface 7-*b* separately provided to the beam splitter 7-*a*. Then, the reflected light beam and the transmitted light beam emerge in the same direction. The two convergent light beams are incident on a photodetector 8 for AF error signal detection, the light-receiving surface of which is arranged in correspondence with positions shifted from the image-side focal plane of the objective lens by the same distance in opposite directions, in a state wherein the two beams are spatially separated from each other on the light-receiving surface.

Figure 41:
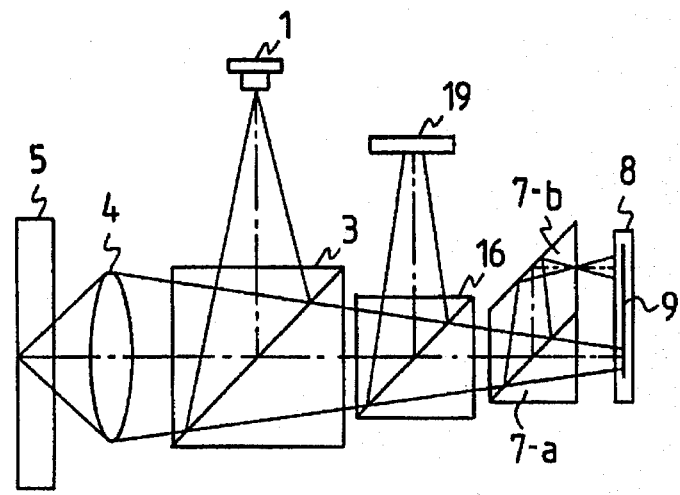
FIG. 41 is a schematic view showing the fifth embodiment of an optical system of an optical head for explaining an embodiment corresponding to, e.g., AF/AT error signal detection according to the present invention.

FIG. 41 shows still another embodiment of an optical system of the present invention. In this embodiment as well, a finite optical system without including any collimator lens is constituted, and includes an AT error signal detection optical system. In this embodiment, a light beam emitted from a semiconductor laser 1 as a light source is deflected by a beam splitter 3, and reaches an objective lens 4. The light beam is converged by the objective lens 4 onto the recording surface of an information recording medium 5. Light (detection light beam) reflected by the information recording medium 5 is transmitted through the objective lens 4 again, and is then split into a reflected light beam and a transmitted light beam by a beam splitter 7-*a*. Of the split light beams, the reflected light beam is reflected and deflected again by a reflection surface 7-*b* separately provided to the beam splitter 7-*a*, so that the reflected light beam and the transmitted light beam emerge in the same direction. The two convergent light beams are incident on a photodetector 8 for AF error signal detection, the light-receiving surface of which is arranged in correspondence with positions shifted from the image-side focal plane of the objective lens by the same distance in opposite directions, in a state wherein the two beams are spatially separated from each other on the light-receiving surface. In an optical path along which the light beam reaches the beam splitter 7-*a* via the beam splitter 3, a beam splitter 16 is arranged, and a light beam split by this beam splitter 16 is incident on a photodetector 19. Then, an information reproduction signal is detected. Note that the photodetector 8 can also be used for reproduction of an information signal.

Figure 42:
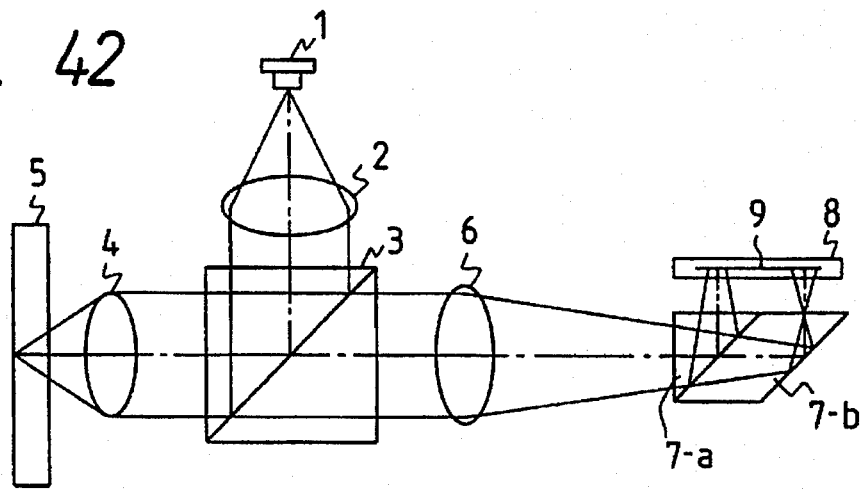
FIG. 42 is a schematic view showing the sixth embodiment of an optical system of an optical head for explaining an embodiment corresponding to AF/AT error signal detection and MO signal detection according to the present invention.

FIG. 42 shows still another embodiment of an optical system of the present invention. In this embodiment, unlike in the optical systems described so far, an AF error signal detection optical system is arranged and constituted, so that two split detection light beams emerge in the same direction as a light source. In this case, a photodetector can be adjusted from the same direction as the mounting direction of the light source. Therefore, it is suggested that the arrangement of the optical system can be changed without adding any new parts even when the mounting direction of the photodetector is limited due to a limitation imposed by specific design of the entire apparatus. Since other arrangements are the same as those in the embodiment shown in FIG. 12, a description of the arrangement and functions of this embodiment will be omitted.

Figure 43:
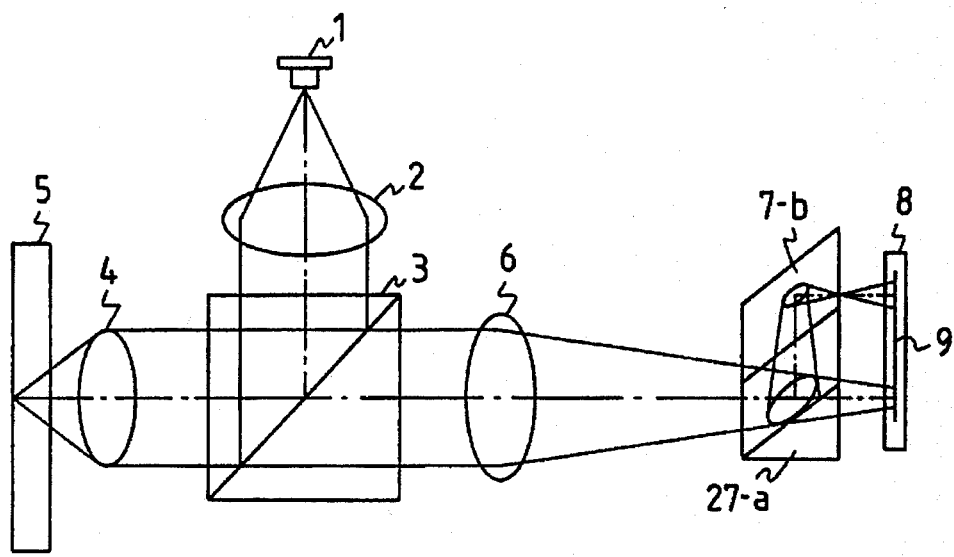
FIG. 43 is a schematic view showing an embodiment of an optical system of an optical head for AF/AT error signal detection and MO signal detection according to the present invention.
Figure 44:
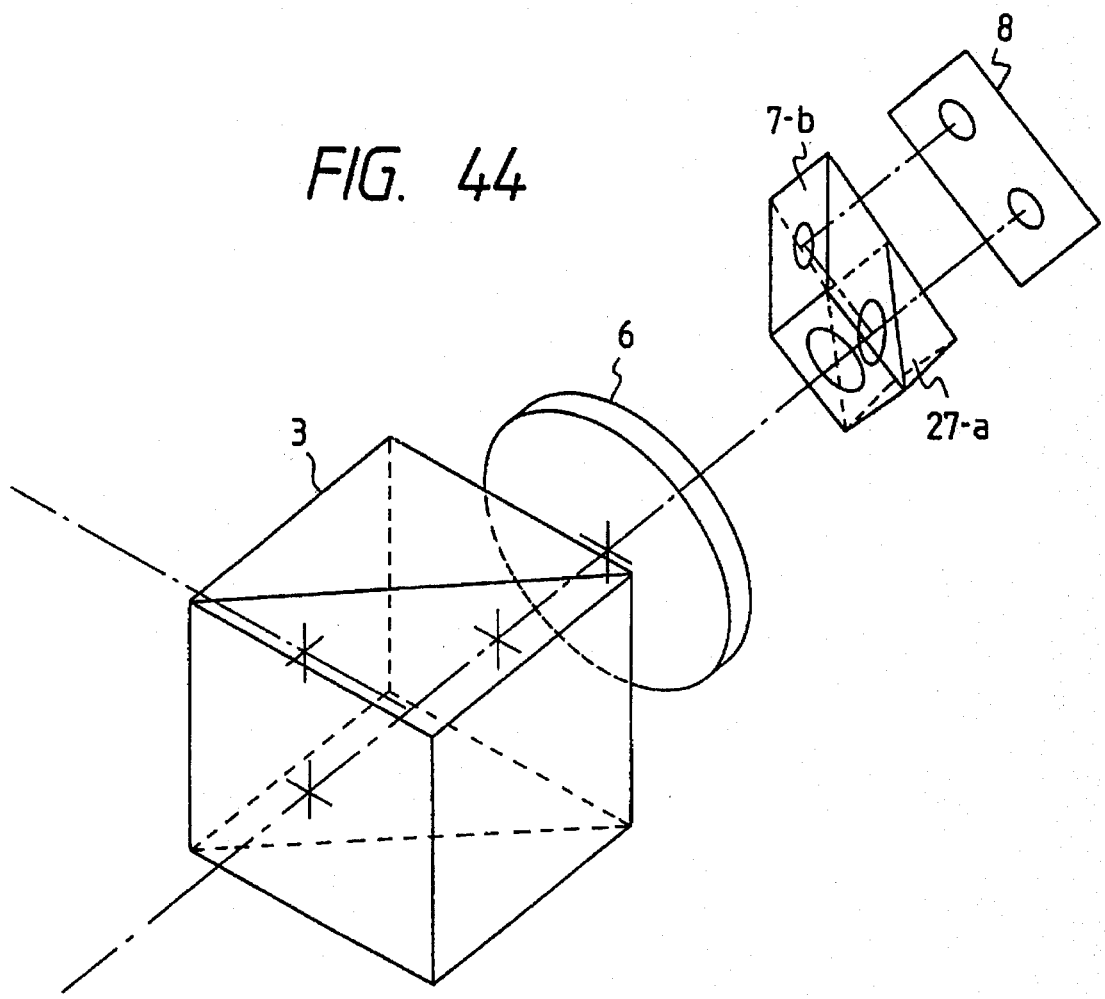
FIG. 44 is a perspective view of main part of the optical system shown in FIG. 43.
Figure 45:
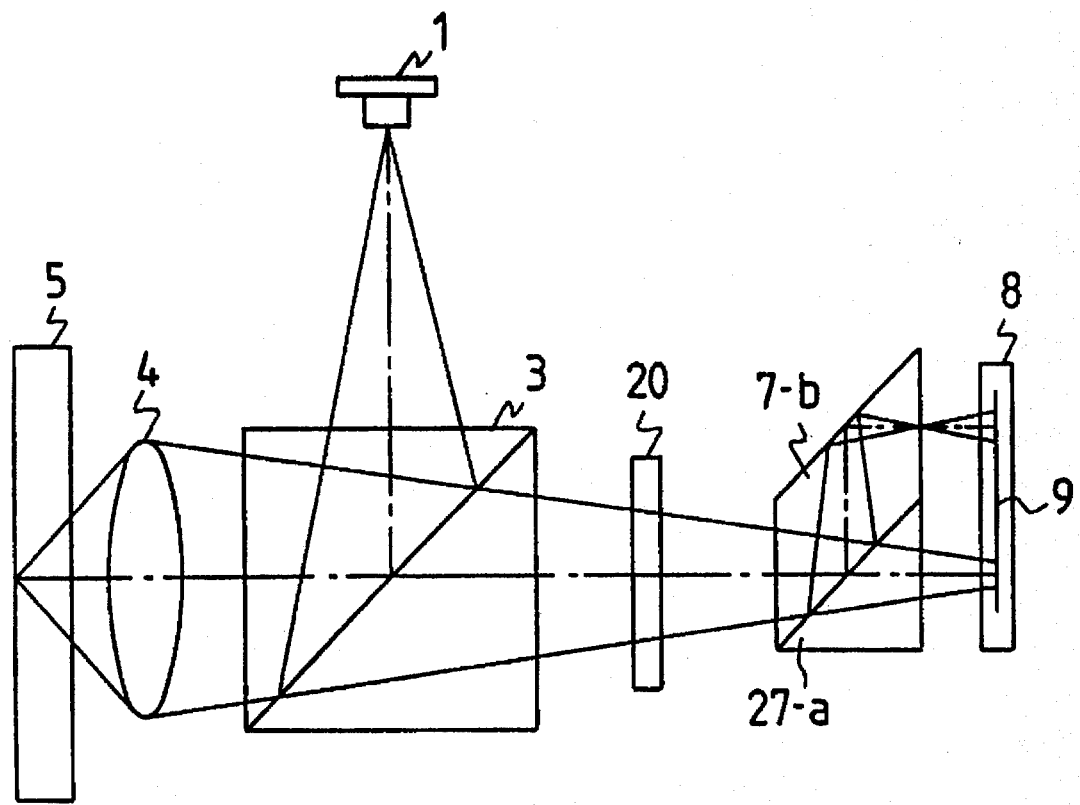
FIG. 45 is a schematic view showing another embodiment of an optical system of an optical head for AF/AT error signal detection and MO signal detection according to the present invention.

FIGS. 43 and 44 show a novel embodiment for detecting an MO signal together in the embodiment for detecting AF and AT error signals according to the present invention using the embodiment shown in FIG. 12. A difference between this embodiment and the embodiment shown in FIG. 12 is that a convergent light beam transmitted through the convergent lens 6 is split by a polarization beam splitter 27-*a* into a reflected light beam and a transmitted light beam as linearly polarized light components which oscillate in orthogonal planes, and the polarization beam splitter 27-*a* forms an angle of 45° with a plane defined by an optical path extending from the light source 1 to the collimator lens 2 and the optical axis of the convergent lens 6. The same function as described above is obtained by rotating the plane of polarization of the detection light beam through 45° using a halfwave plate 20 (see FIG. 45) so as to differentially detect an MO signal. In this embodiment, since the polarization beam splitter 27-*a* is arranged to be rotated through 45°, the halfwave plate is omitted, thus decreasing the number of parts. In this embodiment, since the polarization beam splitter 27-*a* can receive a convergent light beam, and can be rendered compact as compared to the prior art, even when an assembly in which the polarization beam splitter is arranged to be rotated through 45° is adopted, the detection optical system can be realized without becoming considerably large in size.

Figure 46:
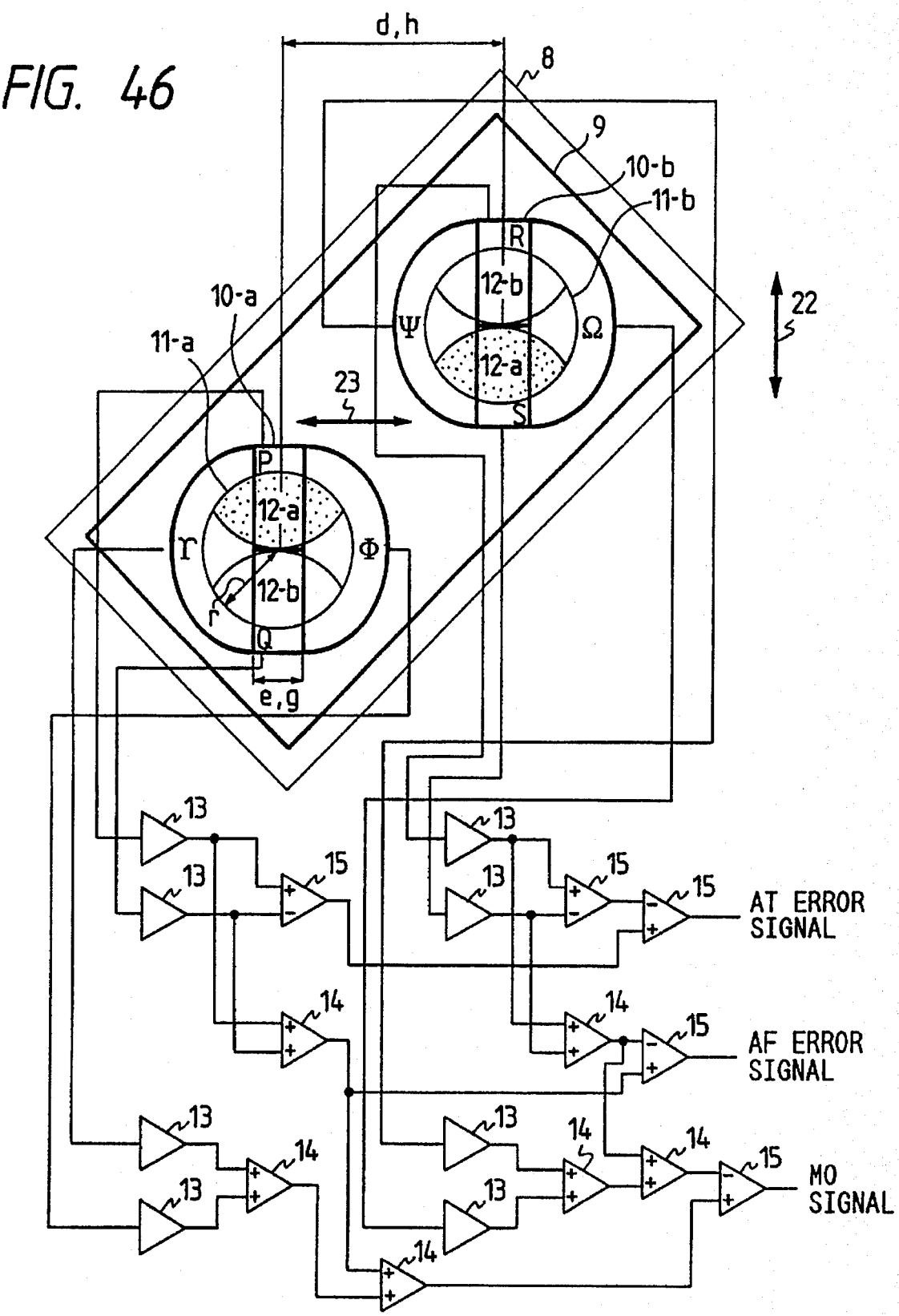
FIG. 46 is a schematic diagram showing the first embodiment of a photodetector and a detection circuit for AF/AT error signal detection and MO signal detection according to the present invention.

In this embodiment, the photodetector 8 has a clear mold package shape. Note that the clear mold package is inclined through 45° in correspondence with the arrangement of the two photodetection regions, as shown in FIG. 46. When a mold package having a proper size is used, the mold package itself need not always be inclined through 45°, and only the photodetection regions in the package can be obliquely arranged. In FIG. 46, the photodetector 8 includes a photodiode chip 9. The photodetection regions 10-*a* and 10-*b* formed on the photodiode chip 9 are light-receiving regions for detecting AF and AT error signals and an MO signal in correspondence with two split light beams. In this embodiment, each of the photodetection regions 10-*a* and 10-*b* is split into four portions. A dark gray portion 12-*a* and a light gray portion 12-*b* are illustrated in each of the light regions 11-*a* and 11-*b* in an in-focus state, and correspond to a diffraction distribution pattern from a continuous guide groove, which pattern appears when an information recording medium has the continuous guide groove. Therefore, in FIG. 46, the direction of the arrow 22 indicates the information track intersection direction on the photodetector surface, i.e., a direction corresponding to the radial direction of a recording medium when the information recording medium has a disk shape. At the same time, a direction perpendicular to the arrow 22 is indicated by the arrow 23. The arrow 23 indicates a direction parallel to the information track on the light-receiving surface of the photodetector 8, i.e., a direction corresponding to the circumferential direction of a disk-shaped recording medium.

In FIG. 46, the portions 12-a and 12-b are illustrated to have different brightness levels for the sake of simplicity although such a state corresponds to a slightly detracked state in practice.

The calculation procedure and detection principle of AF error detection of this embodiment will be described below. Unlike in the third embodiment, the split light-receiving portions P, Q, R, and S of the photodetection regions 10-a and 10-b are light-receiving regions for AF error signal detection, and an AF error signal is obtained by performing a predetermined calculation of the output signals from these regions. More specifically, the two photodetection regions are adjusted, so that the beam spot sizes on the common light-receiving surface are equal to each other in an in-focus state, and the two photodetection regions and the two light beam positions are symmetrical with each other. Therefore, the amount of light incident on the light-receiving portions P and Q of the photodetection region 10-a is equal to that of light incident on the light-receiving portions R and S of the photodetection region 10-b. As in the third embodiment, based on a calculation by the arithmetic circuit, the AF error signal=0, and an in-focus state can be determined at this AF error signal level.

When the information recording medium is shifted from an in-focus state with respect to the objective lens in a certain direction, for example, if the diameter of the light beam 11-a on the photodetection region 10-a decreases, since the amount of light incident on the light-receiving portions P and Q of the photodetection region 10-a increases, the magnitude of the output signal from the photodetection region 10-a increases. At the same time, since the diameter of the light beam 11-b on the photodetection region 10-b increases, and the amount of light incident on the light-receiving portions R and S of the photodetection region 10-b decreases, the magnitude of the output signal from the photodetection region 10-b decreases. A predetermined calculation determined by the arithmetic circuit is performed for the output signals from the photodetection regions 10-a and 10-b as follows:

$$AF\ error\ signal=(IP+IQ)-(IR+IS)$$

The calculation result indicates a positive level. When the shift direction of the information recording medium from an in-focus state with respect to the objective lens is reversed, the calculation result indicates a negative level. As described above, since the differentially calculated AF error signal indicates zero in the in-focus state or indicates a positive or negative level according to the shift direction from the in-focus state, it can be used in AF error control. This effect has already been described in the third embodiment.

The calculation procedure and the detection principle of AT error signal detection of this embodiment is the same as those already described in the third embodiment. Therefore, a repetitive description thereof will be avoided.

The calculation procedure and the detection principle of MO signal detection will be described below. As is well known, the direction of polarization of a detection light beam reflected by the information recording medium is rotated due to a magnetooptical effect through a very small angle to be symmetrical about the plane of polarization upon emission from the light source in accordance with information recorded on the recording medium. Thus, an analyzer is arranged to form an angle of 45° with a direction corresponding to the plane of polarization upon emission from the light source so as to split a detection light beam into two orthogonal polarized light components. When the amounts of the split light components are converted into signals, and the difference between the two signals is calculated, a high-quality information reproduction signal from which in-phase noise is canceled can be obtained.

In this embodiment, the amounts of detection light beams 11-a and 11-b which are split to detect the above-mentioned AF and AT error signals are converted into signals, and the difference between the signals is calculated, thus obtaining a high-quality information reproduction signal from which in-phase noise is canceled. That is, since the plane of incidence of the polarization beam splitter 7-a is arranged to form an angle of 45° with a direction corresponding to the plane of polarization upon emission from the light source, the two light beams incident on the photodetection regions 10-a and 10-b consist of two orthogonal polarized light components. When the light-receiving portions of the photodetection regions 10-a and 10-b are represented by P, Q, R, S, γ, Φ, ψ, and Ω, as shown in FIG. 46, and signals obtained from these light-receiving portions are represented by IP, IQ, IR, IS, Iγ, IΦ, Iψ, and IΩ, sum signals [IP+IQ+Iγ+IΦ] and [IR+IS+Iψ+IΩ] of all the four-split light-receiving portions are respectively calculated, and the difference between these sum signals is calculated, thus obtaining an MO signal using the following equation:

$$MO\ signal=(IP+IQ+I\gamma+I\Phi)-(IR+IS+I\Phi+I\Omega)$$

With the arrangement of this embodiment, since all the amounts of the two split detection light beams 11-a and 11-b can be used in MO signal reproduction, the detection light beams can be prevented from being abandoned partially, as pointed out in a conventional problem, and a system advantageous in terms of noise reduction can be provided.

In this embodiment, the use of all the amounts of the two split detection light beams 11-a and 11-b in MO signal reproduction brings the following effects. That is, when a photodetector for AF/AT error signal detection is used common to a photodetector for MO signal detection, in particular, when the two photodetection regions for performing differential detection of an MO signal are also used for AF/AT error signal detection as in this embodiment, a means for preventing an MO signal and AF and AT error signals from interfering with each other must be adopted. As is well known, since the two outputs from the photodetector alternately vary due to reversal of the plane of polarization due to a magnetooptical effect of recorded information, an MO signal can be detected by differentially calculating the two outputs. Although inversion of the outputs from the two photodetection regions due to reversal of the plane of polarization may appear in AF and AT error signals as offsets, the practical frequency range of an MO signal is higher than those of AF and AT error signals, and the above-mentioned interference can be avoided by separating the frequency ranges of the signals.

On the other hand, as a problem unique to a magnetooptical information recording medium, the imbalance of an MO signal is known. The imbalance of an MO signal means that a bias-like low-frequency change is added to a change in balance of the intensities of two split detection light beams in a high-frequency range of recorded information due to a local distribution of, e.g., birefringence characteristics of an information recording medium. This phenomenon will be described in more detail below. The rotation of the plane of polarization caused by recorded information is reversed at a signal recording frequency. However, since the rotation of the plane of polarization due to a local variation of an information recording medium occurs at a very low frequency as compared to reversal caused by recorded information, a change appears in a DC-bias manner. Such a change may be mixed in the frequency range of AF and AT error signals, and since the outputs from the two photodetection regions are imbalanced under the influence of this change, offsets of AF error signals are generated. More specifically, when a defocus state occurs, since the beam spot sizes on the two photodetection regions change, the amounts of light incident on inner photodetection regions are imbalanced. In contrast to this, even when the ratio of the amounts of light of the two split light beams changes due to the above-mentioned cause although the light beams are in an in-focus state, the amounts of light incident on the inner photodetection regions also appear to be imbalanced. As a result, the cause of imbalance cannot be discriminated in accordance with only the outputs from the inner photodetection regions.

However, when all the amounts of the light beams to the two photodetection regions are detected, the imbalance of the light amounts can be discriminated from a change in beam spot size. More specifically, light amount variation components of the two split light beams can be normalized to execute a signal calculation procedure for, e.g., AF error signal detection according to the following equation:

AF error signal=$(IP+IQ)/(IP+IQ+I\gamma+I\Phi)-(IR+IS)/(IR+IS+I\psi+I\Omega)$

Figure 47:
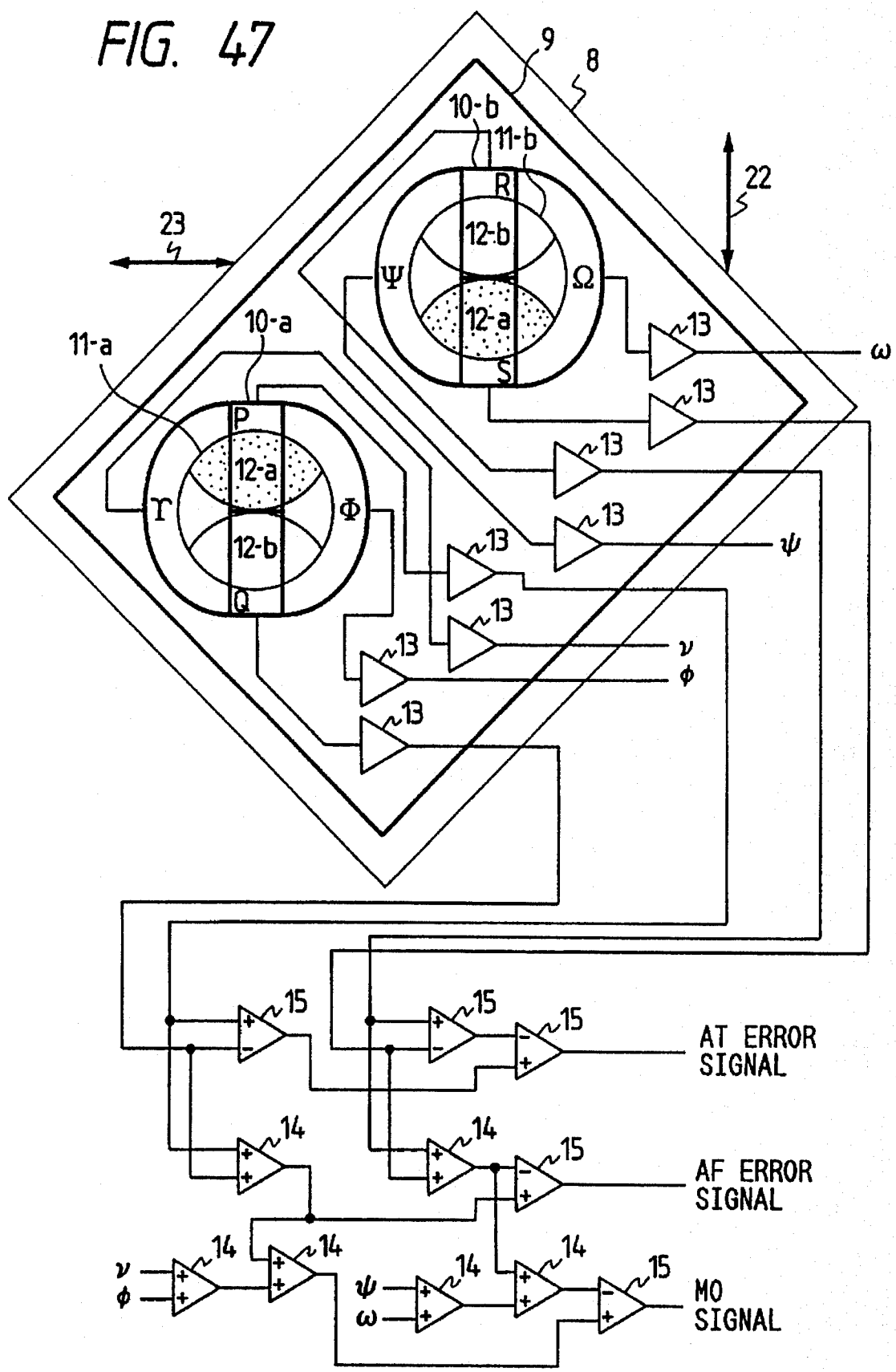
FIG. 47 is a schematic diagram showing the second embodiment (incorporating pre-amplifier circuits) of a photodetector and a detection circuit for AF/AT error signal detection and MO signal detection according to the present invention.

FIG. 47 shows a case wherein pre-amplifiers 13 corresponding to the photodetection regions 10-a and 10-b are incorporated in the clear mold package of the photodetector. Since a semiconductor such as a photodiode may be used as the photodetector, photodetection regions of the photodiode are formed on a silicon wafer using a photomask. In this embodiment, pre-amplifier circuits are also formed on the same silicon wafer in the same process. The output signals from the photodetection regions can be extracted after they are amplified by the pre-amplifiers 13 formed in the package such as a clear mold package of the photodetector. As a result, since the pre-amplifier circuits are formed on a single silicon wafer, a variation in amplifier characteristics can be suppressed, and the mounting space of a circuit can be reduced.

Figure 48:
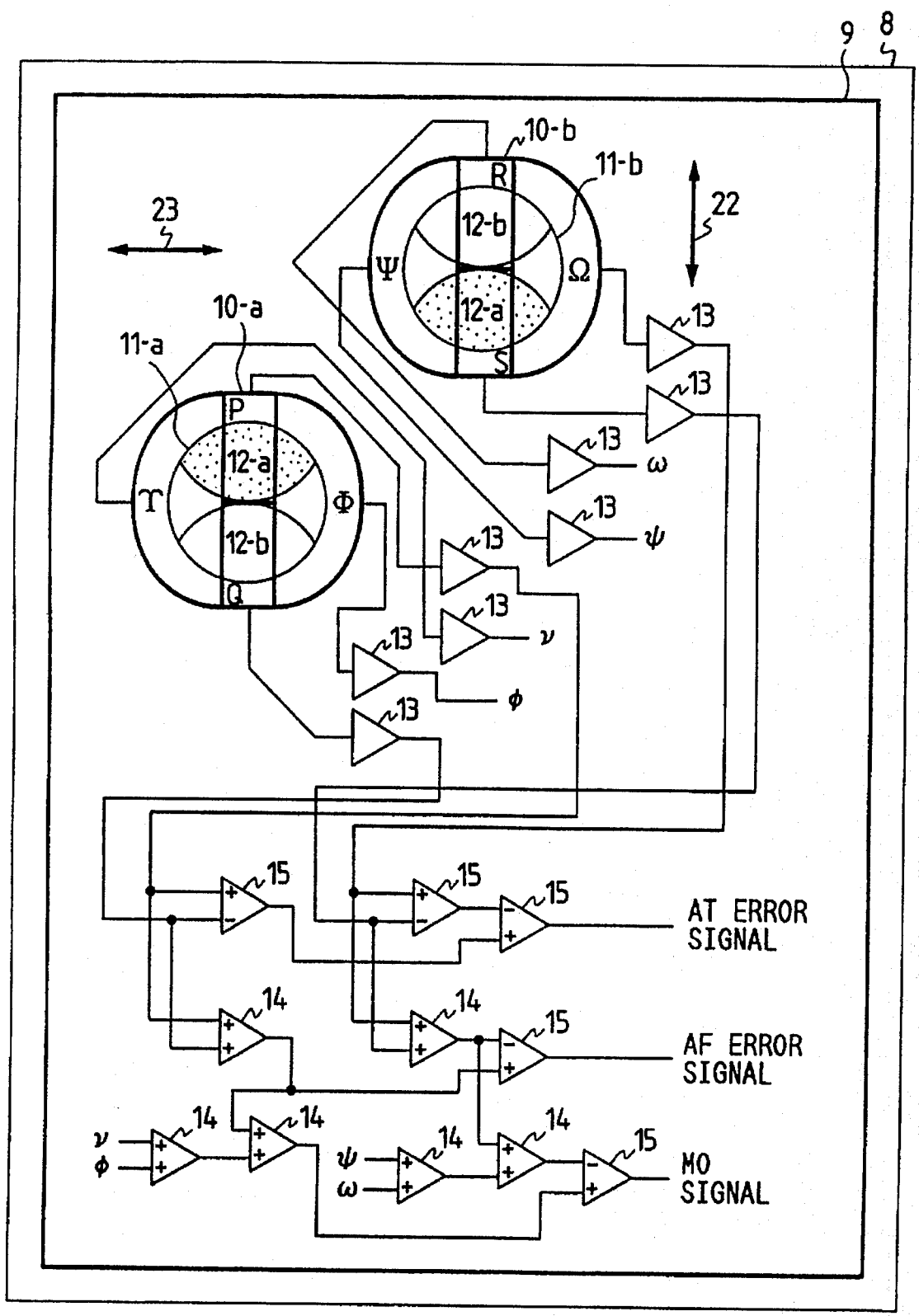
FIG. 48 is a schematic diagram showing the third embodiment (incorporating pre-amplifier circuits and arithmetic circuits) of a photodetector and a detection circuit for AF/AT error signal detection and MO signal detection according to the present invention.

FIG. 48 shows a case wherein operational amplifiers 14 and 15 for obtaining AF and AT error signals and an MO signal are incorporated in the clear mold package of the photodetector as well as pre-amplifiers 13 corresponding to the photodetection regions 10-a and 10-b. In this case, the case shown in FIG. 47 is further extended, and the differential amplifiers are also formed on the same silicon wafer. Therefore, a further effect is expected as compared to the above-mentioned case. Both FIGS. 47 and 48 show two split light beams 11-a and 11-b in an in-focus state. The method of incorporating the amplifiers in the clear mold package can be similarly applied to other embodiments of a photodetector to be described below.

Figure 49:
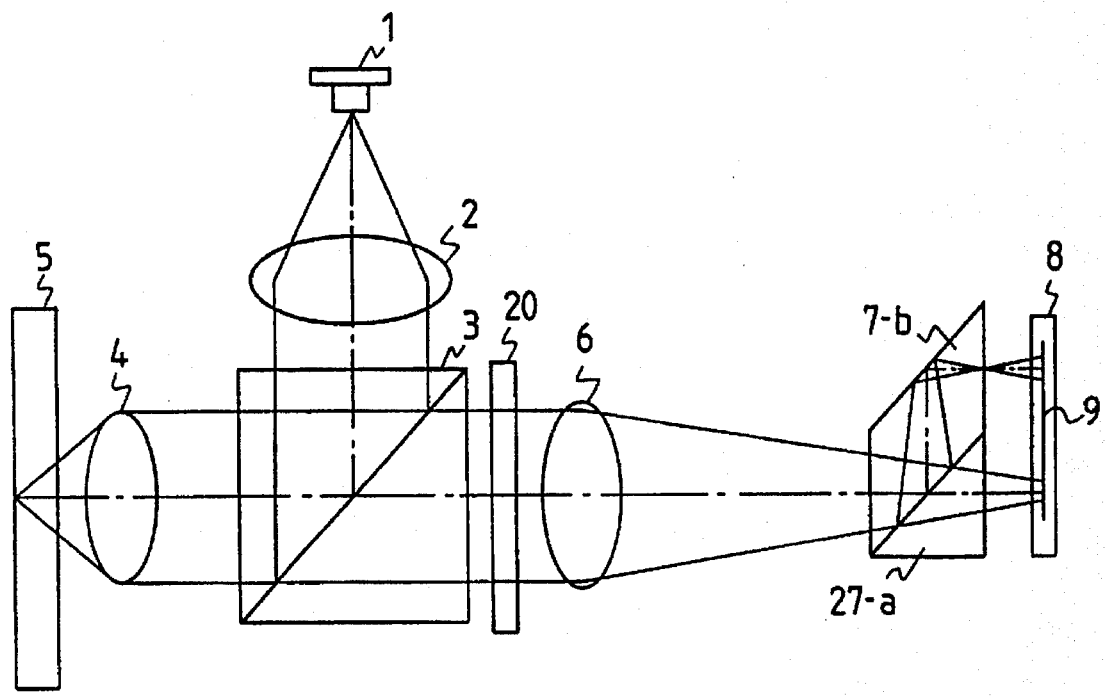
FIG. 49 is a schematic view showing still another embodiment of an optical system of an optical head for AF/AT error signal detection and MO signal detection according to the present invention.

FIG. 49 shows an optical system according to still another embodiment of the present invention. In this embodiment, since the plane of polarization of a detection light beam is rotated through 45° using the halfwave plate 20, the plane defined by the optical path of a light beam emitted from the light source and a detection light optical path, and the plane defined by a light beam split by the polarization beam splitter 27-a can be arranged on a single plane. As a result, a further low-profile apparatus can be realized.

Figure 50:
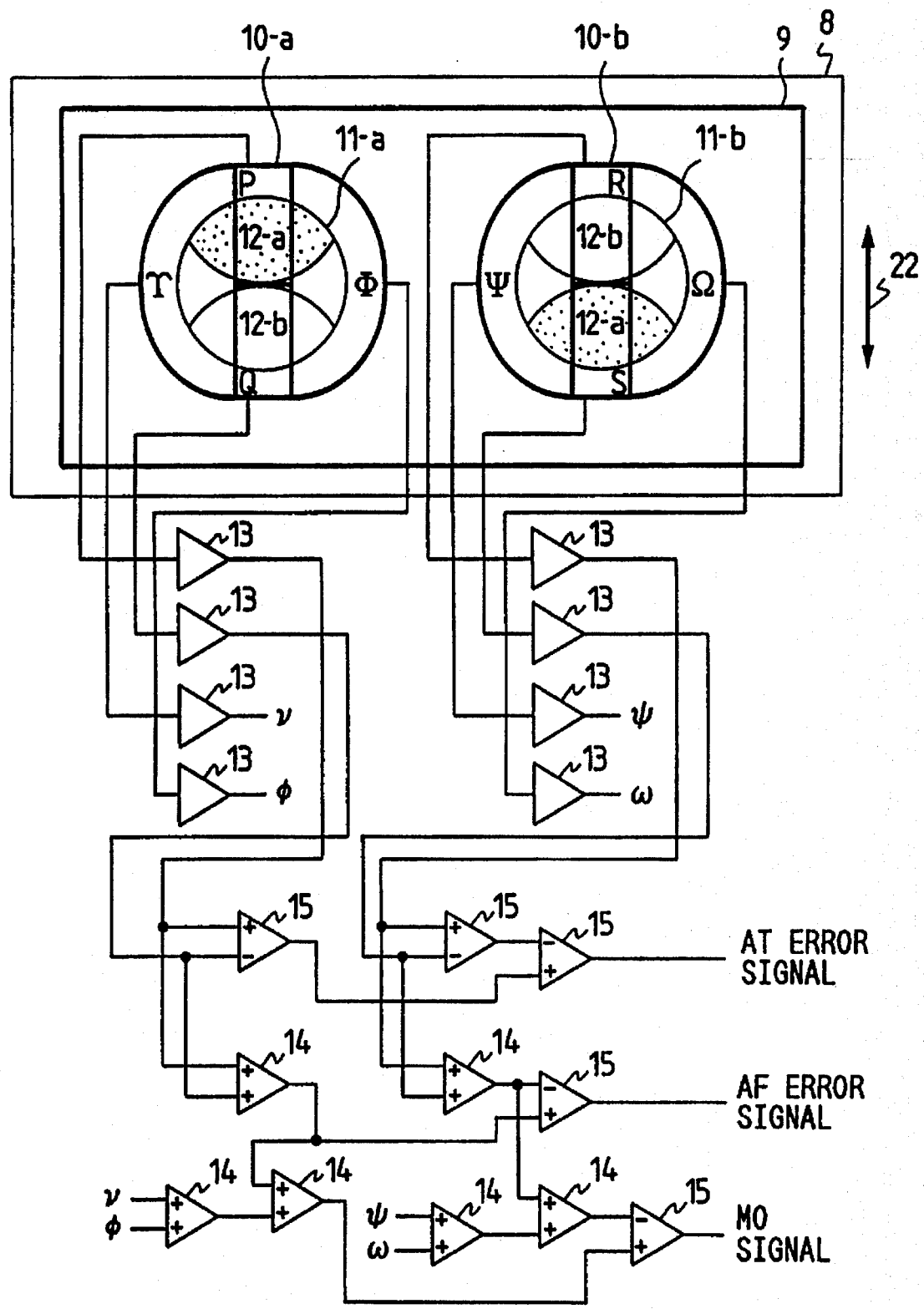
FIG. 50 is a schematic diagram showing the fourth embodiment of a photodetector and a detection circuit for AF/AT error signal detection and MO signal detection according to the present invention.
Figure 51:
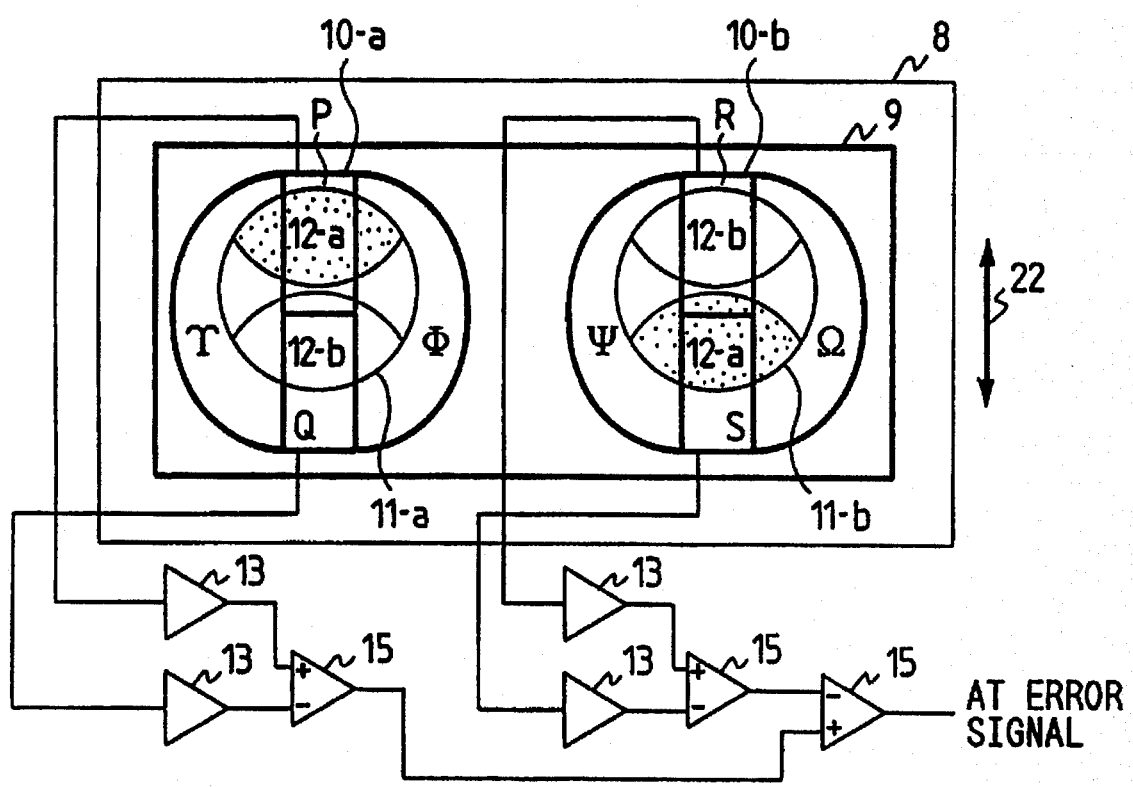
FIG. 51 is an explanatory view showing the arrangement condition of the photodetector shown in FIG. 50 and detection light beams when the photodetector suffers from an optical axis shift.

FIG. 50 is a schematic diagram of a photodetector and incident light beams corresponding to the optical system shown in FIG. 49. As shown in FIG. 50, since the size of the photodetector package in the track intersection direction can be reduced, if this direction is set to coincide with the direction of thickness of the apparatus, a further low-profile apparatus can be realized. FIG. 51 illustrates a case wherein the photodetector is displaced relative to the detection light beams in the track intersection direction in the photodetector shown in FIG. 50. In this case, AT error signal waveforms have an effect of canceling offsets of AT error signals after a differential calculation, as shown in FIGS. 27(a) through 27(c).

Figure 52:
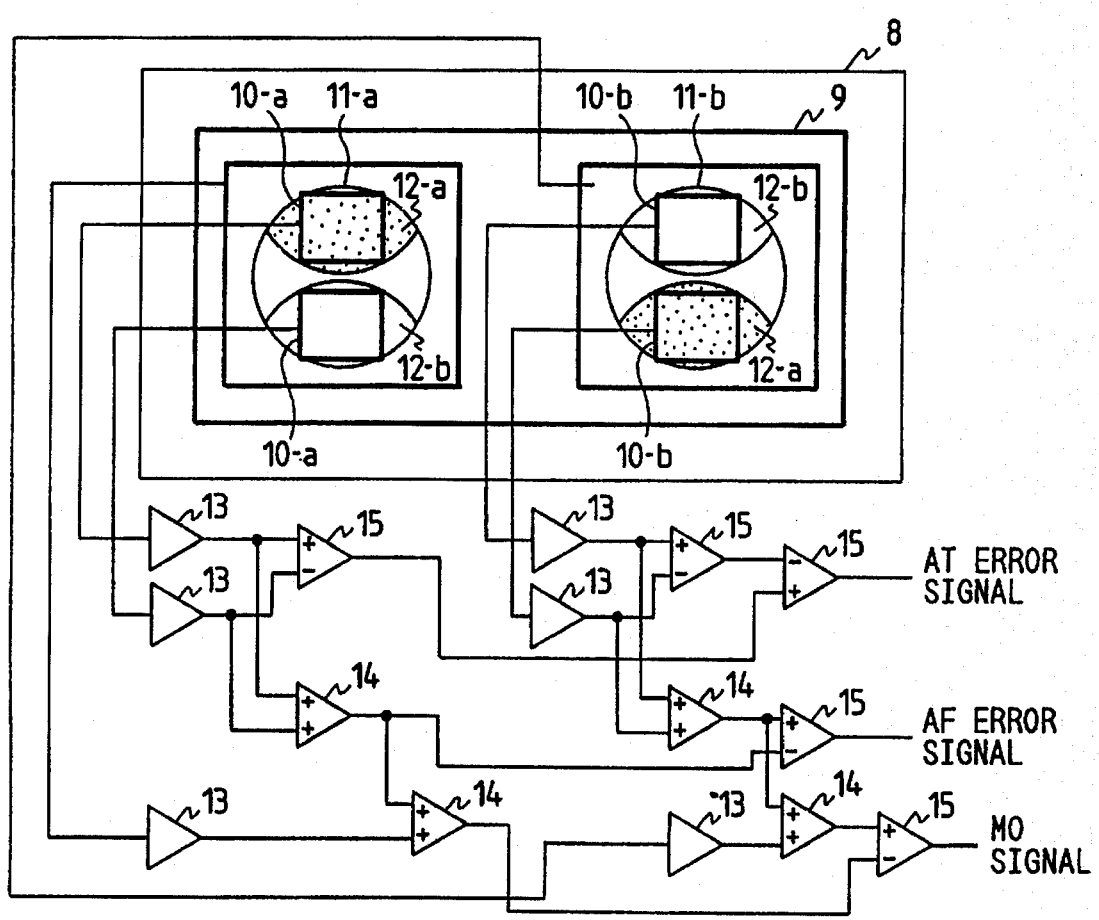
FIG. 52 is a schematic diagram showing the fifth embodiment of a photodetector and a detection circuit for AF/AT error signal detection and MO signal detection according to the present invention.
Figure 53:
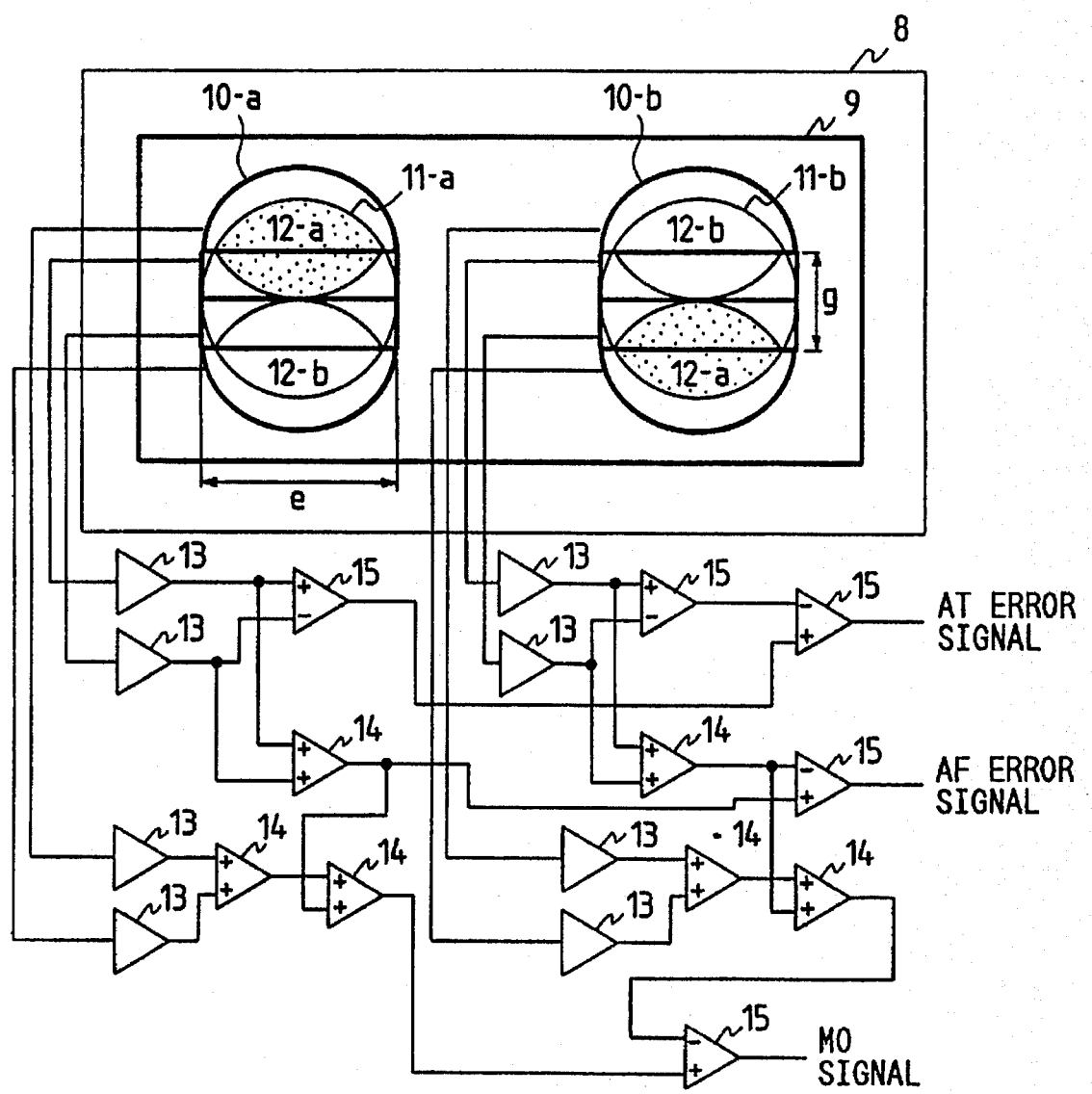
FIG. 53 is a schematic diagram showing the sixth embodiment of a photodetector and a detection circuit for AF/AT error signal detection and MO signal detection according to the present invention.

FIGS. 52 and 53 show embodiments wherein the shapes of the photodetection regions of the photodetector shown in FIG. 49 are changed. Of course, these embodiments can be combined with an optical system without using any halfwave plate, as shown in FIG. 43, and may be used in the arrangement shown in FIG. 46. In the embodiment shown in FIG. 52, the size of each photodetection region for detecting AF and AT error signals is set to be smaller than the regions 12-a and 12-b of the diffraction distribution of the detection light beam caused by a guide groove on the information recording medium, and two photodetection regions for one detection light beam are arranged to be separated from each other within a range of the diameter of the detection light beam. In this embodiment, although the amount of light, which contributes to detection of AF and AT error signals, decreases, since the area of each photodetection region can be decreased, the influence of noise can be reduced. In particular, when noise reduction is strongly demanded in terms of the characteristics of a photodetector, this arrangement is effective. Needless to say, this embodiment also has an effect of canceling AT error signal offsets caused by an optical axis shift in the track intersection direction as in the embodiments shown in FIGS. 43 and 44, and even when the two light beams are alternately shifted in the track intersection direction on the light-receiving surface of the photodetector due to decentering, in the track intersection direction, of the objective lens, no AT offsets are generated unless the photodetection regions fall outside the regions 12-a and 12-b of the diffraction distribution. In addition, light-receiving regions larger than the diameter of the detection light beam may be arranged to surround the photodetection regions for detecting AF and AT error signals, the AF and AT error signals may be calculated as sums of the outputs from the photodetection regions and the regions surrounding the photodetection regions, and MO signal detection may be achieved by differentially calculating the sum signals.

In the embodiment shown in FIG. 53, the size, the information track intersection direction (arrow 22), of each photodetection region for detecting AF and AT error signals is set to be smaller than the beam spot size in an in-focus state. In this embodiment, as can be seen from FIG. 53, the ratio of the regions 12-a and 12-b of the diffraction distribution to the detection light beams 11-a and 11-b, i.e., the ratio of incidence of the diffraction distribution patterns from a pit array or a guide groove on the information recording medium onto the photodetection regions, can be decreased. Since this diffraction distribution varies independently of the focusing state when the light spot intersects a guide groove, it appears as crosstalk from an AT error signal to an AF error signal to disturb stable AF control. However, this embodiment can eliminate this influence for the above-mentioned reason. Also, extra light-receiving regions may be arranged to sandwich the photodetection regions for detecting AF and AT error signals from the track intersection direction, the AF and AT error signals may be calculated as sums of the outputs from the photodetection regions and the regions sandwiching these photodetection regions, and MO signal detection may be achieved by differentially calculating the sum signals.

Figure 54:
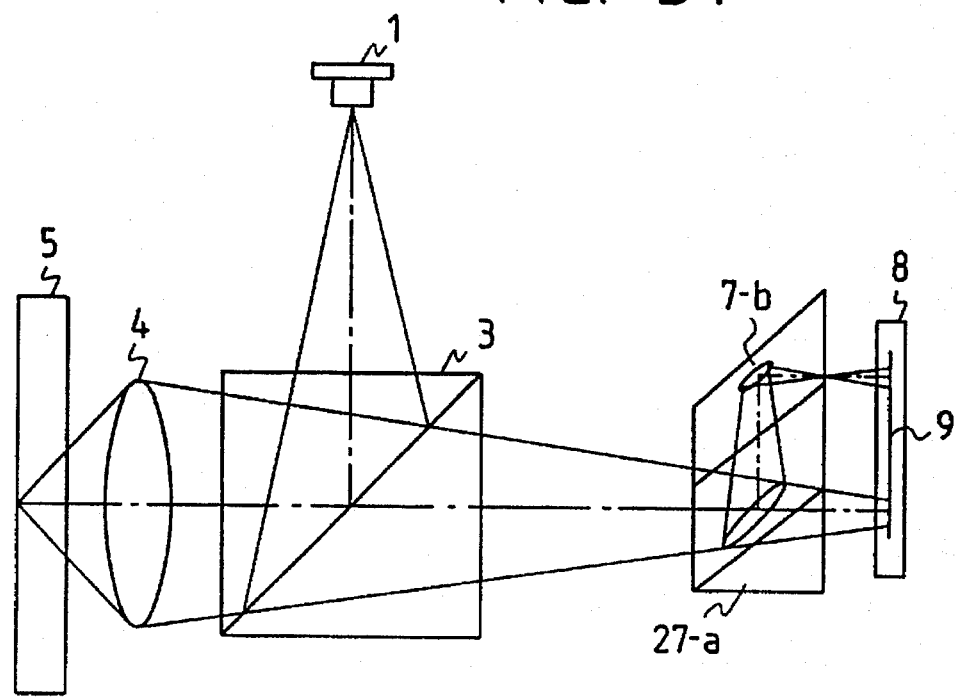
FIG. 54 is a schematic view showing still another embodiment of an optical system of an optical head for AF/AT error signal detection and MO signal detection according to the present invention.

FIG. 54 shows still another embodiment of the present invention. In this embodiment, the present invention is practiced by a finite optical system arrangement without including any collimator lens. This embodiment has no halfwave plate 20 unlike in the previous embodiment (see FIG. 43). Referring to FIG. 54, a light beam emitted from a semiconductor laser 1 as a light source is deflected by a beam splitter 3, and reaches an objective lens 4. The light beam is converged by the objective lens 4 onto the recording surface of an information recording medium 5. Light (detection light beam) reflected by the information recording medium 5 is transmitted through the objective lens 4 again, and is then split into a reflected light beam and a transmitted light beam by a polarization beam splitter 27-a. The plane of incidence of the polarization beam splitter 27-a is arranged to be rotated through 45° with respect to the direction of polarization of a light beam emitted from the light source. Of the split light beams, the reflected light beam is reflected and deflected again by a reflection surface 7-b separately provided to the polarization beam splitter 27-a, so that the reflected light beam and the transmitted light beam emerge in the same direction. The two convergent light beams are incident on a photodetector 8 for detecting AF and AT error signals and an MO signal, the light-receiving surface of which is arranged in correspondence with positions shifted from the image-side focal plane of the objective lens by the same distance in opposite directions, in a state wherein the two beams are spatially separated from each other on the light-receiving surface.

Figure 55:
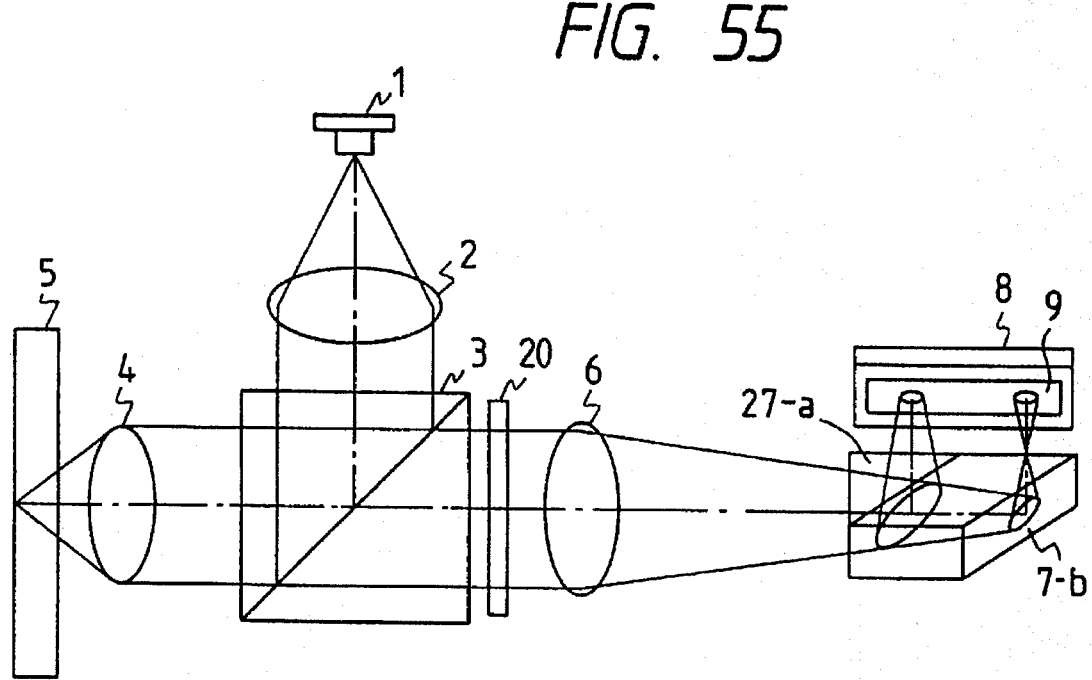
FIG. 55 is a schematic view showing still another embodiment of an optical system of an optical head for AF/AT error signal detection and MO signal detection according to the present invention.

An embodiment shown in FIG. 55 comprises a halfwave plate 20. In this embodiment, light (detection light beam) reflected by the information recording medium 5 is transmitted through the objective lens 4 again, and thereafter, the direction of polarization of the light beam is rotated through 45° by the halfwave plate 20. Thereafter, the light beam is split into the polarization beam splitter 27-a into a reflected light beam and a transmitted light beam. Therefore, a low-profile structure of an apparatus can be realized since the polarization beam splitter 27-a is arranged, so that the plane including the two split light beams and the plane formed by the light beam emitted from the light source and the detection light beam are arranged in a single plane. In this embodiment, the direction of polarization of the detection light beam is rotated through 45° using the halfwave plate 20, and the arrangement and structure of an optical system for detecting AF and AT error signals and an MO signal are designed to output the two split detection light beams in the same direction as the direction of the light source. In this case, a photodetector can be adjusted from the same direction as the mounting direction of the light source. Therefore, it is suggested that the arrangement of the optical system can be changed without adding any new parts even when the mounting direction of the photodetector is limited due to a limitation imposed by specific design of the entire apparatus.

As described above, the present invention can provide the following effects for AF error detection, AT error detection, and/or MO signal detection.

(1) The present invention is strong against a position shift of a photodetector (in the direction parallel to a track for AF error signal detection; in the track intersection direction for AT error signal detection). More specifically, even when the positional relationship between a photodetector and incident light beams changes after position adjustment due to a disturbance caused by a temperature change or a mechanical disturbance, since two detection light beams move in the same direction on the light-receiving surface of the photodetector, and imbalances of signals from the two photodetection regions on the common light-receiving surface cancel each other, the change in positional relationship does not easily influence an AF error signal, and an apparatus with stable AF control characteristics can be provided. When push-pull signals having opposite phases are differentially calculated to amplify the amplitude of the AT error signals, offsets cancel each other and disappear. Therefore, an apparatus with stable AT control characteristics (so-called tracking characteristics) can be provided.

(2) Since a single light-receiving surface on which photodetection regions are formed is arranged at a position where one of two light beam spots is formed at a position corresponding to a position before the focal point of a convergent lens, and the other light beam spot is formed at a position corresponding to a position after the focal point, a point at which the S-curve of an AF error signal indicates a pseudo in-focus level can be eliminated from a position near a true in-focus point. For this reason, no complicated control is required in AF pull-in control, resulting in a decrease in cost.

(3) In this apparatus, since a detection light beam is split after it is converted into a convergent light beam, the beam spot size of light passing through splitting means becomes small. Therefore, the size of the splitting means can be reduced, thus contributing to a compact optical system.

(4) Since the splitting means can be constituted, so that two split light beams emerge in substantially the same direction via optical paths having different optical path lengths, the two light beams can be received in a single light-receiving surface. Therefore, no large space is required for mounting the photodetector, thus contributing to a compact optical system.

(5) Since the two photodetection regions for detecting an AF error signal can be arranged in a single light-receiving surface and in the vicinity of each other, they can be stored in a single package, and parts cost of the photodetector and its peripheral components can be reduced.

(6) Since the two photodetection regions can be formed on a single chip in the vicinity of each other, a variation in characteristics can be suppressed, and the influence on signal balance can be eliminated.

(7) Since the two photodetection regions can be formed on a single chip in the vicinity of each other, when a manufacturing method of determining interval precision of the photodetection regions by precision of a photomask is used, very high position precision can be realized.

(8) Since assembling requires adjustment of only the mounting position of a single photodetector package for an AF error detection system or an AT error detection system, adjustment cost can be reduced.

(9) Since the two photodetection regions of the photodetector serve as substantially one light-receiving region for one light beam as far as AF error signal detection is concerned, the number of pre-amplifiers and operational amplifiers can be decreased, thus providing advantages in terms of signal quality and cost.

(10) As for AT error signal detection, since AT error signals from the two photodetection regions are differentially calculated, and the differential signal is used, a secondary effect of simultaneously removing noise components superposed on the detection light amount due to the characteristics of each information recording medium in addition to elimination of AT offsets can be obtained, and an AT error signal free from noise can be provided in a case other than an optical axis shift.

(11) Since the pre-amplifiers and operational amplifiers can be directly formed on the silicon wafer of the photodetector, uniform amplifier characteristics and a decrease in mounting area due to integration of the photodetector and the amplifiers can be achieved, and a compact apparatus can be realized. In mass production, cost can be reduced as compared to a case wherein an arrangement around the amplifiers is constituted by discrete components.

(12) Since the two detection light beams mainly pass through the paraxial region of the convergent lens, they are not adversely affected by aberrations of the lens peripheral portion.

(13) If the size (length) of each of the two photodetection regions, which size is measured along a direction parallel to a track, is represented by e, and the radius of each detection light beam in an in-focus state is represented by r, the photodetection regions are set to satisfy:

$$0.4r \leq e$$

Thus, the amplitude of an AT error signal can be prevented from becoming too small, and a satisfactory amplitude of an AT error signal can be obtained.

(14) To further limit the above-mentioned range, if the interval between the centers of the two detection light beams, which interval is measured along a direction parallel to a track, is represented by d, the interval between the centers of the two photodetection regions, which interval is measured along the direction parallel to the track, is represented by h, the length of each of the two photodetection regions, which length is measured along the direction parallel to the track, is represented by e, and the radius of each detection light beam in an in-focus state is represented by r, the photodetection regions are set to satisfy:

$$d-2r+e \leq h \leq d+2r-e$$

Thus, the amplitude of an AT error signal can be prevented from being considerably decreased, and a satisfactory amplitude of an AT error signal can be obtained.

(15) If the size (length), in a direction in which the size is set to be smaller than the diameter of the detection light beam in an in-focus state, of the photodetection region is represented by g, and the radius of each detection light beam in an in-focus state is represented by r, the photodetection regions are set to satisfy:

$$0.4r \leq g \leq 1.6r$$

The S-curve pattern of an AF error signal, in particular, linearity before and after an in-focus point, peaks at two ends of a pull-in range, and the like can be satisfactorily maintained. Also, the amplitude of an AT error signal can be prevented from becoming too small, and a satisfactory amplitude of an AF or AT error signal can be obtained.

(16) To further limit the above-mentioned range, if the interval between the centers of the two detection light beams, which interval is measured along a direction parallel to a track, is represented by d, the interval between the centers of the two photodetection regions, which interval is measured along the direction parallel to the track, is represented by h, the size (length) of each of the two photodetection regions, which size is measured along the direction parallel to the track, is represented by e, and the radius of each detection light beam in an in-focus state is represented by r, the photodetection regions are set to satisfy:

$$d-2r+e \leq h \leq d+2r-e$$

Thus, the amplitude of an AT error signal can be prevented from being considerably decreased, and a satisfactory amplitude of an AT error signal can be obtained.

(17) When all the light amounts of light beams which reach the two photodetection regions are detected, imbalance of the light amounts can be discriminated from a change in beam spot size. More specifically, a signal calculation procedure for AF error signal detection is set to satisfy the following equation so as to normalize light amount variation components of the split light beams:

$$AF \text{ error signal} = (IP+IQ)/(IP+IQ+I\gamma+I\Phi) - (IR+IS)/(IR+IS+I\psi+I\Omega)$$

What is claimed is:

1. An optical information recording/reproducing apparatus comprising:

radiation means for radiating a light beam onto an information recording medium;

converging means for converging the light beam from the information recording medium;

means for splitting the converged light beam into two light beams;

guiding means for guiding the two split light beams onto a single light-receiving surface of an integrated photodetector, which can receive the two split light beams, via optical paths having different optical path lengths, said guiding means guiding the two split light beams, so that one of the two split light beams is projected onto said light-receiving surface at a position before the light beam passes a convergent point thereof, and the other light beam is projected onto said light-receiving surface at a position after the light beam passes a convergent point thereof;

said integrated photodetector having two photodetection areas each having first, second and third regions, corresponding to the respective light beams, so that said light-receiving surface thereof receives the respective light beams;

means for detecting a focusing error signal by adding signals from respective ones of said first and second regions corresponding to the respective light beams and executing a differential operation for the two added signals corresponding to the respective light beams;

means for detecting a tracking error signal by executing a differential operation for signals from respective ones of said first and second regions corresponding to the respective light beams to generate respective push-pull signals and executing a differential operation for the respective push-pull signals corresponding to the respective light beams; and means for reproducing information recorded on the recording medium by executing a differential operation for signals from respective ones of said first, second and third regions.

2. An apparatus according to claim 1, wherein said integrated photodetector comprising said photodetection regions is constituted by forming all said photodetection regions on a single chip.

3. An apparatus according to claim 1, wherein said integrated photodetector comprising said photodetection regions incorporates input-stage amplifiers corresponding to said photodetection regions in a package thereof.

4. An apparatus according to claim 1, wherein said integrated photodetector comprising said photodetection regions incorporates input-stage amplifiers corresponding to said photodetection regions and arithmetic devices for calculating signals from said photodetection regions in a package thereof.

5. An apparatus according to claim 1, wherein said means for splitting comprises a polarization beam splitter, and a plane of incidence of said polarization beam splitter is arranged to be rotated through 45° about an optical axis of incident light with respect to a plane of polarization of linearly polarized light emitted from a light source.

* * * * *

UNITED STATES PATENT AND TRADEMARK OFFICE
CERTIFICATE OF CORRECTION

PATENT NO. : 5,629,911          Page 1 of 2
DATED      : May 13, 1997
INVENTOR(S): Kenichi SASAKI It is certified that error appears in the above-identified patent and that said Letters Patent is hereby corrected as shown below:

COLUMN 3:

and    Line 18, "phOtode-" should read --photode- --;

Line 47, "Just" should read --just--.

COLUMN 5:

Line 57, "suffer" should read --suffers--.

COLUMN 6:

Line 49, "of" should read --of the--.

COLUMN 7:

Line 23, "are" should read --is--.

COLUMN 14:

Line 5, "of main" should read --of a main--.

COLUMN 17:

Line 2, "quality" should read --the quality--.

UNITED STATES PATENT AND TRADEMARK OFFICE
CERTIFICATE OF CORRECTION

PATENT NO. : 5,629,911
DATED : May 13, 1997
INVENTOR(S) : Kenichi SASAKI

It is certified that error appears in the above-identified patent and that said Letters Patent is hereby corrected as shown below:

COLUMN 30:

Line 37, "(1R+1S+1Φ+1Ω)" should read --(1R+1S+1Ψ+1Ω)--.

COLUMN 32:

Line 56, "size, the" should read --size, in the--.

Signed and Sealed this

Twenty-third Day of December, 1997

Attest:

BRUCE LEHMAN

Attesting Officer

Commissioner of Patents and Trademarks